United States Patent
Freeman et al.

(10) Patent No.: US 6,785,726 B1
(45) Date of Patent: Aug. 31, 2004

(54) METHOD AND APPARATUS FOR DELIVERING LOCAL AND REMOTE SERVER EVENTS IN A SIMILAR FASHION

(75) Inventors: Thomas D. Freeman, South Jordan, UT (US); Bradley Jay Pedersen, Parkland, FL (US)

(73) Assignee: Citrix Systems, Inc., Ft. Lauderdale, FL (US)

( * ) Notice: Subject to any disclaimer, the term of this patent is extended or adjusted under 35 U.S.C. 154(b) by 0 days.

(21) Appl. No.: 09/567,456

(22) Filed: May 8, 2000

(51) Int. Cl.⁷ ............................................. G06F 15/16
(52) U.S. Cl. .................. 709/227; 709/228; 719/318
(58) Field of Search .................. 709/318, 224, 709/225, 201, 227, 228; 719/318

(56) References Cited

U.S. PATENT DOCUMENTS

| | | | |
|---|---|---|---|
| 4,387,425 A | 6/1983 | El-Gohary | 364/200 |
| 4,779,189 A | 10/1988 | Legvold et al. | 364/200 |
| 4,825,354 A | 4/1989 | Agrawal et al. | 364/200 |
| 4,862,392 A | 8/1989 | Steiner | |
| 4,887,204 A | 12/1989 | Johnson et al. | 364/200 |
| 4,905,141 A | 2/1990 | Brenza | |
| 4,937,784 A | 6/1990 | Masai et al. | 364/900 |
| 5,014,221 A | 5/1991 | Mogul | 364/519 |

(List continued on next page.)

FOREIGN PATENT DOCUMENTS

| | | | | |
|---|---|---|---|---|
| EP | 0 381 645 A2 | 8/1990 | | 15/16 |
| EP | 0 384 339 A3 | 8/1990 | | 9/46 |
| EP | 0 414 624 A2 | 2/1991 | | 9/46 |
| EP | 0 540 151 A3 | 10/1991 | | 9/46 |
| EP | 0 475 581 A2 | 3/1992 | | 9/46 |
| EP | 0 600 235 | 6/1994 | | H04L/29/06 |
| EP | 0 643 514 A3 | 3/1995 | | |
| EP | 0 715 257 A1 | 6/1996 | | |
| EP | 0 732 834 A2 | 8/1996 | | 29/6 |
| EP | 0 767 563 A2 | 4/1997 | | 29/6 |
| EP | 0 818 753 A2 | 1/1998 | | 9/20 |

(List continued on next page.)

OTHER PUBLICATIONS

M. Barylak, Ultrix cluster communications services, Apr. 1995, Internet, pp. 1–2.*
M. Barylak, The Ultrix cluster, Apr. 1995, Internet, pp. 1–6.*
M. Barylak, The Vax Cluster, Apr. 1995, Internet, pp. 1–4.*
M. Barylak, X Terminals, Apr. 1995, Internet, p. 1.*

(List continued on next page.)

Primary Examiner—Krisna Lim
(74) Attorney, Agent, or Firm—Lahive & Cockfield, LLP

(57) ABSTRACT

The present invention relates to a method and apparatus for delivering events to local and remote servers. In one aspect, the invention relates to a method for communicating in a server system. The method includes the steps of providing a first server having a first plurality of subsystems and a first event bus, providing a second server having a second plurality of subsystems and a second event bus and posting to the first event bus, by one of the first plurality of subsystems, a local event having as its target another of the first plurality of subsystems. The method also includes the step of posting to the first event bus, by one of the first plurality of subsystems, a remote event having as its target one of the second plurality of subsystems.

In one embodiment, the method also includes the step of delivering, by the event bus, the local event to the target subsystem. In another embodiment, the method also includes the step of delivering, by the event bus, the remote event to a transport mechanism. In another embodiment, the method also includes the step of transmitting, by the transport mechanism, the remote event to the target subsystem using TCP/IP. In another embodiment, the method also includes the step of generating, by one of the first plurality of subsystems, an event for transmission to another subsystem.

20 Claims, 28 Drawing Sheets

U.S. PATENT DOCUMENTS

| | | |
|---|---|---|
| 5,031,089 A | 7/1991 | Liu et al. .................... 364/200 |
| 5,119,319 A | 6/1992 | Tanenbaum ................ 364/514 |
| 5,142,680 A | 8/1992 | Ottman et al. ............. 395/700 |
| 5,155,847 A | 10/1992 | Kirouac et al. ............ 395/600 |
| 5,175,852 A | 12/1992 | Johnson et al. ............ 395/600 |
| 5,187,790 A | 2/1993 | East et al. .................. 395/725 |
| 5,202,971 A | 4/1993 | Henson et al. ............. 395/425 |
| 5,204,897 A | 4/1993 | Wyman ........................ 380/4 |
| 5,241,625 A | 8/1993 | Epard et al. ............... 395/163 |
| 5,247,683 A | 9/1993 | Holmes et al. ............ 395/700 |
| 5,249,290 A | 9/1993 | Heizer ....................... 395/650 |
| 5,265,239 A | 11/1993 | Ardolino ................... 395/500 |
| 5,305,440 A | 4/1994 | Morgan et al. ............ 395/650 |
| 5,321,806 A | 6/1994 | Meinerth et al. |
| 5,325,527 A | 6/1994 | Cwikowski et al. ....... 395/650 |
| 5,329,619 A | 7/1994 | Pagé et al. ................. 395/200 |
| 5,341,477 A | 8/1994 | Pitkin et al. |
| 5,367,688 A | 11/1994 | Croll ......................... 395/700 |
| 5,440,719 A | 8/1995 | Hanes et al. ............... 395/500 |
| 5,455,953 A | 10/1995 | Russell |
| 5,457,797 A | 10/1995 | Butterworth et al. ...... 395/650 |
| 5,461,608 A | 10/1995 | Yoshiyama ................ 370/16.1 |
| 5,473,679 A | 12/1995 | Li et al. |
| 5,475,819 A | 12/1995 | Miller et al. |
| 5,483,466 A | 1/1996 | Kawahara et al. ......... 364/514 |
| 5,509,070 A | 4/1996 | Schull |
| 5,517,617 A | 5/1996 | Sathaye et al. ........... 395/200.1 |
| 5,526,349 A | 6/1996 | Diaz et al. |
| 5,526,492 A | 6/1996 | Ishida ..................... 395/200.09 |
| 5,537,548 A | 7/1996 | Fin et al. ................ 395/200.09 |
| 5,541,927 A | 7/1996 | Kristol et al. ............. 370/94.2 |
| 5,548,724 A | 8/1996 | Akizawa et al. |
| 5,548,761 A | 8/1996 | Balasundaram et al. |
| 5,553,242 A | 9/1996 | Russell et al. ......... 395/200.12 |
| 5,557,748 A | 9/1996 | Norris ..................... 395/200.1 |
| 5,561,769 A | 10/1996 | Kumar et al. .......... 395/200.05 |
| 5,566,302 A | 10/1996 | Khalidi et al. ......... 395/200.09 |
| 5,572,674 A | 11/1996 | Ernst ....................... 394/200.1 |
| 5,583,563 A | 12/1996 | Wanderscheid et al. ...... 348/13 |
| 5,583,992 A | 12/1996 | Kudo ..................... 395/200.03 |
| 5,586,312 A | 12/1996 | Johnson et al. ............ 395/610 |
| 5,592,626 A | 1/1997 | Papadimitriou et al. ...................... 395/200.09 |
| 5,594,490 A | 1/1997 | Dawson et al. ................ 348/6 |
| 5,596,745 A | 1/1997 | Lai et al. .................... 395/614 |
| 5,606,493 A | 2/1997 | Duscher et al. ............. 364/134 |
| 5,619,716 A | 4/1997 | Nonaka et al. ............. 395/800 |
| 5,644,720 A | 7/1997 | Boll et al. .............. 395/200.12 |
| 5,652,909 A | 7/1997 | Kodosky |
| 5,659,685 A | 8/1997 | Williams et al. |
| 5,680,549 A | 10/1997 | Raynak et al. .......... 395/200.12 |
| 5,706,437 A | 1/1998 | Kirchner et al. ........ 395/200.12 |
| 5,710,918 A | 1/1998 | Lagarde et al. ............. 395/610 |
| 5,721,876 A | 2/1998 | Yu et al. ..................... 395/500 |
| 5,734,865 A | 3/1998 | Yu .............................. 395/500 |
| 5,737,592 A | 4/1998 | Nguyen et al. ............. 395/604 |
| 5,745,692 A | 4/1998 | Lohmann, II et al. |
| 5,748,892 A | 5/1998 | Richardson ............. 395/200.3 |
| 5,748,896 A | 5/1998 | Daly et al. |
| 5,754,830 A | 5/1998 | Butts et al. .................. 395/500 |
| 5,758,085 A | 5/1998 | Kouoheris et al. ...... 395/200.61 |
| 5,761,507 A | 6/1998 | Govett ....................... 395/684 |
| 5,764,908 A | 6/1998 | Shoji et al. ............ 395/200.47 |
| 5,764,915 A | 6/1998 | Heimsoth et al. ...... 395/200.57 |
| 5,765,034 A * | 6/1998 | Recio ........................ 710/107 |
| 5,768,528 A | 6/1998 | Stumm |
| 5,774,642 A | 6/1998 | Flon et al. |
| 5,774,668 A | 6/1998 | Choquier et al. |
| 5,781,743 A | 7/1998 | Matsuno et al. |
| 5,784,070 A | 7/1998 | Furuhashi et al. |
| 5,802,258 A | 9/1998 | Chen ..................... 395/182.08 |
| 5,802,306 A | 9/1998 | Hunt ..................... 395/200.58 |
| 5,812,784 A | 9/1998 | Watson et al. ......... 395/200.57 |
| 5,819,093 A | 10/1998 | Davidson et al. ........... 395/704 |
| 5,826,027 A | 10/1998 | Pedersen et al. ....... 395/200.51 |
| 5,828,840 A | 10/1998 | Cowan et al. ........... 395/200.3 |
| 5,838,910 A | 11/1998 | Domenikos et al. ........ 395/200 |
| 5,838,916 A | 11/1998 | Domenikos et al. ... 395/200.49 |
| 5,859,978 A | 1/1999 | Sonderegger et al. |
| 5,862,346 A * | 1/1999 | Kley et al. .................. 709/245 |
| 5,862,348 A | 1/1999 | Pedersen |
| 5,864,678 A | 1/1999 | Riddle ................... 395/200.65 |
| 5,870,545 A | 2/1999 | Davis et al. ............ 395/200.31 |
| 5,889,942 A | 3/1999 | Orenshteyn ............ 395/187.01 |
| 5,913,060 A | 6/1999 | Discavage .................. 395/680 |
| 5,923,842 A | 7/1999 | Pedersen et al. ....... 395/188.01 |
| 5,928,324 A | 7/1999 | Sloan ........................ 709/203 |
| 5,938,732 A | 8/1999 | Lim et al. |
| 5,938,733 A | 8/1999 | Heimsoth et al. ........... 709/230 |
| 5,941,949 A | 8/1999 | Pedersen ..................... 709/227 |
| 5,941,988 A | 8/1999 | Bhagwat et al. ............. 713/201 |
| 5,949,975 A | 9/1999 | Batty et al. ............ 395/200.43 |
| 5,951,648 A | 9/1999 | Kailash |
| 5,951,694 A | 9/1999 | Choquier et al. ............. 714/15 |
| 5,961,586 A | 10/1999 | Pedersen ..................... 709/201 |
| 5,961,588 A | 10/1999 | Cooper et al. ............... 709/203 |
| 5,968,132 A | 10/1999 | Tokunaga et al. ........... 709/247 |
| 5,973,696 A | 10/1999 | Agranat et al. .............. 345/357 |
| 5,983,190 A | 11/1999 | Trower, II et al. .......... 704/276 |
| 5,999,179 A | 12/1999 | Kekic et al. ................. 345/349 |
| 6,014,133 A | 1/2000 | Yamakado et al. .......... 345/199 |
| 6,023,721 A | 2/2000 | Cummings .................. 709/201 |
| 6,023,722 A | 2/2000 | Colyer |
| 6,070,191 A | 5/2000 | Narendran et al. |
| 6,078,322 A | 6/2000 | Simonoff et al. |
| 6,108,712 A | 8/2000 | Hayes, Jr. ................... 709/246 |
| 6,115,040 A | 9/2000 | Bladow et al. |
| 6,115,743 A | 9/2000 | Cowan et al. |
| 6,115,753 A | 9/2000 | Joens |
| 6,125,387 A | 9/2000 | Simonoff et al. |
| 6,128,657 A | 10/2000 | Okanoya et al. |
| 6,134,568 A | 10/2000 | Tonkin ....................... 707/526 |
| 6,157,944 A | 12/2000 | Pedersen ..................... 709/204 |
| 6,170,017 B1 | 1/2001 | Dias et al. |
| 6,182,075 B1 | 1/2001 | Hsu |
| 6,219,700 B1 | 4/2001 | Chang et al. |
| 6,233,609 B1 | 5/2001 | Mittal |
| 6,247,052 B1 | 6/2001 | Huang et al. |
| 6,249,800 B1 | 6/2001 | Aman et al. |
| 6,263,368 B1 | 7/2001 | Martin |
| 6,272,522 B1 | 8/2001 | Lin et al. |
| 6,279,001 B1 | 8/2001 | DeBettencourt et al. |
| 6,327,608 B1 | 12/2001 | Dillingham |
| 6,330,591 B1 * | 12/2001 | Ducaroir et al. ............. 709/213 |
| 6,345,316 B1 | 2/2002 | Chessell et al. |
| 6,370,585 B1 * | 4/2002 | Hagersten et al. .......... 709/238 |
| 6,374,297 B1 * | 4/2002 | Wolf et al. .................. 709/226 |
| 6,377,975 B1 | 4/2002 | Florman |
| 6,393,484 B1 | 5/2002 | Massarani |
| 6,396,815 B1 | 5/2002 | Greaves et al. |
| 6,405,266 B1 | 6/2002 | Bass et al. |
| 6,412,079 B1 | 6/2002 | Edmonds et al. |
| 6,453,348 B1 * | 9/2002 | Barnier et al. ............... 709/225 |
| 6,457,040 B1 | 9/2002 | Mizuhara et al. |
| 6,463,460 B1 | 10/2002 | Simonoff |
| 6,477,559 B1 | 11/2002 | Veluvali et al. |
| 6,519,615 B1 | 2/2003 | Wollrath et al. |
| 6,535,879 B1 | 3/2003 | Behera |
| 6,536,000 B1 * | 3/2003 | Jackson et al. ................ 714/57 |
| 6,553,378 B1 | 4/2003 | Eschelbeck |
| 6,571,274 B1 | 5/2003 | Jacobs et al. |

| | | | | |
|---|---|---|---|---|
| 2001/0029578 | A1 * | 10/2001 | Delchini | ........................ 713/2 |
| 2002/0035451 | A1 | 3/2002 | Rothermel | |
| 2002/0065851 | A1 | 5/2002 | Watson et al. | |
| 2002/0091814 | A1 * | 7/2002 | Arendt et al. | ............... 709/223 |

FOREIGN PATENT DOCUMENTS

| | | | | |
|---|---|---|---|---|
| EP | 0 841 615 A2 | 5/1998 | | ................... 9/445 |
| EP | 0 878 759 A1 | 11/1998 | | ..................... 9/44 |
| GB | 2 323 946 A | 10/1998 | | ..................... 17/30 |
| JP | 06-332782 | 12/1994 | | |
| WO | 93/15457 | 8/1993 | | |
| WO | 94/14114 | 6/1994 | | |
| WO | 0 648038 A2 | 4/1995 | | |
| WO | 97/28623 | 8/1997 | | ................... 9/455 |
| WO | 98/52320 | 11/1998 | | |
| WO | WO 98/52344 A1 | 11/1998 | | |
| WO | WO 00/23879 A1 | 4/2000 | | |

OTHER PUBLICATIONS

"Constructing Reliable Distributed Communication Systems with CORBA" (pp. 56–60), Maffeis et al., IEEE Communications Magazine, vol. 35, No. 2, Feb. 1, 1997.

"Storage of User Preferences on a Per–User Basis", IBM Technical Disclosure Bulletin (p. 64), vol. 36, No. 1, Jan., 1993; © IBM Corp. 1993.

"Changing System Configuration for Shared Windows Application", IBM Technical Disclosure Bulletin (p. 505–506), vol. 37, No. 028, Feb., 1994; ©IBM Corp. 1994.

"Allocation of Equivalent Communication Buffer Sizes in SQLJRA Remote Protocol", IBM Technical Disclosure Bulletin, vol. 36, No. 1, Jan. 1993, © IBM Corp. 1993.

Liu et al., "Efficient Algorithms for Resource Allocation in Distributed and Parallel Query Processing Environments", IEEE Computer Soc. Press, Washington, D.C., USA, Jun., 1989.

R. Droms, "Dynamic Host Configuration Protocol" (pp. 1–39), Bucknell University, Oct. 1993.

Mann et al., "Terminal Servers on Ethernet Local Area Networks" (pp. 73–86), Digital Technical Journal, No. 3, Sep. 1986.

Adler, "Distributed Coordination Models for Client/Server Computing" (pp. 14–22), 8153 Computer, Apr. 28, 1995, No. 4, Los Alamitos, CA, US.

"OS/2 EE Database Manager SQJRA Remote Protocol" (pp. 33–35), IBM Technical Disclosure Bulletin, vol. 36, No. 1, Jan., 1993; © IBM Corp. 1993.

Prasad, Shashi; "Weaving a Thread" (pp. 173–174), Operating Systems Core Technologies, Byte, Oct. 1995.

Campbell et al., "Meeting End to End Qos Challenges for Scalable Flows in Heterogeneous Multimedia Environments" (pp. 101–115), Center for Telecommunications Research, Nov. 9, 1995.

"IP Multicast Streamlines Delivery of Multicast Applications" (pp. 1–5), Copyright 1995© Cisco Systems, Inc.

"Multicast Routing" (pp. 1–4), Copyright 1996© Cisco Systems, Inc.

"Distributed Cooperative Control for Sharing Applications Based on the Mermaid Multiparty and Multimedia Desktop Conferencing System" (pp. 122–131), Jan. 34, 1993; No. 1, Tokyo, JP.

"Remote Desktop Environments Reflected in Local Desktop Windows" (pp. 421–426), IBM Technical Disclosure Bulletin, Mar. 1993.

Orfali et al., "Instant Corba", Copyright© 1997 by John Wiley & Sons, Inc., New York.

"Windows NT Resource Kit for Version 3.5" (pp. 79–87), vol. 2 (Windows NT Networking Guide) of 5, part 1, chapter 5, Microsoft Press 1995.

Freeman, "Computer Processing of Line–Drawing Images" (pp. 57–97), Computing Surveys vol. 6, No. 1, Mar. 1974.

Jem, "'Thin' vs. 'Fat' Visualization Client" (pp. 772–788), IEEE, 1998.

Köppen et al. "A practical approach towards active hyperlinked documents" (pp. 251–258), Computer Networks and ISDN Systems, 30, 1998.

Abe et al. "Distributed Cooperative Control for Sharing Applications Based on the MERMAID Multiparty and Multimedia Desktop Conferencing System" (pp. 122–131), NEC Research & Development, vol. 34, No. 1, Jan. 1993.

Citron, D. et al. "Creating a wider bus using caching techniques." *1st IEEE Symposium on High–Performance Computer Architecture* pp. 90–99 (Jan. 22, 1995).

Evans, D.J. et al. "Load balancing with network partitioning using host groups." *Parallel Computing* 20:325–45 (1994).

von Hoff, A. "Java and Internet Programing." *Dr. Dobbs Journal* Aug. 1, 1995 pp. 26, 58, 60–61, 101–102.

International Business Machines "Workstation load leveling technique using buffer allocation" *IBM Technical Disclosure Bulletin* 30(7):357–359 (1987).

Ohmori T. et al. "Distributed cooperative control for sharing applications based on multiparty and multimedia desktop conferencing systems: MERMAID." *Proceedings of the IEEE: 12th International Conference on Distributed Computing Systems*, pp. 538–546 (1992).

Ohmori T. et al. "IPSJ SIGNotes Distributed Processing System Abstract No. 053–008: Distributed cooperative control for sharing applications based on multiparty and multimedia desktop conferencing system: MERMAID and its examples." retrieved from the internet at http://www.ipsj.or.jp/members/SIGNotes/Eng/05/1991/053/article008.html, 2 pages (1991).

Schemers, III, R.J. "lbnamed" retrieved from the internet at http://www.standford.edu/~schemers/docs/lbnamed/lb-named.html, 5 pages (1995).

* cited by examiner

METHOD AND APPARATUS FOR DELIVERING LOCAL AND REMOTE SERVER EVENTS IN A SIMILAR FASHION

FIELD OF THE INVENTION

The invention relates to server systems for use in a network of computers. More particularly, the invention relates to delivering events to local and remote servers.

BACKGROUND OF THE INVENTION

Client/server systems, in which the server executes one or more applications for a client, are similar to traditional multi-user systems such as UNIX. Graphically, these systems behave similarly to X-WINDOWS, a user interface standard for UNIX systems. A client/server system, such as the commercially available WINFRAME system manufactured by Citrix Systems, Inc. of Ft. Lauderdale, Fla., may include a number of application servers. Each application server may support multi-tasking of several applications that may be requested by a user at a remotely located workstation.

In order to minimize response time, maximize system throughput, and generally give the appearance that the user's application program is executing at the client, an administrator will often provide a user with access to a number of application servers that host the desired applications and are capable of servicing the user's requests. However, in order for such a system to operate efficiently, the application servers must dynamically coordinate access to system resources shared among the application servers as well as coordinate access to the application servers by the user. One way in which this is done is selecting one server from the group to act as the "master server." The master server is responsible for keeping track of resource usage both by users and application servers. However, as the number of applications servers grows larger, the administrative burden becomes significant, effectively limiting the size of these networks.

The present invention avoids this potential problem.

SUMMARY OF THE INVENTION

The present invention relates to a method and apparatus for delivering events to local and remote servers. In one aspect, the invention relates to a method for communicating in a server system. The method includes the steps of providing a first server having a first plurality of subsystems and a first event bus, providing a second server having a second plurality of subsystems and a second event bus and posting to the first event bus, by one of the first plurality of subsystems, a local event having as its target another of the first plurality of subsystems. The method also includes the step of posting to the first event bus, by one of the first plurality of subsystems, a remote event having as its target one of the second plurality of subsystems.

In one embodiment, the method also includes the step of delivering, by the event bus, the local event to the target subsystem. In another embodiment, the method also includes the step of delivering, by the event bus, the remote event to a transport mechanism. In another embodiment, the method also includes the step of transmitting, by the transport mechanism, the remote event to the target subsystem using TCP/IP. In another embodiment, the method also includes the step of generating, by one of the first plurality of subsystems, an event for transmission to another subsystem. In another embodiment, the method also includes the step of determining, by the event bus, the target subsystem for a posted event. In another embodiment, the step of determining also includes determining, by the event bus, the target subsystem for a posted event using a dispatch table.

In another aspect, the invention also relates to a client-server network. The client-server network includes a first server including a first plurality of subsystems and a first event bus and a second server including a second plurality of subsystems. One of the first plurality of subsystems posts to the first event bus a local event having as its target another of the first plurality of subsystems and posts to the first event bus a remote event having as its target one of the second plurality of subsystems.

In one embodiment, at least one subsystem on each server includes a transport subsystem, the transport subsystem transmitting remote events to a target subsystem. In another embodiment, the transport subsystem transmits remote events to a target subsystem using TCP/IP. In another embodiment, the system includes a transport mechanism that is associated with the event bus. In another embodiment, the event bus delivers local events to a target subsystem. In another embodiment, the event bus includes a dispatch table for determining the target for a posted event. In another embodiment, the event bus includes a data object. In another embodiment, at least one of the subsystems includes a data object.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

INDEX

The index below should help the reader follow the discussion of the invention:

1.0 System Overview
2.0 Server Farm Overview
   2.1 Persistent Store
   2.2 Dynamic Store
   2.3 Collector Points
   2.4 Server Zones
3.0 Server Overview
   3.1 Common Facilities Module
   3.2 Subsystem Communication Using the Event bus
      3.2.1 Event bus API
      3.2.2 Subsystem API
      3.2.3 Dispatch Table
   3.3 Direct Subsystem Communication
   3.4 Persistent Store System Service Module
   3.5 Dynamic Store System Service Module
   3.6 Service Locator System Service Module
   3.7 Subscription Manager System Service Module
      3.7.1 Local Subscription Table
      3.7.2 Remote Subscription Table
      3.7.3 Subscribe Function
      3.7.4 Unsubscribe Function
      3.7.5 PostNotificationEvent
   3.8 Host Resolution System Service Module
   3.9 Zone Manager System Service Module
      3.9.1 Assigning Ownership of Distributed Resources
      3.9.2 Assigning Ownership of Network Services
   3.10 System Module
   3.11 Loader
4.0 Server and Subsystem Initialization
5.0 Events
   5.1 Event Types
      5.1.1 Directed Events
         5.1.1.1 Request-And-Reply Events
         5.1.1.2 Notification Events
   5.2 Event Delivery Commands
6.0 Basic Examples
   6.1 PostEvent Command
   6.2 SendEventAndWait Command
   6.3 Managing Dynamic Data
7.0 Subsystems
   7.1 Transport Layer
   7.2 Group Subsystem
   7.3 Relationship Subsystem
   7.4 Load Management Subsystem
   7.5 License Management Subsystem
   7.6 User Management Subsystem
   7.7 ICA Browser Subsystem
   7.8 Program Neighborhood Subsystem
   7.9 Application and Server Subsystems
      7.9.1 Application Subsystems
         7.9.1.1 Common Application Subsystem
         7.9.1.2 Specialized Application Subsystem
      7.9.2 Server Subsystems
         7.9.2.1 Common Server Subsystem
         7.9.2.2 Specialized Server Subsystem
      7.9.3 Application Name Resolution
      7.9.4 Application Enumeration
      7.9.5 Server Enumeration
   7.10 Common Access Point (CAP) Subsystem
   7.11 Administration Subsystem
8.0 Administration Tool

DETAILED DESCRIPTION OF THE INVENTION 1.0 System Overview

Figure 1:
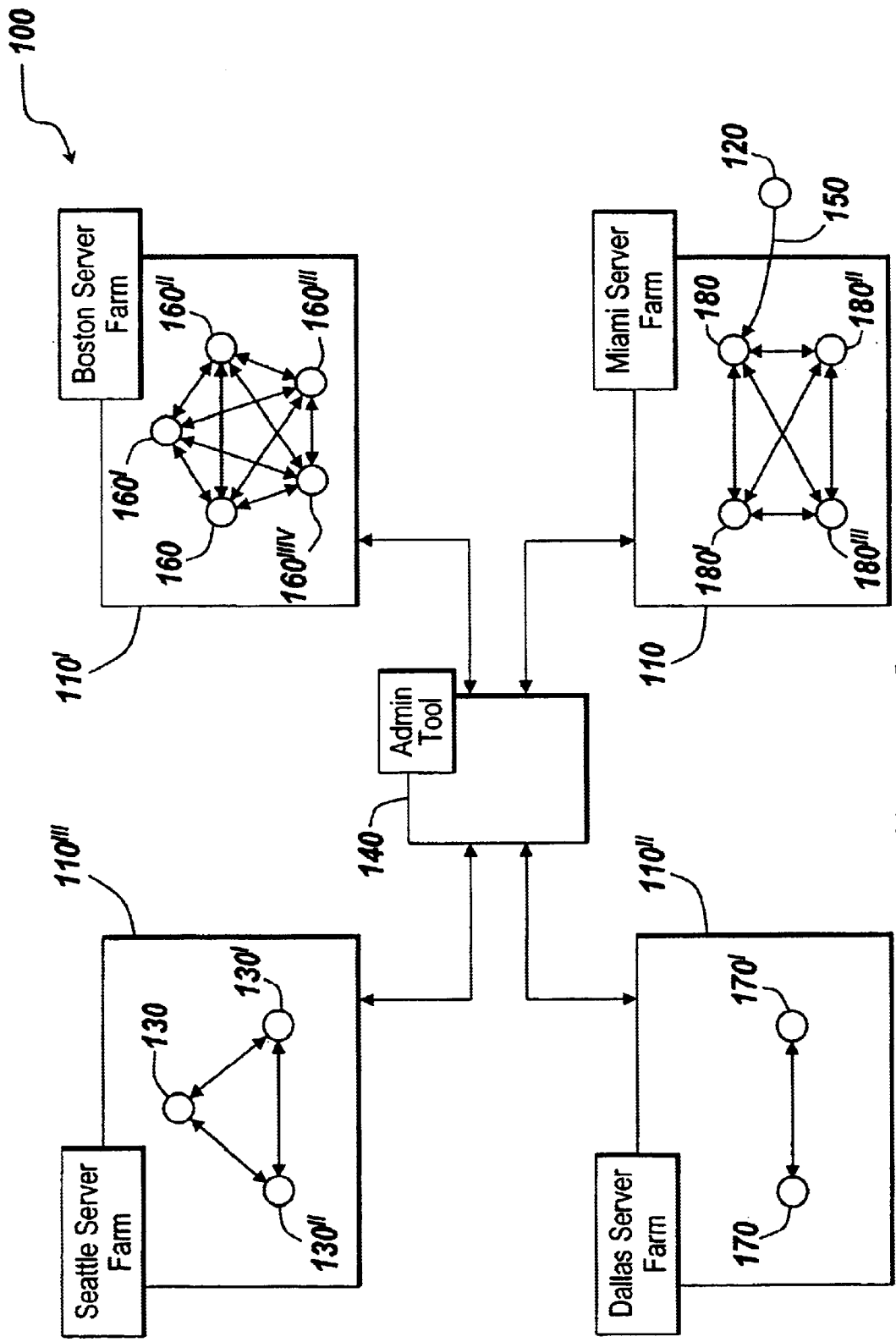
FIG. 1 is a block diagram of an embodiment of an enterprise system architecture comprising multiple server farms.

Referring now to FIG. 1, one embodiment of a system architecture 100 constructed in accordance with the invention is depicted, which includes four server farms 110, 110', 110", 110'" (generally 110), at least one client 120 in communication with one of the server farms 110, and an administration tool 140. Although only four server farms 110 and one client 120 are shown in FIG. 1, no limitation of the principles of the invention is intended. Such system architecture 100 may include any number of server farms 110 and have any number of client nodes 120 in communication with those farms 110.

Each server farm 110 is a logical group of one or more servers (hereafter referred to generally as server 180 or servers 180) that are administered as a single entity. The servers 180 within each farm 110 can be heterogeneous. That is, one or more of the servers 180 can operate according to one type of operating system platform (e.g., WINDOWS NT, manufactured by Microsoft Corp. of Redmond, Wash.), while one or more of the other servers 180 can operate on according to another type of operating system platform (e.g., Unix or Linux). The servers 180 comprising each server farm 110 do not need to be physically proximate to each other server 180 in its farm 110. Thus, the group of servers 180 logically grouped as a server farm 110 may be interconnected using a wide-area network (WAN) connection or medium-area network (MAN) connection. For example, a server farm 110 may include servers 180 physically located in different regions of a state, city, campus, or room. Data transmission speeds between servers 180 in the server farm 110 can be increased if the servers 180 are connected using a local-area network (LAN) connection or some form of direct connection.

By way of example, the client node 120 communicates with one server 180 in the server farm 110 through a communications link 150. Over the communication link 150, the client node 120 can, for example, request execution of various applications hosted by the servers 180, 180', 180", and 180''' in the server farm 110 and receive output of the results of the application execution for display. The communications link 150 may be synchronous or asynchronous and may be a LAN connection, MAN connection, or a WAN connection. Additionally, communications link 150 may be a wireless link, such as an infrared channel or satellite band.

As a representative example of client nodes 120 and servers 180 in general, the client nodes 120 and server 180 can communicate with each other using a variety of connections including standard telephone lines, LAN or WAN links (e.g., T1, T3, 56 kb, X.25), broad band connections (ISDN, Frame Relay, ATM), and wireless connections. Connections can be established using a variety of lower layer communication protocols (e.g., TCP/IP, IPX, SPX, NetBIOS, Ethernet, RS232, direct asynchronous connections). Higher layer protocols, such as the Independent Computing Architecture protocol (ICA), manufactured by Citrix Systems, Inc. of Ft. Lauderdale, Fla., or the Remote Display Protocol (RDP), manufactured by Microsoft Corporation of Redmond Wash., can be used to allow client 120 access to a server farm 110, such as access to applications residing on the servers 180.

2.0 Server Farm Overview

Figure 2A:
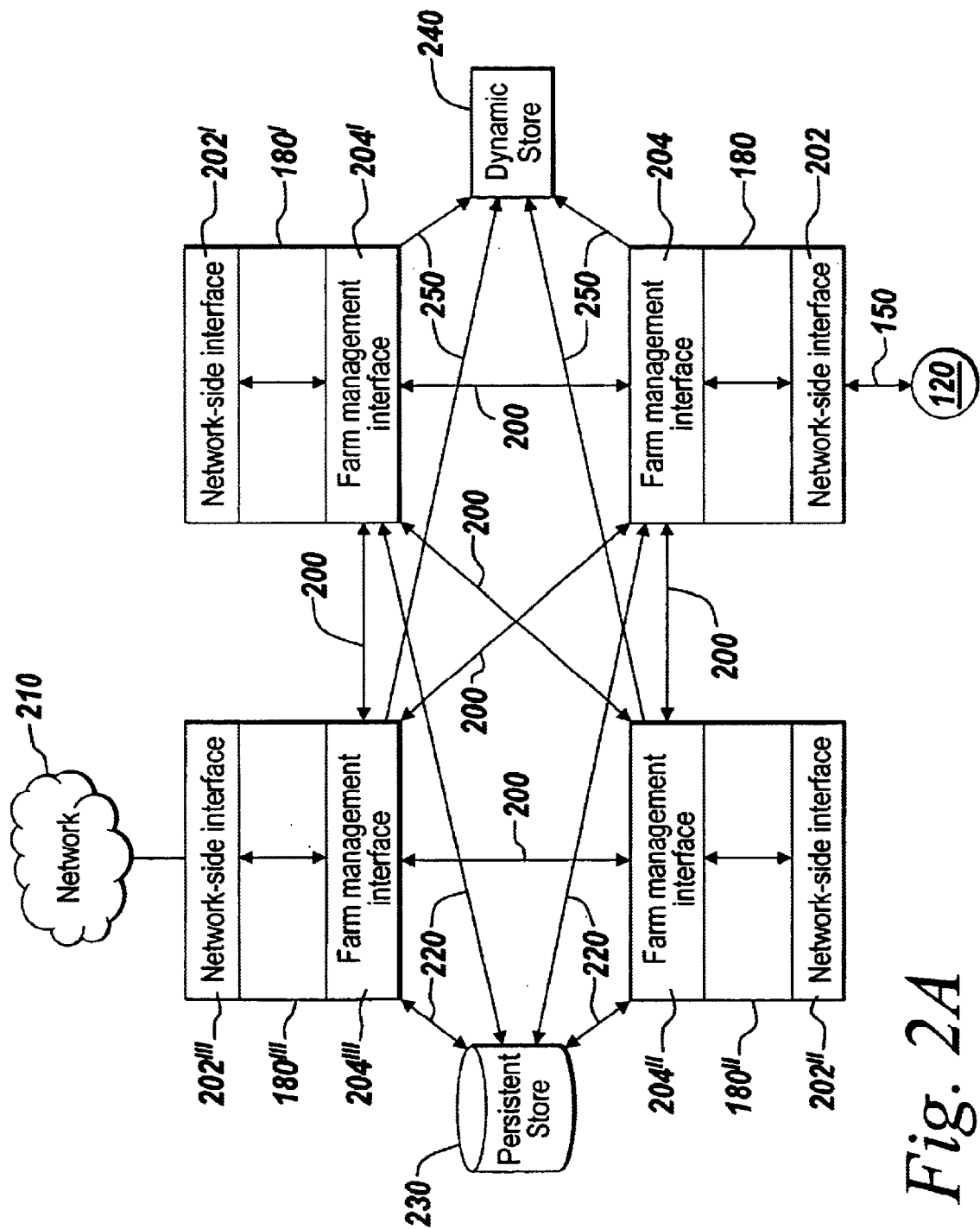
FIG. 2A is a block diagram of an embodiment of a server farm using the invention.

Referring now to FIG. 2A, the servers 180 comprising a server farm 110 each include a network-side interface 202 and a server farm-side interface 204. The network-side interfaces 202 of the server 180 may be in communication with one or more clients 120 or a network 210. The network 210 can be a WAN, LAN, or international network such as the Internet or the World Wide Web. Clients 120 may establish connections with the servers 180 using the network 210.

The server farm-side interfaces 204 of the servers 180 are interconnected with each over communication links 200 so that the servers may communicate with one another in accordance with the principles of the invention. On each server 180, the server farm-side interface 204 communicates with the network-side interface 202. The server farm-side interfaces 204 also communicate (designated by arrows 220) with a persistent store 230 and, in some embodiments, with a dynamic store 240. The combination of servers 180, the persistent store 230, and the dynamic store 240, when provided, are collectively referred to as a server farm 110.

2.1 Persistent Store

Persistent store 230 may be physically implemented on a disk, disk farm, a redundant array of independent disks (RAID), writeable compact disc, or any other device that allows data to be read and written and that maintains written data if power is removed from the storage device. A single physical device may provide storage for a plurality of persistent stores, i.e., a single physical device may be used to provide the persistent store 230 for more than one server farm 110. The persistent store 230 maintains static data associated with each server 180 in server farm 110 and global data used by all servers 180 within the server farm 110. In one embodiment, the persistent store 230 may maintain the server data in a Lightweight Directory Access Protocol (LDAP) data model. In other embodiments, the persistent store 230 stores server data in an ODBC-compliant database. For the purposes of this description, the term "static data" refers to data that do not change frequently, i.e., data that change only on an hourly, daily, or weekly basis, or data that never change. Each server uses a persistent storage subsystem 300, described in detail in section 7.1 below, to read data from and write data to the persistent store 230.

The data stored by the persistent store 230 may be replicated for reliability purposes physically or logically. For example, physical redundancy may be provided using a set of redundant, mirrored disks, each providing a copy of the data. In other embodiments, the database itself may be replicated using standard database techniques to provide multiple copies of the database. In further embodiments, both physical and logical replication may be used concurrently.

2.2 Dynamic Store

As described above, the servers 180 store "static" data, i.e., data that persist across client sessions, in the persistent store 230. Writing to the persistent store 230 can take relatively long periods of time. To minimize accesses to the persistent store 230, the servers 180 may develop a logical, common database (i.e., the dynamic store 240) that is accessible by all of the servers 180 in the farm 110 for accessing and storing some types of data. The dynamic store 240 may be physically implemented in the local memory of a single or multiple servers 180 in the server farm 110, as described in greater detail below. The local memory can be random access memory, disk, disk farm, a redundant array of independent disks (RAID), or any other memory device that allows data to be read and written.

In general, data stored in the dynamic store 240 are data that are typically queried or changed frequently during runtime. Examples of such data (hereafter referred to as runtime data) are the current workload level for each of the servers 180 in the server farm 110, the status of the servers 180 in the server farm 110, client session data, and licensing information.

In one embodiment, the dynamic store 230 comprises one or more tables, each of which stores records of attribute-value pairs. Any number of tables may exist, but each table stores records of only one type. Tables are, in some embodiments identified by name. Thus, in this embodiment, two servers 180 that use the same name to open a table refer to the same logical table.

In further embodiments, each table record is uniquely identified by name. The name of a record may be one of the attributes of the record. Records may also include a "type" attribute that is unique to the type of record. Records may be created, updated, queried, or deleted by any server 180. An example of a dynamic store record table relating to active client sessions appears below:

Table "Client Sessions"
ID_TYPE="AppName Session"
ID_USER="MarkT"
ID_XXX= . . .

2.3 Collector Points

The dynamic store 240 (i.e., the collection of all record tables) can be embodied in various ways. In one embodiment, the dynamic store 240 is centralized; that is, all runtime data are stored in the memory of one server 180 in the server farm 110. That server operates as a master network node with which all other servers 180 in the farm 110 communicate when seeking access to that runtime data. In another embodiment, each server 180 in the server farm 110 keeps a full copy of the dynamic store 240. Here, each server 180 communicates with every other server 180 to keep its copy of the dynamic store 240 up to date.

In another embodiment, each server 180 maintains its own runtime data and communicates with every other server 180 when seeking to obtain runtime data from them. Thus, for example, a server 180 attempting to find an application program requested by the client 120 may communicate directly with every other server 180 in the farm 110 to find one or more servers hosting the requested application.

For server farms 110 having a large number of servers 180, the network traffic produced by these embodiments can become heavy. One embodiment alleviates heavy network traffic by designating a subset of the servers 180 in a farm 110, typically two or more, as "collector points." Generally, a collector point is a server that collects run-time data. Each collector point stores runtime data collected from certain other servers 180 in the server farm 110. Each server 180 in the server farm 110 is capable of operating as, and consequently is capable of being designated as, a collector point. In one embodiment, each collector point stores a copy of the entire dynamic store 240. In another embodiment, each collector point stores a portion of the dynamic store 240, i.e., it maintains runtime data of a particular data type. The type of data stored by a server 180 may be predetermined according to one or more criteria. For example, servers 180 may store different types of data based on their boot order. Alternatively, the type of data stored by a server 180 may be configured by an administrator using administration tool 140. In these embodiments, the dynamic store 240 is distributed among two or more servers 180 in the farm 110.

Servers 180 not designated as collector points know the servers 180 in a farm 110 that are designated as collector points. As described in more detail below, a server 180 not designated as a collector point communicates with a particular collector point when delivering and requesting runtime data. Consequently, collector points lighten network traffic because each server 180 in the farm 110 communicates with a single collector point server 180, rather than with every other server 180, when seeking to access the runtime data.

2.4 Server Zones

Figure 2B:
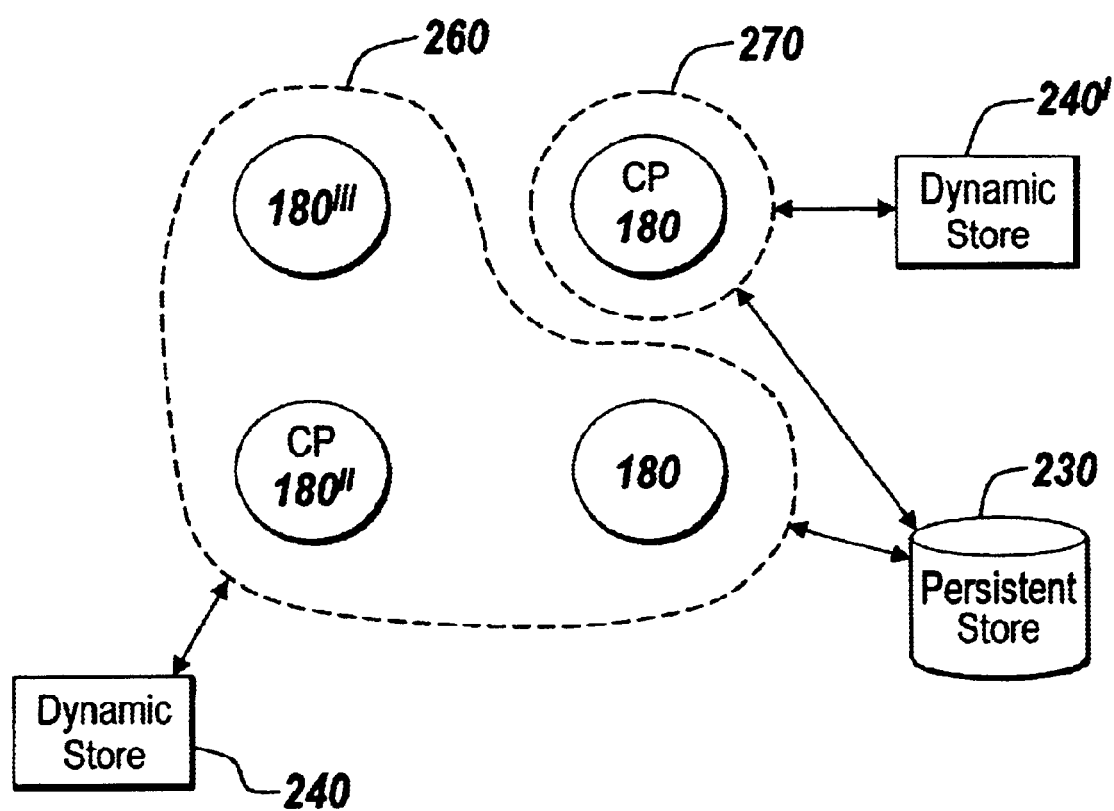
FIG. 2B is a diagram of an embodiment of the server farm of FIG. 2A logically organized in multiple zones of servers.

FIG. 2B shows an exemplary server farm 110 including servers 180, 180', 180", and 180''' organized into separate zones 260 and 270. A zone is a logical grouping of servers 180 within a server farm 110. In one embodiment, each zone 260, 270 includes its own dynamic store 240, i.e., the servers in each zone maintain a common database of run-time data. A zone 260, 270 includes a subset of the servers 180 in the server farm 110. In the embodiment shown in FIG. 2B, zone 260 includes servers 180', 180", and 180''', and zone 270 includes server 180.

The formation of each zone 260, 270 within a server farm 110 may be based upon network topology. For example, zone definitions can depend upon the geographic locations of the servers 180. Each server 180 determines the zone 260, 270 to which that server 180 belongs. In one embodiment, each server 180 determines its zone 260, 270 when first added to the server farm 110. In other embodiments, a server 180 may elect to join a different existing zone 260, 270 or start a new zone 260, 270 during run-time. In another embodiment, an administrator can establish and control the establishing of zones 260, 270 as well as assignment of servers 180 to zones 260, 270 through the administration tool 140. In still other embodiments, servers 180 may be logically grouped into zones based on one or more criteria such as IP address or lexical network name.

In one embodiment, each zone 260, 270 includes a server 180 that operates as a collector point for dynamically collecting a predetermined type of data from the other servers 180 in that zone 260, 270. Examples of types of data include licensing information, loading information on that server, load management data, server identification and status, performance metrics, total memory, available memory, subscription data (discussed in Section 3.5) and client session data. In the embodiment shown in FIG. 2B, servers 180" and 180 are the collector points for zones 260 and 270, respectively. In zone 260, for example, the collector point 180" receives run-time data from servers 180''' and 180'. The collected data is stored locally in memory at the collector point 180".

Each server 180 can operate as a collector point for more than one type of data. For example, server 180" can operate as a collector point for licensing information and for loading information. Also, multiple servers 180 may concurrently operate as collector points within a given zone 260, 270. In these embodiments, each collector point may amass a different type of run-time data. For example, to illustrate this case, the server 180''' can collect licensing information, while the server 180" collects loading information.

In some embodiments, each collector point stores data that is shared between all servers 180 in a farm. In these embodiments, each collector point of a particular type of data exchanges the data collected by that collector point with every other collector point for that type of data in the server farm 110. Thus, upon completion of the exchange of such data, each collector point 180" and 180 possesses the same data. Also in these embodiments, each collector point 180 and 180" also keeps every other collector point abreast of any updates to the runtime data. In some embodiments, multiple servers 180 in one zone 260, 270 function as collector points for a particular kind of data. In this embodiment, a server 180 broadcasts each change in the collected data to every other collector point in the farm 110.

In other embodiments, each collector stores information that is shared between servers 180 in a particular zone 260, 270 of a server farm 110. In these embodiments, because only one collector point per zone 260, 270 is necessary, no exchange of collected data occurs. Examples of collected data that are not shared outside of a particular zone 260, 270 include information relating to pooled zone licenses or client session data corresponding to disconnected sessions.

3.0 Server Overview

Figure 3:
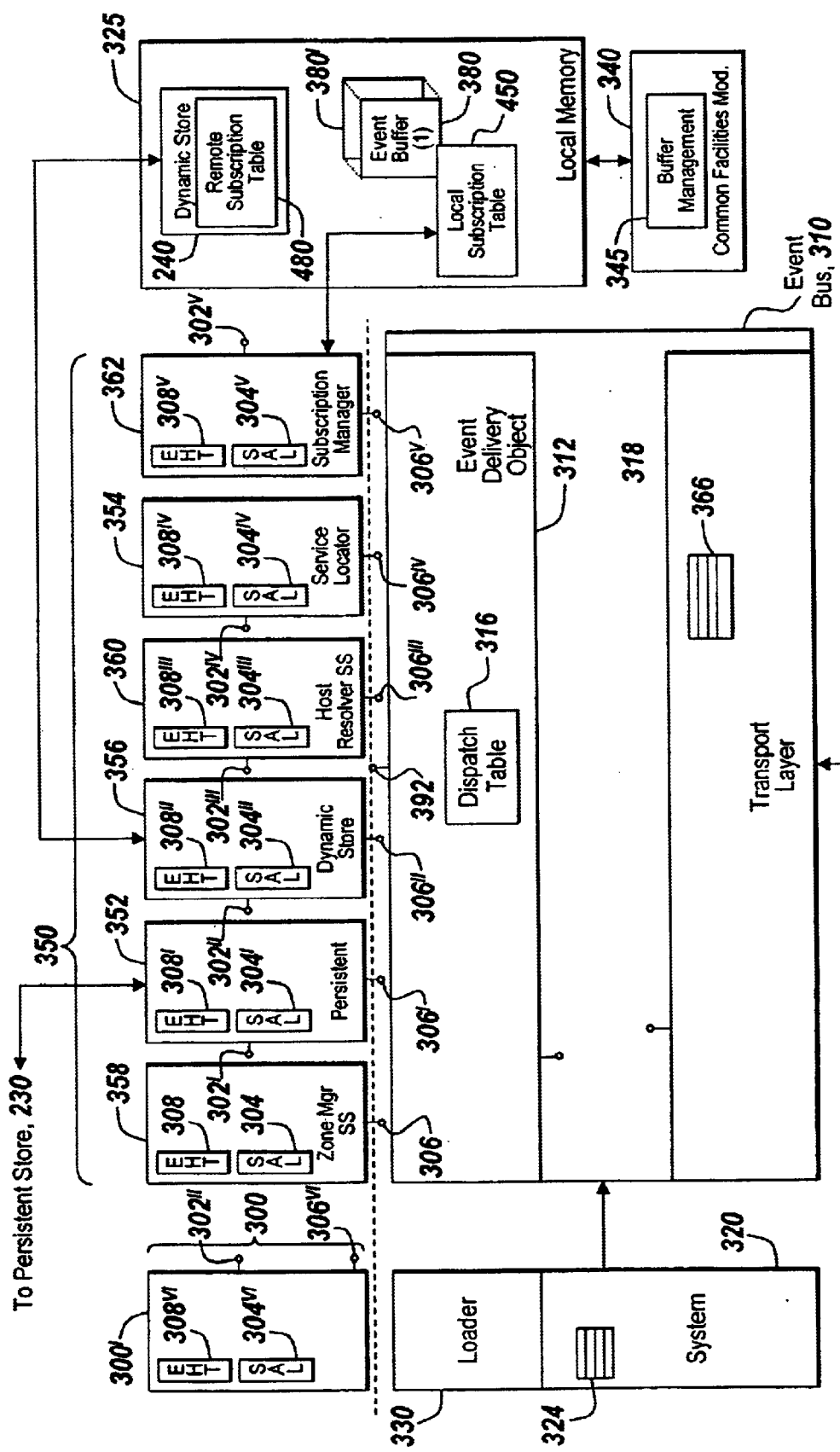
FIG. 3 is a block diagram of an embodiment of one server in the server farm of FIG. 2A, the server including a plurality of subsystems in communication with each other over an event bus.

In brief overview, FIG. 3 shows an embodiment of one of the servers 180 in the server farm 110. The server 180 includes an event bus 310, a system module 320, a loader module 330, a common facilities module 340, a plurality of system service modules 350, and one or more personality subsystems 300. In the embodiment shown in FIG. 3, system service modules 350 are provided as subsystems and include: a persistent store system service module 352; service locator system service module (hereafter, "service locator") 354; a dynamic store system service module 356; a zone manager system service module (hereafter, "zone manager") 358; a host resolution system service module (hereafter, "host resolver") 360; and a subscription manager system service module (hereafter, "subscription manager") 362, all of which are described in more detail below. In other embodiments, system service modules may be provided as WINDOWS NT services or daemons. Server 180 is a representative example of the other servers in the server farm 110 and of other servers in the server farms 110', 110", and 110'''.

Each personality subsystem 300 is a software module that provides particular behavior or functionality for the server 180, such as load management services. The particular set of subsystems 300 installed on each of the servers 180 define the behavior of each server 180 and, accordingly, of the server farm 110. Examples of personality subsystems useful in accordance with the present invention are: a group subsystem (described below in section 7.3), a relationship subsystem (described below in section 7.4), a load management subsystem (described below in section 7.5), a license management subsystem (described below in section 7.6), a user management subsystem (described below in section 7.7), an ICA browser subsystem (described below in section 7.8), a program neighborhood subsystem (described below in section 7.9), a specialized application subsystem (described below in section 7.10), a specialized server subsystem (described below in section 7.10), a common application subsystem (described below in section 7.10), and a common server subsystem (described below in section 7.10), a common access point subsystem (described below in section 7.11), and an administration subsystem (described below in section 7.12). The functionality of various subsystems 300, in another embodiment, is combined within a single subsystem. Also, the functionality of the server 180 is not intended to be limited to those subsystems 300 listed.

In general, the subsystems 300 communicate with one another, and with the system service modules 350 when they are provided as subsystems, by generating and transmitting event messages, also referred to throughout this specification as events, over the event bus 310. As used in this specification, the term "event" is broad enough to encompass any sort of message or packet that includes control information (such as the identity of the source subsystem and the destination subsystem) and payload data. Events are described in more detail in connection with FIGS. 7A–7B. Subsystems 300 may also communicate with system service modules 350 without using the event bus 310 using an internal API 302 provided by the system service modules 350. In one embodiment, each subsystem 300 is either a single-threaded or a multi-threaded subsystem. A thread is an independent stream of execution running in a multitasking environment. A single-threaded subsystem 300 is capable of executing only one thread at a time. A multithreaded subsystem 300 can support multiple concurrently executing threads, i.e., a multi-threaded subsystem 300 can perform multiple tasks simultaneously.

3.1 Common Facilities Module

The common facilities module 340 provides common, basic functionality useful to all subsystems 300 and system service modules 350 including, but not limited to, buffer management, multi-threaded framework services, unique identifier management, and data structure management. A multi-threaded framework facility provides services for managing semaphores and synchronizing with: semaphores; operating system events; and critical sections. A multithreaded framework also provides services for creating, starting, and stopping threads. In one embodiment, the multi-threaded framework facility is provided as a C++ or Java class. The common facilities module 340 may also provide functions allowing subsystems 300 to construct, destroy, and manage common data structures including queues, hash tables, linked lists, tables, security objects, and other standard data objects.

A buffer management facility 345 provides uniform data buffering services that each subsystem 300 uses to store events in event buffers 380, 380' (generally, 380). In one embodiment, the buffer management facility 345 is provided as a C++ base class. In another embodiment, the buffer management facility 345 is provided as a Java class. Examples of services that may be provided by the buffer management facility 345 include initialization, allocation, deallocation, resizing, and duplication of buffers.

In one embodiment, implementation of the event buffer 380 is in local memory 325 of the server 180, accessible by each of the subsystems 300 and the system service modules 350 of the server 180. In this embodiment, when a subsystem 300 generates an event, an event buffer 380 is dynamically created specifically to store that event. Although only two event buffers 380 are shown in FIG. 3, it should be understood that the number of event buffers 380 provided is limited only by the amount of local memory available for storing event buffers 380. Each subsystem 300 using the event maintains a reference pointer to the event buffer 380 storing the event. Pointers to an event buffer 380, rather than the event itself, are delivered from one subsystem 300 to another subsystem 300 to minimize the amount of information passing over the event bus 310. In this embodiment, the event buffer 380 maintains a reference count that allows each receiving subsystem 300 to determine if no other subsystem 300 is referencing the event stored in the event buffer 380. The recipient of an event may delete it from the event buffer 380 if no other subsystem is referencing that event.

In other embodiments, each subsystem 300 maintains its own copy of an event. The event buffer 380 allows its respective subsystems 300 to write the data relating to the event in the event buffer 380 and other subsystems 300 to read such data. When a subsystem 300 generates an event, an event buffer 380 is dynamically created specifically to store that event. In these embodiments, each subsystem 300 deletes an event from the event buffer 380 once it has read the event or when the event, or a pointer to the event, is transmitted to a remote server. This embodiment allows multiple subsystems 300 to access the same event information substantially simultaneously.

3.2 Subsystem Communication Using the Event Bus

The event bus 310 provides a communication path for conveying events between the subsystems 300 of the server 180 and for conveying events to subsystems 300 residing on other servers 180', 180", 180''' in the server farm 110. The event bus 310, in one embodiment, includes an event delivery object 312 and a transport layer 318. The event delivery object 312 delivers events between subsystems 300 on the same server 180 (i.e., local subsystems), and the transport layer 318 delivers events to subsystems on a different server 180', 180", 180''' (i.e., remote subsystems). The transport layer 318 uses a transport mechanism, such as TCP/IP, UDP/IP, HTTP, Ethernet or any other network transport protocol, to transmit or receive events to or from the transport layers of the other servers 180', 180", 180'''. In another embodiment, the transport layer 318 is implemented as another subsystem 300 that communicates with the other subsystems 300 of the server 180 over the event bus 310.

In one embodiment each subsystem "type" is assigned a predetermined identifier. In other embodiments, each subsystem generates, or is assigned, a globally unique identifier that uniquely identifies that subsystem zone-wide, farm-wide, enterprise-wide, or world-wide.

In some embodiments, each subsystem 300 has a unique subsystem identifier. In these embodiments, the event delivery object 312 includes a dispatch table 316 binding each subsystem identifier to a respective entry point associated with the subsystem 300. The event delivery object 312 dispatches events to the subsystems 300 using the entry point. In one embodiment, the entry point is an event queue (not shown) associated with the subsystem. In other embodiments, the entry point is a pointer to an API provided by a subsystem 300, described in section 3.2.2. In general, the event delivery object 312 passes an event pointer between subsystems 300 on the same server 180 so that the receiving subsystem(s) can access the location in local memory 325 (i.e., the event buffer 380) where the event is stored.

For embodiments in which event queues are used, events delivered by the event delivery object 312 to the corresponding subsystem 300 are stored in the event queue in the order such events are received from the event delivery object 312. To place events on the event queues, the event delivery object 312 calls a "QueueEvent" function. In one embodiment, the QueueEvent function accepts, as an input parameter, a pointer to the event buffer 380 representing the event to be placed on the event queue. In one embodiment, each event queue holds pointers to the event buffers 380 storing the events. Events (or the pointers to the respective event buffers 380) remain in the event queue until dispatched by the event delivery object 312 to the corresponding subsystem 300. Event queues allow the identity of the thread responsible for delivery of the event to change. That is, the identity of the thread dispatching the event to the subsystem 300 from the event queue can be different from the identity of the thread that originally placed the event on the event queue.

In an alternative set of embodiments, two event queues (not shown in FIG. 3) may be associated with each subsystem 300. In these embodiments, one event queue receives incoming events from the event delivery object 312 and the other receives outgoing events from the subsystem 300 to the event delivery object 312. In these embodiments, the event delivery object 312 retrieves an event from an outgoing event queue associated with a first subsystem and places the event on the incoming event queue associated with a target subsystem identified by the event delivery object.

The event delivery object 312 provides an interface (hereafter, event bus API) 392 (see section 3.2.1) through which each subsystem 300 communicates with the event delivery object 312 using a standard protocol. Each subsystem 300 can "plug-in" to the event bus 310 because such subsystems 300 conform to the standard protocol. Further, this standard protocol permits other subsystems 300 that may not be developed until after the server 180 is deployed in the network, to be readily added to the server 180 as long as those later-developed subsystems 300 adhere to the standard protocol of the event bus API 392. The event bus API 392 may be provided as a C++ class, JAVA class, or shared library.

Each subsystem 300 provides a dynamically linked library (DLL) that implements a subsystem access layer (SAL) 304, 304', 304'', 304''' (generally 304). Each SAL 304 defines application program interface (API) commands that may be used by other subsystems 300 to issue events to the subsystem 300 providing the SAL. SAL API functions use the event bus API 392 to create and send events to other subsystems 300 and system service modules 350 using the event delivery object 312. The SALs 304 of other subsystems in the server 180 are linked into the subsystem 300, e.g., using "include" and "library" files (i.e., ".h" files, ".dll" files, and ".lib" files) so that the subsystem 300 "knows" the events needed for interacting with those other subsystems 300.

Each subsystem 300 also includes an event handler table 308, 308', 308'', 308''' (generally 308), respectively. Each event handler table 308 maps events directed to that subsystem 300 to an event handler routine that is able to process that received event. These event handler routines provide the core functionality of the subsystem 300 and are implemented in the software of the respective subsystem 300. One of the event handler routines is called upon dispatch of an event to the subsystem 300 (e.g., through the SAL 304 or by the event delivery object 312).

The following are pseudo-code examples of named event handler routines that are called upon the occurrence of particular events. As described in more detail below, event handler routines, when called, always receive a pointer to an event buffer 380 storing the delivered event. In these examples, the name of each handler routine is arbitrary, but suggestive of the function performed by that handler routine.

OnGetSampleData(EventBuffer* pEvent);
OnGetSystemData(EventBuffer* pEvent);
OnSetSampleData(EventBuffer* pEvent);
OnEnumerateAdminToolObjects(EventBuffer* pEvent);
OnHostUp (EventBuffer* pEvent);
OnHostUpReply(EventBuffer* pEvent);

The following is a pseudo-code example of an embodiment of a handler table 308 that maps events to the list of example handler routines above. Each entry of the event handler table 308 is provided by an "EVENT_ENTRY" macro. The EVENT_ENTRY macro takes as parameters an identifier of the source subsystem, an identifier of the event sent by the source subsystem, and identifies the event handler routine that responds to the event. In one embodiment, event identifiers are integers that are assigned constant values in a header file (e.g., (EventID_Defs.h") provided at the time the application is compiled.

BEGIN EVENT HANDLER TABLE
   EVENT_ENTRY (SourceSubsystem, Event_GetSampleData, OnGetSampleData);
   EVENT_ENTRY (SourceSubsystem, Event_GetSystemData, OnGetSystemData);
   EVENT_ENTRY (SourceSubsytem, Event_SetSampleData, OnSetSampleData);
   EVENT_ENTRY (Administration Tool, Event_EnumerateAdminToolObjects, OnEnumerateAdminToolObjects);
   EVENT_ENTRY (SourceSubsytem, Event_HostUp OnHostUp);
   EVENT_ENTRY ((SourceSubsystem, Event_HostUpReply, OnHostUpReply);
END EVENT HANDLER TABLE 3.2.1 Event Bus API The event delivery object 312 provides an event bus API 392 that enables the subsystems 300 to direct events to the event delivery object 312. The event bus API 392 includes a "PostEvent" function. The PostEvent function permits a source subsystem 300 to send an event to the event delivery object 312 for subsequent delivery to a destination subsystem 300 on the server 180. As an input parameter, the PostEvent function includes a pointer to the event buffer 380 created to store that event. In other embodiments, the PostEvent function includes as other input parameters a source host identifier and a destination host identifier. In some embodiments, the event delivery object adds an event pointer to the event queue of the destination subsystem. In other embodiments, the event pointer bypasses the event queue and is dispatched directly to the destination subsystem 300. In one embodiment, once the event is dispatched to a destination subsystem 300, the PostEvent function immediately returns (i.e., the PostEvent function does not "block").

The PostEvent function may return a status value indicating the status of the event dispatch. For embodiments in which the event is dispatched to an event queue, the status value can indicate a failure to dispatch the event because the event queue associated with the target subsystem 300 is full.

In other embodiments, the PostEvent function may accept, as input, a timeout value. The timeout value specifies a period of time that, if it elapses without a successful event delivery, the PostEvent function will indicate that it has failed. For example, the event delivery object 312 may be unable to dispatch an event to an event queue or the event delivery object 312 may dispatch the event to the transport layer 318 for remote transmission. In these embodiments, the thread of execution responsible for dispatching the event suspends execution for an associated timeout period once the event is dispatched. The operating system notifies the thread when the timeout period elapses. If the thread has not been notified that the event has been successfully dispatched before expiration of the timeout period, event dispatch has failed.

In still other embodiments, the PostEvent function may accept as input multiple addresses identifying multiple targets for the event, such as multiple subsystems 300 on the same server 180 or subsystems 300 distributed among several servers 180 in the server farm 110.

In other embodiments, the event delivery object 312 provides an API function that allows a subsystem to "pull" events off an event queue associated with that subsystem 300. In these embodiments, events are delivered to an event queue by the event delivery object 312 for eventual processing by the associated subsystem 300.

3.2.2 Subsystem API

Each subsystem 300 provides an interface 306 that the event delivery object 312 uses to dispatch events to that subsystem 300. The subsystem API 306 for every subsystem 300 includes a "DispatchEvent" function. Using the DispatchEvent function, the event delivery object 312 "pushes" an event to the subsystem 300, i.e, the event delivery object 312 passes an event pointer to the subsystem 300 for processing by an event handler routine. For embodiments in which an event queue is associated with the subsystem 300, the DispatchEvent function pushes the event at the head of the queue to the subsystem 300 for processing by an event handler routine.

3.2.3 Dispatch Table

Figure 4A:
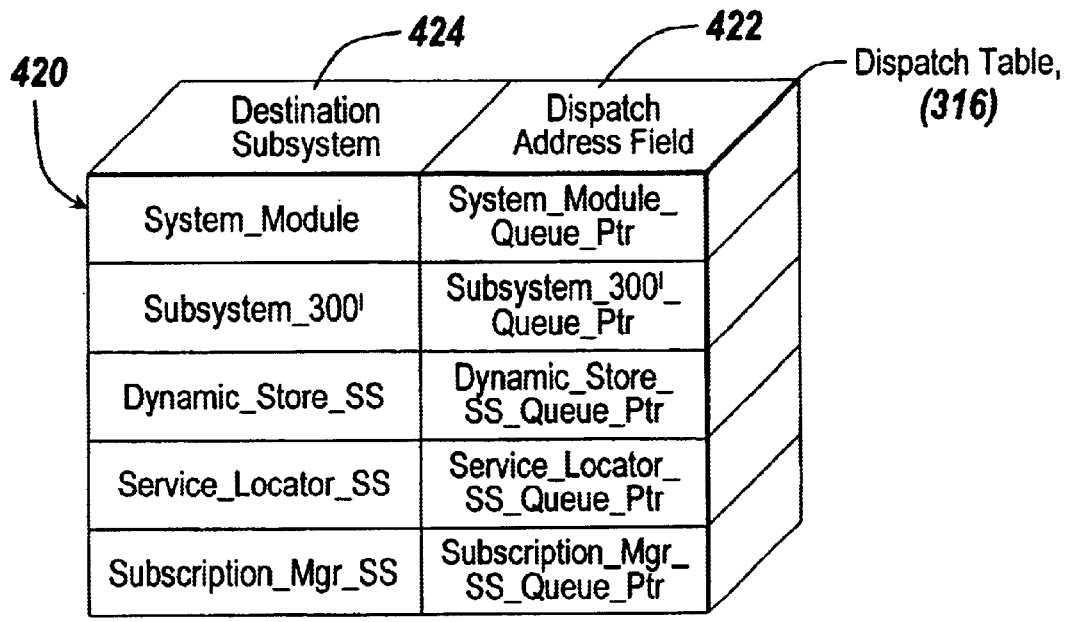
FIG. 4A is a diagram of an embodiment of a dispatch table used by the event bus to route events to subsystems on the server of FIG. 3.

The dispatch table 316 provides a routing mechanism for the event delivery object 312 to deliver events to the targeted subsystems 300 of the server 180. Referring to FIG. 4A, and in more detail, the dispatch table 316 includes an entry 420 for the system module 320 and each system service module or subsystem 300. Each entry 420 includes a destination subsystem field 424 and a dispatch address field 428 for mapping one of the subsystems 300, one of the system service modules 350, or the system module 320 to a dispatch address associated with that subsystem. In one embodiment, the dispatch address is the address of an event queue associated with the system module 320, one of the subsystems 300, or one of the system service modules 350. In some embodiments, the dispatch table 316 includes further information, such as a flag indicating whether the corresponding subsystem has been implemented to take advantage of multi-threaded execution (not shown). An exemplary mapping of subsystems 300, system module 320, and system service modules 350 to dispatch addresses is illustrated in FIG. 4A.

For purposes of illustrating this mapping, names corresponding to each of the subsystems 300, the system module 320, and the system service modules 350 appear in the destination subsystem field 424 and names corresponding to their associated dispatch addresses appear in the dispatch address field 428. It is to be understood that the implementation of the dispatch table 316 can use pointers to the addresses of the destination subsystems 300, system module 320, system service modules 350, and corresponding dispatch addresses. The event delivery object 312 populates the entries 420 of the dispatch table 316 with mapping information during the initialization of the server 180.

3.3 Direct Subsystem Communication

In some embodiments, subsystems 300 communicate directly with system service modules 350 without using the event bus 310. In these embodiments, the system service modules 350 provide an internal API 302 that may be directly called by subsystems 300 resident locally, i.e., on the same server 180. The internal API 302 may provide the same function calls as the event bus API 392 described above. Alternatively, the internal API 302 may provide a subset or a superset of the functions provided by the event bus API 392.

3.4 Persistent Store System Service Module

As described above in connection with FIGS. 2A and 3, a persistent store 230 is used by servers 180 to maintain static data. A persistent store system service module 352 serves as the mechanism that allows other subsystems 300 to access information from the persistent store 230. The persistent store system service module 352 translates subsystem requests into database requests. In one embodiment, the database merges a plurality of distributed storage systems together to form the persistent store 230. For example, the database may be provided as an ORACLE database, manufactured by Oracle Corporation, of Redwood City, Calif. In other embodiments, the database can be a Microsoft ACCESS database or a Microsoft SQL server database.

The persistent store system service module 352 services data requests or writes to the persistent store 230 that are received from a variety of potentially disparate requesting entities. The requesting entities reside on servers 180 that are part of the same server farm 110 as the persistent store 230. The requesting entities may also reside on platforms that are normally incompatible with that of the database providing the persistent store 230.

In order to service data requests from disparate entities, the persistent store system service module 352 translates requests made using an external data model into a database request using the internal data model used by the database providing the persistent store 230. Each of the requesting entities incorporates their particular external data model in an event that is transmitted to the persistent store system service module 352. In some embodiments, the internal data model closely approximates the external data models so that elements of the internal data model may be used as primitive blocks in building the external data model when responding to a request.

The persistent store system service module 352 essentially converts an event message submitted by the requesting entity in an external data model format into a locally understood internal data model format, and vice versa, in order to service the request. The internal and external data models supported by the persistent store system service module 352 can, for example, correspond to the lightweight directory access protocol (LDAP) data model or other protocol or database formats. The ability to convert external data models from a number of different requesting entities into a single internal data model (and vice versa) enables the persistent store system service module 352 to provide uniform access to data stored on the persistent store 230.

The information typically stored on the persistent store 230 includes, for example, system configuration information, security information, application settings common to a particular server farm 110, application hierarchy, common application objects, and unique identifiers for each stored object. In one embodiment, the stored information can be organized as entries that represent certain objects, such as a server 180, a subsystem 300, or a user. Each entry includes a collection of attributes that contain information about the object. Every attribute has a type and one or more values. The attribute type is associated with a particular syntax that specifies the kind of values that can be stored for that attribute.

In one embodiment, the objects in the persistent store 230 may be stored in a database file and, in this embodiment, the persistent store 230 maybe searched using traditional database requests. In another embodiment, the distinguished name of the requested data as specified by the external data model is mapped to the implicit or pre-defined schema stored on the persistent store 230. The pre-defined schema may include one or more fields that allow the objects within the database to be arranged as a tree data structure (e.g., a binary tree). For example, each entry in the persistent store 230 may include a "ParentID" field, a "NodeID" field, and a "Node Name" field as shown in Table 1 below, which allow the persistent store 230 to be searched as a tree data structure. For this embodiment, every object stored in the persistent store 230 may have an attribute that specifies the location of the object in the tree. This location can be an absolute position in the tree with respect to the root node or relative to the locations of other objects in the tree (e.g., relative to a parent node). Table 1 illustrates an exemplary arrangement of objects in the persistent store 230 that can be traversed like a tree:

TABLE 1

| Parent Node ID | Node ID | Node Name |
|---|---|---|
| none | 0 | Root (implied) |
| 0 | 1 | farm_1 |
| 0 | 2 | farm_2 |
| 1 | 3 | Authorized_users |
| 2 | 4 | Authorized_users |
| 3 | 5 | user_1 |
| 4 | 6 | user_1 |

To avoid having to traverse the entire tree upon each access to an object in the persistent store 230, a requesting subsystem 300 can dynamically bind to a particular node in the tree to serve as a starting point for traversing the tree. The particular node in the tree depends upon the type of subsystem. Generally, each subsystem 300 owns part of the tree, that is, the subsystem owns those objects that it stored in the tree. Thus, the particular node can operate as a root node for objects that the subsystem owns and a starting point from which to traverse those objects. For example using Table 1, a subsystem 300 can bind to the authorized_users node to serve as a starting point for searching for a particular user.

As an illustrative example, consider that the administration tool 140 wants to authenticate whether a remote user of the server farm 110 is authorized to access an application program on a particular server 180 that is part of that server farm 110. The administration tool 140 directs an administration subsystem (not shown) to send an event message to the persistent store system service module 352 via the service locator 354 and the event delivery object 312 to obtain the desired information. The persistent store system service module 352 receives and parses the event message to obtain the distinguished name of the entry (described below) and attributes that are being requested.

The format of the distinguished name corresponds to the external model used by the administration subsystem when forming the event message. An example of such a distinguished name is "root/farm_name/authorized_users/user_1." Assuming that the contents of the persistent store 230 are organized into a single tree, the persistent store system service module 352 traverses the tree to obtain information about the authorized users of that particular application. The persistent store system service module 352 traverses "down" the tree to determine whether the last node traversed matches the distinguished name (in this case, whether the user_1 is included as an authorized user). In this manner, as long as the distinguished name in the external model maintains a hierarchical order that corresponds to a tree structure (internal model) in the persistent store 230, the individual/arbitrary formats of each element of the distinguished name do not need to be analyzed.

Data ownership and security issues are also important considerations when sharing a common persistent storage environment across multiple subsystems (requesting entities). The subsystem 300, which is the source of the data, sets the access restrictions via the SAL API of the persistent store system service module 352 that limit the exposure of the data to an authorized subset of requesting entities via the SAL API.

3.5 The Dynamic Store System Service Module

The dynamic store 240 operates as a global database that stores records accessible by each server 180 in a zone 260, 270. In one embodiment, each stored record is an attribute-value pair. An example of an attribute is subsystem identifier; an example of a value is the actual subsystem ID number. Each subsystem 300 that uses the dynamic store 240 defines the schema of the records that are created and stored for that subsystem type. Different subsystems generally have different schemas. The first call that a subsystem 300 makes to the dynamic store 240 registers the schema that subsystem will use. Subsequently, all subsystems 300 of the same subsystem type that register with the dynamic store 240 can access the records created according to that registered schema. As part of registering the schema, a subsystem 300 can specify which attributes may be used for searching. In one embodiment, a subsystem 300 identifies one or more attributes that will be frequently used to search the record table.

In one embodiment, each record is stored by both the server 180 creating the record as well as the server 180 responsible for storing records of that type. For embodiments in which more than one zone 260, 270 exists in a farm 110, a record is stored on a server 180 in each zone 260, 270 identified by the zone master of each zone as the server 180 that stores records of that type. The server 180 creating the record essentially acts as redundant storage for the table record. In some embodiments, the table owner updates the server 180 creating the record with subsequent changes to the record. Within a zone 260, 270 the definitive authority as to the correct value of a table record is the table owner, i.e., the server 180 chosen by the zone master to store data records of that type. Between zones, the definitive authority as to the correct value of a table record is the table owner in the zone from which the record originated. Although there are definitive authorities as to the correct value for a table record, no definitive authority exists as to the contents of a table—a table's contents are the union of all table records stored throughout the farm 110.

Each server 180 in the server farm 110 has a dynamic store system service module 356 that handles all calls from subsystems 300 to the dynamic store 240. The dynamic store system service module 356 permits each subsystem to perform database operations on the dynamic store 240. The operations are: (1) to insert a record, (2) to delete a record, (3) to search the dynamic store 240 to retrieve all records satisfying certain specified criteria, and (4) to update one or more values for attributes in an existing record.

When a record is inserted into a table or when a record is updated, the server 180 requesting the change locally stores the record and forwards it to the owner of the table. The name of the server changing or creating the record can be added as an attribute to the record to facilitate informing that server of subsequent changes to the record that may be effected by other servers 180 in the farm 110.

The requesting server 180 uses its local copy of the record if the table owner changes unexpectedly, for example, if the table owner crashes. When the zone manager detects this problem and designates a new table owner, the servers 180 in the server farm 110 upload locally-stored table records to the new owner.

Records can be queried based on attribute, and any number of records may be returned from a query. When a server 180 receives a query request, it forwards the request to the table owner, which performs the search and returns the results. The server that originated the query may cache the search results depending on various criteria such as configuration or record consistency parameters.

The delete operation is similar to a query, in that any valid search parameters can be used to specify which records to delete. This allows for operations such as "delete all records from host ABC."

Just as with a query request, the delete request is forwarded to the appropriate table owner. Since some of the records being deleted may have been created on the requesting server, the table owner returns a list of the records that were actually deleted. This allows the local server 180 to delete locally-stored records.

In one embodiment, when a subsystem 300 registers its schema (i.e., defines the data structure) with the dynamic store 240, that subsystem 300 also supplies one or more parameters that specifies usage information about records. One such parameter controls "update latency," that is, the frequency at which the records are updated. Every subsystem 300 on every server 180 can independently determine this frequency and therefore every server 180 in the server farm 110 can see the same information in the records associated with that subsystem 300.

Another parameter is the "time to live after originating host is no longer present." This parameter is useful for maintaining the record although the originator of the record is no longer active. When the time to live is set to zero, the record is deleted immediately after the absence of the originating host is detected by the record owner, i.e., the collector point responsible for collecting records of that type. The record owner is the only subsystem entitled to delete this record. Yet another parameter is a "time to live" parameter that results in automatic deletion of a record by the dynamic store system service module 356 when the "time to live" is exceeded. Time starts from the insertion of that record into the dynamic store 240.

Through communication among the servers in the server farm 110, there is a dynamic election of a master server in every zone defined in the server farm 110. After the master server is elected, all other servers in the zone know the identity of the master server, as described in more detail below.

At least one copy of every record in the dynamic store 240 exists in each zone. In one embodiment, the master server of the zone stores every record in memory local to that master server. In another embodiment, the master server distributes the dynamic store 240 in the local memory 325 of some or all of the servers 180 in the zone based on record type. The determined server is thus designated as the collector point for that record type.

Should one of the servers in the server farm fail, the master server chooses a new server in the zone to hold the type of records that the failed server previously held. This new server requests an update of those records from every other server in that zone to replace the records that became inaccessible when the server failed. Because every server keeps a copy of the records that pertain to that server, the update restores the content of the dynamic store 240. If the master server fails, any server in the zone that detects the absence of the master server initiates an election for a new master server.

In one embodiment, master servers are the only servers that know the master servers of the other zones 260, 270. To obtain this information, each master server queries every server in each other zone 260, 270, seeking a response that identifies the master server of that zone 260, 270. Zones are preconfigured, and the identity of servers associated with zones 260, 270 is stored in the persistent store 230. Periodically, each master server of a zone 260, 270 sends the records in the dynamic store 240 for that zone 260, 270 to the master servers in the other zones 260, 270. In another embodiment, each server that holds the records sends a copy of those records to corresponding servers in the other zones 260, 270. Such servers determine who are the corresponding servers in the other zones 260, 270 from information collected by the master server of its own zone 260, 270.

3.6 Service Locator System Service Module

Referring again to FIG. 3, the service locator 354 is in communication with each subsystem 300 over the event bus 310 (or via its internal API). The service locator 354 identifies a server 180 for servicing events issued to other subsystems 300. The identified server 180 can be local or remote. In brief overview, a source subsystem 300 may create or issue an event for which the host of the destination subsystem is not determined before the source subsystem 300 issues the event. In these cases, the source subsystem 300 uses either a SAL API call or an internal API call provided by the service locator 354 to either (1) obtain the address of the server 180 hosting the destination subsystem 300 or (2) request that the service locator 354 deliver an event to the destination subsystem 300 on behalf of the source subsystem 300.

The service locator 354 identifies a destination host by accessing information maintained in the dynamic store 240 through the dynamic store system service module 356 (see section 3.5). This information provides a zone-wide inventory of the server components in the server farm 110; that is, the information indicates which subsystems (and the versions of those subsystems) are installed on every server 180 in the server zone 260, 270. This information also indicates which of such servers 180 in the zone 260, 270 are currently operating. Thus, through this information, the service locator 354 has knowledge of all available subsystems 300 in the zone 260, 270.

Every server 180 in the server farm 110 has a service locator 354 that contributes to the zone-wide information in the dynamic store 240. For example, when a server 180 becomes operational, each subsystem 300 installed on the server 180 registers with the service locator 354. In one embodiment, the service locator 354 provides a "RegisterService" function that may be called by a subsystem (either through the SAL API or the internal API of the service locator 354) in order to register services that it can provide to other subsystems. In one embodiment, subsystems 300 register with the service locator 354 each version of each event that the subsystem 300 will process. In another embodiment, the RegisterService function also accepts as a parameter a rank value, which indicates the relative importance of the subsystem 300. Upon receipt of the registration message, the service locator 354 makes an entry into the dynamic store 240 for that subsystem 300. The entry includes the information provided by the subsystem, such as its identifier and its rank, when provided. Table 2 below depicts one embodiment of a table stored in the dynamic store 240.

TABLE 2

| Subsystem ID | Rank | Zone | Host ID |
|---|---|---|---|
| FFFF | 1 | A | 0015 |
| AAAA | 0 | A | 0012 |
| FFFF | 1 | A | 0009 |
| AAAA | 0 | A | 0006 |

When a server 180 shuts down in a controlled fashion, it is removed from the zone 260, 270, and an "UnregisterService" call is made to the service locator 354 by each subsystem 300 resident on that server 180. This call informs the service locator 354 that those subsystems are no longer present in the zone 260, 270. In some embodiments, the service locator 354 instructs the dynamic store 240 to discard records associated with a server 180 that terminates execution unnaturally, e.g., crashes.

To determine the target host for servicing an event, the service locator 354 determines certain information: (1) which servers 180 host the type of subsystem 300 identified in the event as the destination subsystem, and (2) which of such servers 180 is the target host for handling the event. Upon determining the target host, the service locator 354 either returns the determined address to the requesting subsystem 300 or it modifies a received event to include the determined address as the addressing information for the event and it delivers the modified event to the event bus 310 for delivery to that host.

Referring back to Table 2, an embodiment of a table stored in the dynamic store 240 by service locators 354 is shown that includes entries for two subsystems (having identifiers FFFF and AAAA). Each entry includes a subsystem identifier, a subsystem rank, a zone identifier, and a host identifier. The service locator 354 receives a request for an address (or a request to deliver an event to a host) and accesses the table stored in the dynamic store 240. In some embodiments, the service locator 354 provides two function calls that return a target host identifier to the requesting subsystem 300: "GetBestHost," which returns the host identifier associated with a host that can handle a particular type of event; and "GetBestHostFromList," which returns a target host identifier selected from an input list of hosts. If the table has only one entry for which the subsystem identifier matches the subsystem identifier provided in the API call, the host identifier from that table entry is returned to the requesting subsystem 300. If more than one table entry has a matching subsystem identifier, i.e., there is more than one host in the zone that can process the subject event, a host identifier is selected based using a predetermined rule or set of rules. For example, a host identifier may be selected at random, in round-robin order, based on the rank associated with the table entry, or based on other information that may be stored in table such as network latency to host, available bandwidth of channel between requesting subsystem 300 and target host, or geographic proximity to the requesting subsystem 300.

The service locator 354 may also provide API calls for sending an event to the target host on behalf of the requesting subsystem 300. In these embodiments, if only one of the other servers in the zone can process the identified message, i.e., there is only one entry in the table, then the service locator 354 inserts the host identification of that server into the event and sends the modified event to the event bus 310 for delivery to the target host. If more than one other server in the zone has the destination subsystem, then the service locator 354 chooses one of the servers using any of a variety of criteria as described above, modifies the event as described above, and transmits the modified event to the target host.

Using Table 2 as a specific example, a subsystem 300 may issue a GetBestHost call for a subsystem having an identifier of "FFFF." Two servers host that subsystem, identified by an identifier of 9 and 15. The identifier corresponding to either of these hosts may be returned to the requesting subsystem. In one embodiment, the system administrator can force one of the two subsystems to be elected by changing the "rank" values in the table. For example, if the entry associated with host "15" has a higher rank than the entry associated with host "9," host "15" may always be selected as the target host.

3.7 Subscription Manager System Service Module

The subscription manager 362 manages subscriptions for a server 180. A subscription is a standing request by which a subscribing subsystem 300 publicizes to the subscription manager 362 of the local server and/or to the subscription managers of remote servers that the subscribing subsystem wants to be notified upon the occurrence of an event. The registered subscription identifies the event and the subscribed-to subsystem that produces the event. Upon the occurrence of that event, the subscription manager 362 sends the event to any subsystem that has registered a subscription to that event by way of the event delivery object 312.

The subscription manager 362 uses two tables for managing subscriptions: (1) a local subscription table 450, and (2) a remote subscription table 418.

3.7.1 Local Subscription Table

The local subscription table 450 resides in local server memory 325 and stores subscriptions for which the specified scope is local. Using the local subscription table 450, the subscription manager 362 can alert local subsystems 300 of the occurrence of particular events on the server 180. Any local subsystem 300 on any server 180 can request to be notified when a particular subsystem issues a particular event by posting a subscription for that occurrence in the local subscription table 450.

Figure 4B:
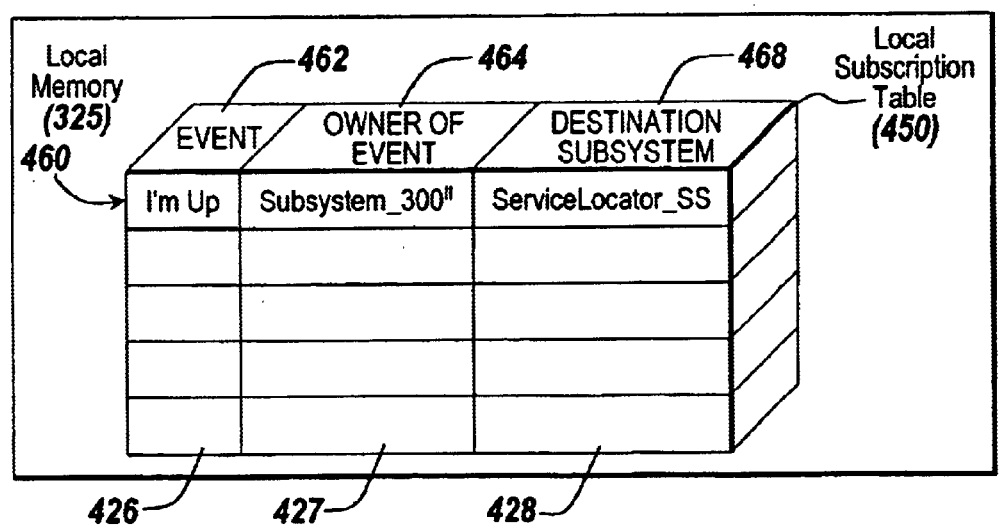
FIG. 4B is a diagram of an embodiment of a subscription table used by the server of FIG. 3 to route events to subsystems on the same server.

Referring to FIG. 4B, and in more detail, the local subscription table 450 includes an entry 460 for each posted subscription. In one embodiment, each entry 460 of the local subscription table 450 includes event field 462 identifying a unique event, a subsystem field 464 identifying the subsystem that owns (i.e., generates) the unique event, and a destination subsystem field 468 identifying the subsystem 300 subscribing to the unique event. An exemplary local subscription is illustrated in FIG. 4B in which subsystem 300 seeks to be notified when subsystem 300' posts an "I'm Up" event to the event delivery object 312. For purposes of illustrating this subscription, names corresponding to the subsystem 300' and the service locator 354 appear in the fields 464 and 468, respectively, but the actual implementation of this subscription can use pointers to such subsystem 300' and service locator 354.

3.7.2 Remote Subscription Table

A remote subscription table 480 is stored in the dynamic store 240 and stores subscriptions registered by specific remote servers or having a scope specified as zone or farm-wide. Placing such subscriptions in the dynamic store 240 makes the subscriptions accessible farm-wide by subscription managers 362 of every other server 180 in the server farm 110. In one embodiment, shown in FIG. 4C, the remote subscription table 480 is implemented as three separate tables: a first table 480' stores subscriptions to events that may occur in the same "zone," a second table 480" stores subscriptions to events that may occur anywhere in the server farm 110, and a third table 480''' stores subscriptions to events that may occur on a specifically identified remote host.

Figure 4C:
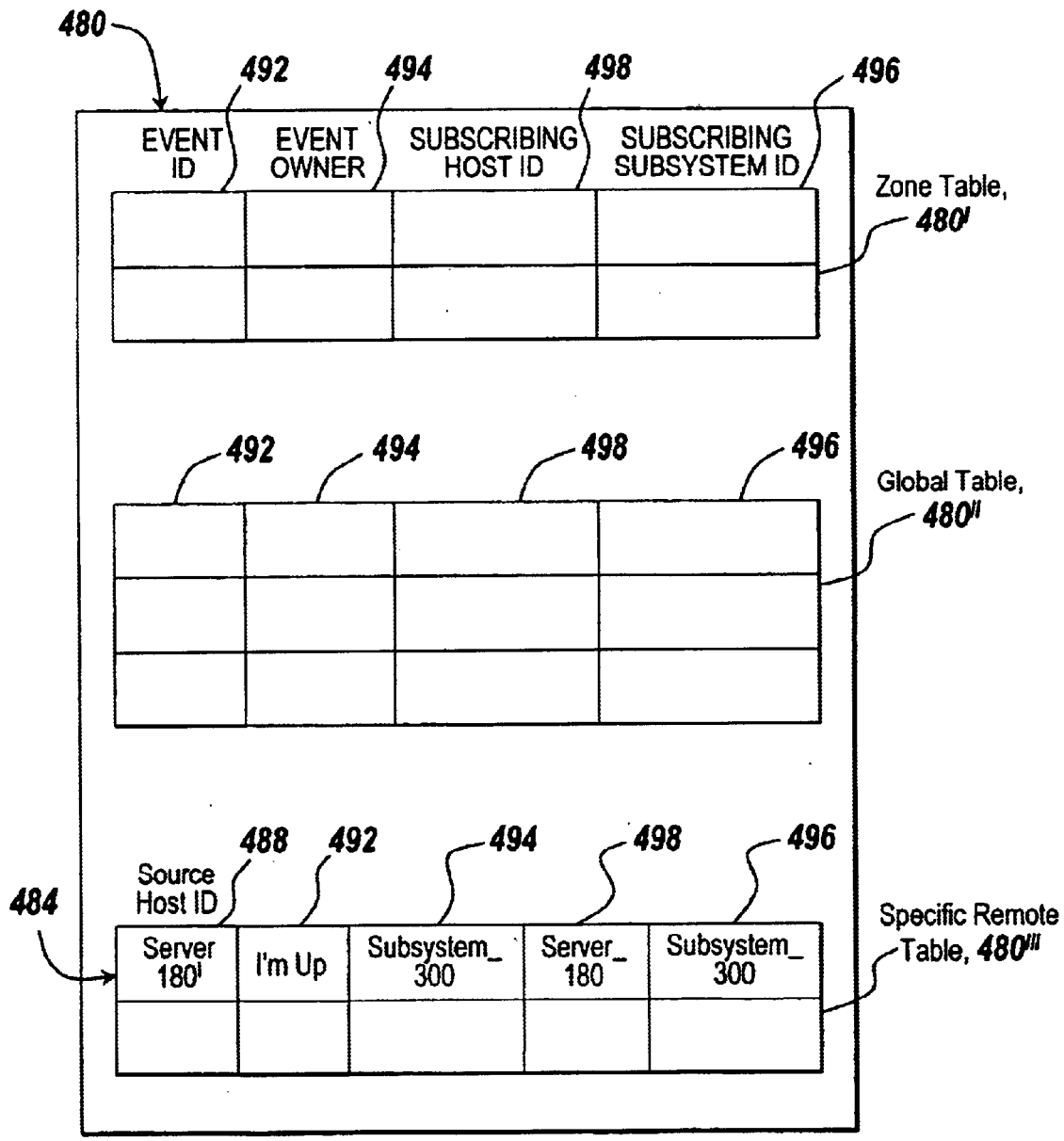
FIG. 4C is a diagram of an embodiment of a subscription table used by the server of FIG. 3 to route events to subsystems on other servers in a farm.

In more detail, each table 480', 480", and 480''' (generally 480) includes an entry 484 for each posted subscription. In one embodiment, each entry 484 includes an event field 492 identifying a unique event, a subsystem field 494 identifying the subsystem that owns (i.e., generates) the unique event, a destination subsystem field 496 identifying the subsystem 300 subscribing to the unique event, and a subscribing host field 498 identifying the host of the subscribing subsystem. The table 480''' further includes a source host identifier 488 for identifying the specific remote host upon which the subscribed-to subsystem resides. An exemplary subscription is illustrated in FIG. 4C in which subsystem 300 seeks to be notified when subsystem 300' of a particular remote host server 180' posts an "I'm Up" event. For purposes of illustrating this subscription, which is placed in the specific remote table 480''' of the remote subscription table 480, names corresponding to the servers 180, 180' and subsystems 300', 300 appear in the entry 484, but the actual implementation of this subscription can use pointers to such servers 180, 180' and subsystems 300', 300.

The subscription manager 362 provides three functions that can be called by other subsystems 300: (1) Subscribe, (2) Unsubscribe, and (3) PostNotificationEvent. In one embodiment, these functions are called through the SAL 304 associated with the subscription manager 362. In another embodiment, the functions are called through the internal API provided by each subscription manager 362.

3.7.3 Subscribe Function

When a subsystem 300 wants to subscribe to an event of another subsystem 300, the subscribing subsystem 300 calls the Subscribe function (either via a SAL API call or an internal API call) provided by the subscription manager 362. The Subscribe function instructs the subscription manager 362 to register a subscription in either the local subscription table 450 or in the remote subscription table 480 held in the dynamic store 240. The subscribing subsystem 300 specifies the scope of the subscription: local, zone, or farm-wide. In one embodiment, the specific SAL call used by the subscribing subsystem 300 determines the scope of the subscription. In another embodiment, the scope is an input parameter of the SAL call. The event delivery object 312 of the event bus 310 dispatches the Subscribe event to the subscription manager 362.

Typically, those subsystems 300 that are initialized after the subscription manager 362 is initialized call the Subscribe function during the initialization of such subsystems 300. The Subscribe function can also be called anytime during server operation by any subsystem. Input parameters to the Subscribe function uniquely identify the subscribing subsystem, the event for which the subscribing subsystem requests notification, the subscribed subsystem to be monitored, and, optionally, the scope of the subscription.

In one embodiment, the parameters uniquely identifying the subscribing and subscribed subsystems 300 may each be implemented as two separate entities: a value identifying the subsystem 300 and a value identifying the host on which the subsystem 300 resides. In other embodiments, the Subscribe function returns an output value representing the status of the subscription request, such as successfully registered.

Upon receiving the Subscribe function call, the subscription manager 362 determines the scope of the subscription from the type of SAL call 304 used to deliver the Subscribe event. If the scope of the subscription is for a local subsystem, then the subscription manager 362 stores a corresponding subscription entry in the local subscription table 450. If the scope of the subscription is remote, the subscription manager 362 communicates with the dynamic store subsystem 370 over the event bus 310 to register the subscription in the appropriate section of the remote subscription table 480 in dynamic store 240.

3.7.4 Unsubscribe Function

A subscribing system 300 can remove a previously registered subscription from the local and remote subscription tables 450, 480 by issuing an Unsubscribe function to the subscription manager 362. Such subscribing subsystem 300 can unsubscribe to only those subscriptions that the subsystem 300 has previously registered. Input parameters to the Unsubscribe function uniquely identify the subsystem requesting removal of the subscription, the event for which the subscribing subsystem no longer requests notification, and the subsystem having the subscription to be removed. The input parameters that uniquely identify the subscribing and subscribed-to subsystems are implemented in one embodiment as two separate entities: a value identifying the subsystem and a value identifying the host on which that subsystem resides.

In response to an Unsubscribe function call, the subscription manager 362 searches the local subscription table 450 and remote subscription tables 480 and removes every entry corresponding to the subscription to be removed. To remove the subscription from the remote subscription tables 480, the subscription manager 362 sends a delete request to the dynamic store system service module 356 to remove the entries from the dynamic store 240. The Unsubscribe function returns an output value representing the status of the removal of the subscription, such as successfully completed.

3.7.5 PostNotificationEvent

Some subsystems 300 produce events that may be subscribed to by other subsystems that are local and/or remote to these subsystems. Upon issuing such an event, such subsystems 300 also call a PostNotficationEvent function to send a copy of this event to the subscription manager 362. The subscription manager 362 issues a copy of that event to local or remote subscribing subsystems 300. The subsystems 300 call the PostNotificationEvent function regardless of whether any subsystem has actually registered a subscription to that event, because only the subscription manager knows if an event has been subscribed to by another subsystem.

Figure 5A:
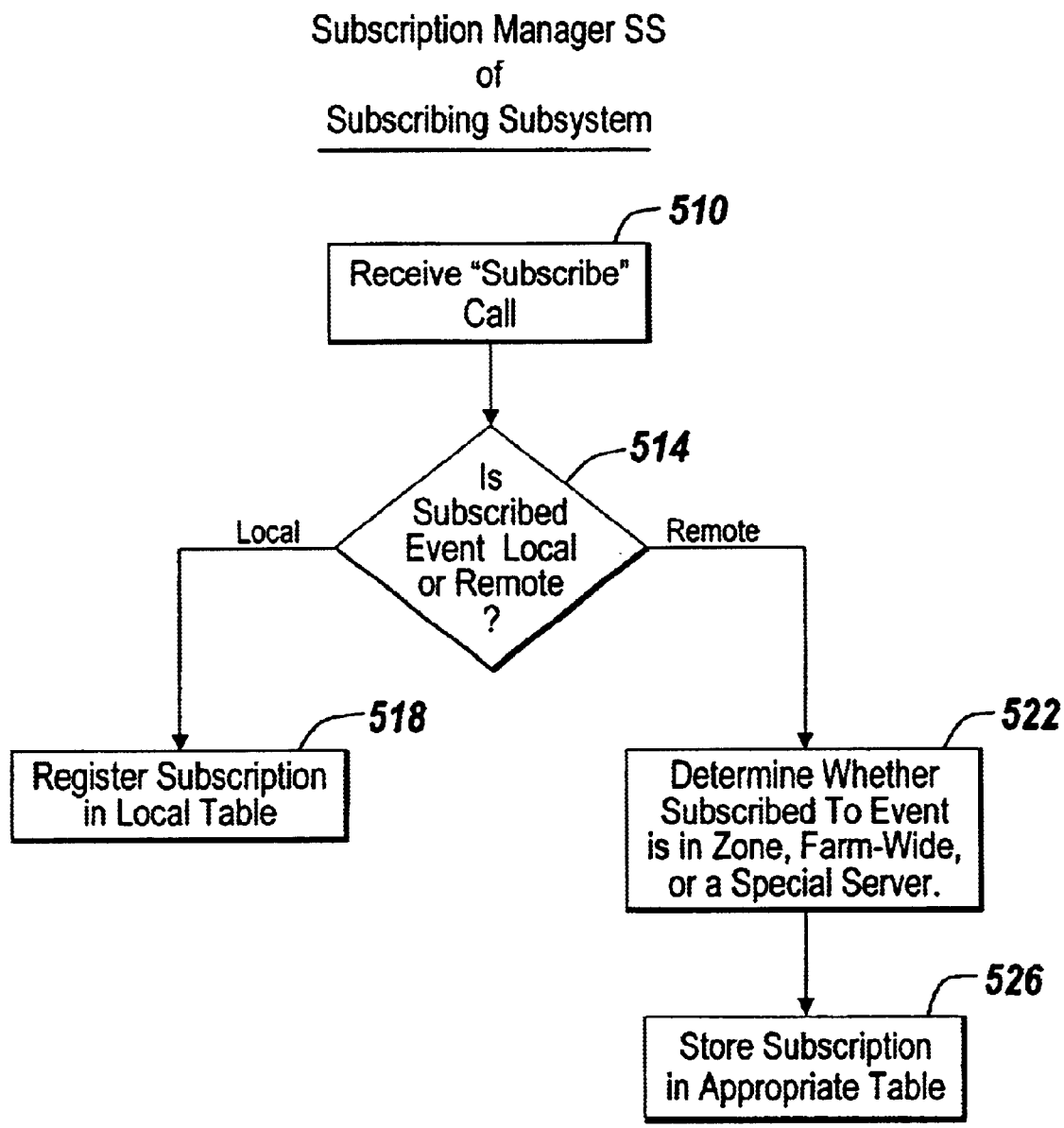
FIG. 5A is a flow diagram illustrating an embodiment of a process used to respond to subscription requests.

FIG. 5A shows an embodiment of a process used by the subscription manager 362 upon receiving (step 510) a Subscribe function command. From the event type, the subscription manager 362 determines (step 514) whether the scope of the subscription event is remote. If the subscription is not remote in scope, the subscription manager 362 stores (step 518) the subscription in the local subscription table 450. When the scope of the subscription is remote, the subscription manager 362 determines (step 522) whether the subscribed-to event is in the zone, farm-wide, or for a specific remote host. Then the subscription manager 362 inserts (step 526) the subscription into the appropriate table 480', 480", 480'". The inserted subscription (hereafter, a subscription record) follows the particular schema defined by the subscription manager 362. A similar process is used to remove subscriptions from the subscription tables 450 and 480 upon receiving an Unsubscribe call.

Figure 5B:
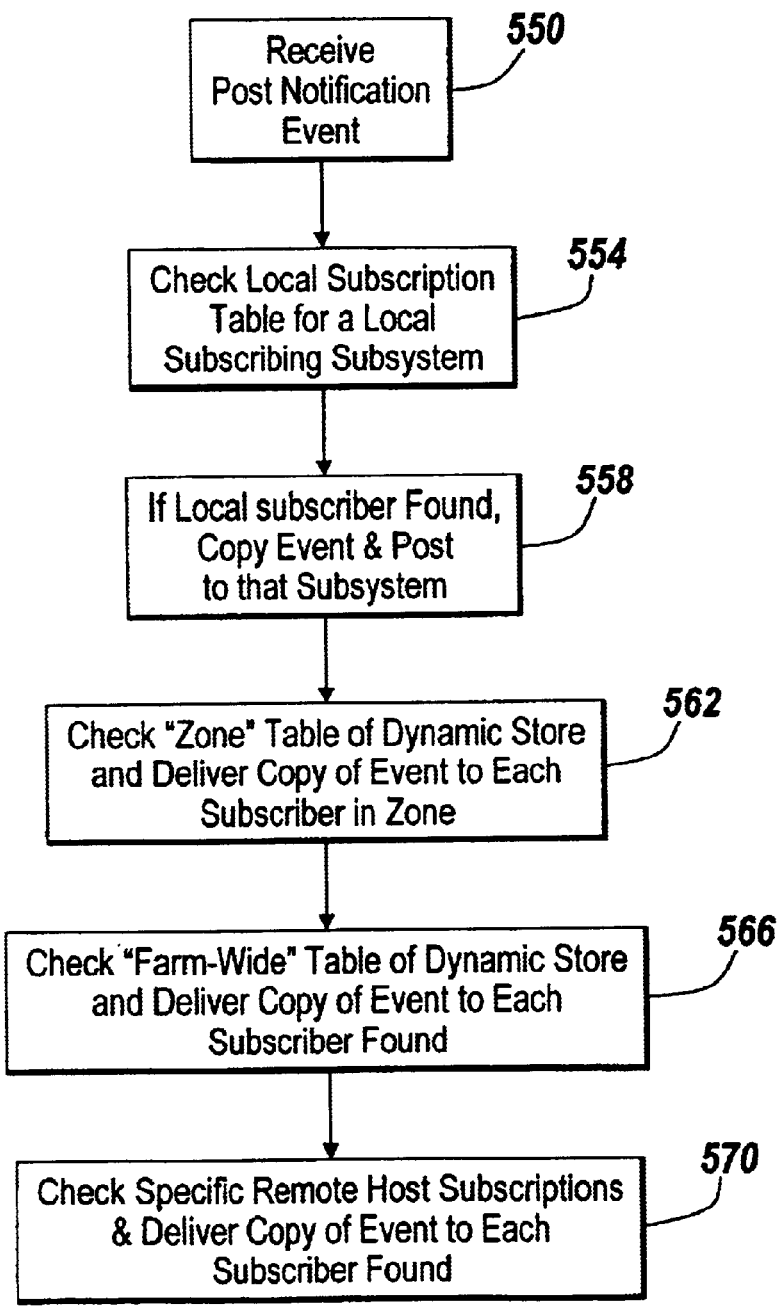
FIG. 5B is a flow diagram illustrating an embodiment of a process used to respond to notification events.

FIG. 5B shows an embodiment of a process used by the subscription manager 362 for each PostNotificationEvent received (step 550) by the subscription manager 362. The subscription manager 362 determines (step 554) if the event exists in the local subscription table 450. If the event is subscribed to by one or more local subsystems, then the subscription manager 362 generates (step 558) a copy of the event to be delivered to each subscribing local subsystem. Each copy of the event is placed in its own event buffer 380.

Then the subscription manager 362 checks (step 562) the zone table 480' for any subscribing servers in the same zone. Similarly, the subscription manager 362 requests searches (steps 566 and 570) for subscriptions in the farm-wide section 480" and specific remote host section 480'", respectively, of the remote subscription table 480. In one embodiment, for each access to the remote subscription tables 480, the subscription manager 362 issues an event to the dynamic store system service module 356 that causes the desired search.

Then, in one embodiment, rather than search the local dynamic store 240 directly, the subscription manager 362 sends a copy of the event to a subscription dispatcher. The subscription dispatcher is one of the servers 180 in the server farm 110 that is dedicated for dispatching events to remote subscribers (i.e., another server in the same or different zone). The subscription dispatcher is identified as the target host in the zone for handling subscribed-to events.

For each received event, the subscription dispatcher performs a search operation on the remote subscription tables 480 in the dynamic store 240 and retrieves all subscription records corresponding to subscribers of that event. Each retrieved subscription record corresponds to one subscription. The subscription manager 362 then produces an event for each retrieved record, inserting the identification of the subscribing subsystem into the appropriate field in that event.

3.8 Host Resolution System Service Module

A subsystem 300 may target events to another subsystem residing on a remote server. Parameters associated with issuing such events include a unique host identifier corresponding to the remote server. The host resolver 360 receives such events from these source subsystems 300 (and in other embodiments from other system service modules 350) requesting that a distinguished name be obtained for the remote server. To obtain the distinguished name, the host resolver 360 sends an event that includes the unique host identifier to the persistent store system service module 352. The persistent store system service module 352 uses the unique host identifier to search the persistent store 230 for a corresponding distinguished name, and returns the distinguished name and the port address to the host resolver 360. The host resolver 360 can return the distinguished name and port address to the source subsystem 300 or it may forward the event received from the source subsystem 300 to the host identified by the distinguished name on behalf the source subsystem 300.

3.9 Zone Manager System Service Module

Each server 180 in the server farm 110 includes a zone manager 358 that directs accesses to the dynamic store 240 made by the dynamic store system service module 356 to the server 180 responsible for collecting data of the type identified in the access. One of the zone managers 358 in a server farm 110 is elected by its peers to be the master of the server farm 180. When acting as a master, a zone manager 358 (1) determines which server 180 collects each type of data, (2) designates which servers 180 in the farm 110 are responsible for providing various network services, and (3) identifies the zone master of other zones 260, 270 in the farm 110. As described above, the dynamic store 240 may be distributed among more than one server 180 in a server farm 110.

3.9.1 Assigning Ownership of Distributed Resources

The dynamic store 240, in one embodiment, comprises one or more record tables managed by the dynamic store system service module 356. Record tables store information relating to server farm run-time data, such as dynamic subscription tables and disconnected sessions. The dynamic store system service module 356 queries the zone master to determine which server 180 in the zone 260, 270 stores the various record tables.

The dynamic store system service module 356 can use the services of the zone master through a zone master interface, which in one embodiment provides a service called GetZoneResourceOwner. This service accepts as input a unique string identifier of an arbitrary resource, and returns the identity of the server 180 that should own a given resource. The dynamic store 230 is thus able to call GetZoneResourceOwner, passing the name of the dynamic store record table whose owner is desired, and the zone master will return the identity of the server 180 that owns that resource, i.e., that stores the dynamic store 230 records for that resource.

In further embodiments, the zone master chooses which server 180 in a server farm 110 stores dynamic store record tables. In these embodiments, the zone manager may choose a server 180 based on physical characteristics, such as available memory, or other criteria, such as proximity to (either logically or physically) those entities requesting the dynamic store records. In other of these embodiments, the zone master may change which server 180 stores the record table during server farm operation.

3.9.2 Assignment Ownership of Network Services

In some embodiments, certain services provided by service modules may be centralized, to allow all of the servers 180 in a zone 260, 270 make service request directly to the same zone server. An example of this might be a licensing server. In this example, all requests for a license would be directed to a single server 180 in the zone 180.

The service locator system service module 354 tracks which services are available on which servers 180 in the zone 260, 270. Although in one embodiment the main purpose of the service locator system service module 354 is to find the 'best' host for a given service that may be available on many servers 180 in the zone 260, 270, it is also responsible for sending messages to centralized service modules. The determination as to which of the zone's member servers should be responsible for handling a given centralized service is made by the zone master in a similar way to how it assigns ownership of zone resources. Thus, the service locator system service module 354 the zone master to determine where requests for such services should be directed.

A master election can occur when a new server is added to a zone 260, 270. Alternatively, any zone manager 358 can initiate an election if the master fails to respond to a query, i.e., the master has failed.

In one embodiment, any zone manager 358 may force an election at any time by broadcasting a request election event. The election results are determined by a comparison of the set of election criteria which is transmitted within the request election event transmitted by the requesting zone manager 358 with the set of election criteria maintained on each receiving zone manager 358. That is, the first election criterion from the event of the requesting zone manager 358 is compared by the receiving zone manager 358 to the first criterion of the receiving zone manager 358. The highest ranking of the two criteria being compared wins the comparison and the zone manager 358 with that criterion wins the election. If the two criteria tie, then the next criteria are sequentially compared until the tie is broken.

Election criteria may be whether or not the zone manager 358 is statically configured as a master; whether the zone manager 358 is resident on the longest running server; and whether the server on which the zone manager 358 is resident has a lexically lower network name.

The interaction of zone manager system service and the dynamic store system service modules 358, 356 to manage and access the dynamic store 240 is discussed in greater detail below (see section 6.3).

3.10 System Module

The system module 320 is an executable program (.exe) that manages the boot-up of the server 180. Like each subsystem 300, the system module 320 is addressable (i.e., can be the target of an event) and includes an event queue 324 to receive events, such as "SetListeningPort," which sets the transport protocol port address on which the transport layer 260 "listens" for communication events. Another example of an event that can be directed to the system module 320 is "LoadSubsystem," which instructs the system module 320 to load a subsystem. Upon execution, the system module 320 initializes the event delivery object 312, the transport layer 318, and the loader module 330. The system module 320 also binds the transport layer 318 to the event delivery object 312. In one embodiment, the system module is provided as a WINDOWS NT service. In another embodiment, system module 320 is provided as a Unix daemon.

3.11 Loader

The loader module 330 allows for customization of the event bus 310 for different platforms and applications. The loader 330 can be implemented as a C++ class, implemented as static code or as a dynamically linked library. In brief overview, the loader module 330 uses several functions to manage the subsystems 300. In general, the functions performed by the loader module 330 create and destroy subsystems 300. Operation of the loader module 330 is described in more detail in connection with FIG. 4.

The loader module 330 uses a create function, having as input a subsystem identifier, to generate an instance of each subsystem 300. For embodiments in which an event queue is associated with the subsystem 300, the create function invokes an instantiation of an event queue in the event delivery object 312 and the loader 330 binds the event queue to the discovered subsystem 300. In other embodiments, the subsystem 300 is identified by a pointer that is entered in the dispatch table 316 to identify the subsystem 300.

The event delivery object 312 uses the pointer stored in the event delivery object 312 (in some embodiments the pointer identifies an event queue) to send events to the subsystem. The subsystem 300 uses a pointer to the event delivery object 312 to deliver event to the event bus 310. Thus, for example, in embodiments in which the interfaces are provided as C++ classes, the pointers identify the desired classes. In some embodiments, this function can return a status value. The loader module 330 uses a destroy function to delete an instance of the subsystem 300 (together with an event queue, if provided, associated with that deleted subsystem) and the corresponding entry in the dispatch table 316.

4.0 Server and Subsystem Initialization

Figure 6:
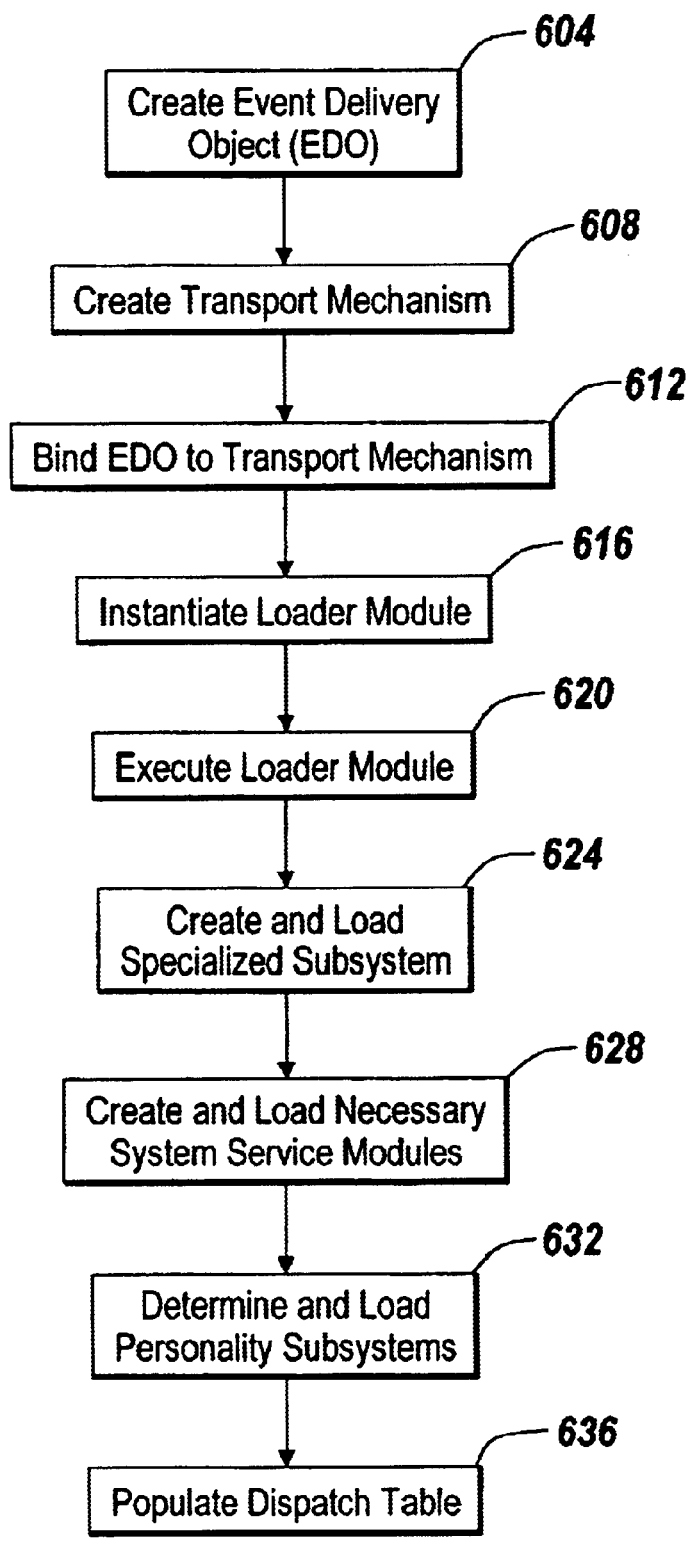
FIG. 6 is a flow diagram illustrating an embodiment of a process used to initialize servers and subsystems on each server of the server farm.

FIG. 6 illustrates an embodiment of a process used to initialize a server 180, including system service modules 350 and personality subsystems 300. A server 180 executes boot service code (i.e., the system module 320) that creates the event bus 310. In the embodiment shown in FIG. 6, creation of the event bus 310 includes the steps of creating an event delivery object 312 (step 604), creating a transport mechanism 318 (step 608), and binding the event delivery object 312 to the transport layer 318 (step 612).

The system module 320 instantiates a loader module 330 (step 616) and starts (step 620) execution of the loader module 330. The loader module 330 creates and loads (step 624) a specialized subsystem identified by an initialization resource. In some embodiments, the specialized subsystem is identified by an entry in a registry file. For embodiments in which system service modules 350 are provided as subsystems, the specialized subsystem instructs the loader module 330 to create and load all required system service modules 350 (step 628). The specialized subsystem also determines which personality subsystems 300 should be loaded for the server 180 (step 632). In one embodiment, the specialized subsystem accesses a registry file to determine which personality subsystems 300 should be loaded and the registry file specifies an order in which the personality subsystems are loaded. For embodiments in which the system service modules 350 are provided as subsystems, the registry file also specifies the order in which they are initialized. In one particular embodiment, the registry file specifies the following order: the persistent storage system service module 352, the dynamic store system service module 356, the zone manager 358, the host resolver 360, the service locator 354, the subscription manager 362.

In another embodiment, the specialized subsystem accesses an initialization file to determine which subsystems should be loaded. In still other embodiments, the specialized subsystem accesses the persistent store 230 to determine which subsystems should be loaded. As part of loading the subsystems 300, the loader module 330 populates (step 636) the dispatch table 316 with entries 420 that map subsystem entry points to subsystem identifiers associated with the loaded subsystems 300, as shown above in FIG. 4A.

Each subsystem 300 can be represented by an entry in the initialization resource, i.e. installed on the server 180, because (1) the subsystem is necessary to the operation of the server 180, or (2) the subsystem is anticipated to be useful. In one embodiment, another reason for installing a subsystem 300 is that the subsystem 300 is requested by the arrival of an event directed to that subsystem (i.e., on-demand). For such embodiments that implement on-demand loading, the loader module 330 waits until an event is received directed to that subsystem before creating that subsystem. In these embodiments, the loader module 330 provides an API that allows the loader module 330 to be invoked during run-time to create and initialize a personality subsystem 300.

5.0 Events

Figure 7A:
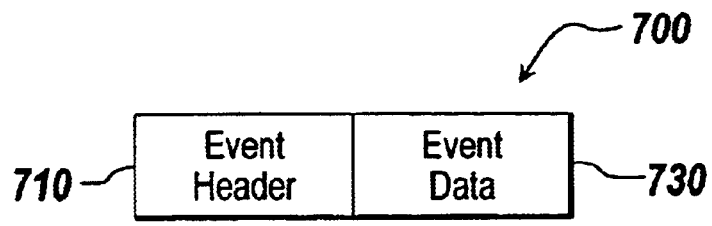
FIGS. 7A–7B are diagrammatic views of an embodiment of an event that may be transmitted in accordance with the invention.

FIG. 7A depicts an embodiment of an event 700 that includes an event header 710 and event data 730. The event header 710 is sometimes referred to as "control data" and event data 730 may be referred to as "payload data."

Figure 7B:
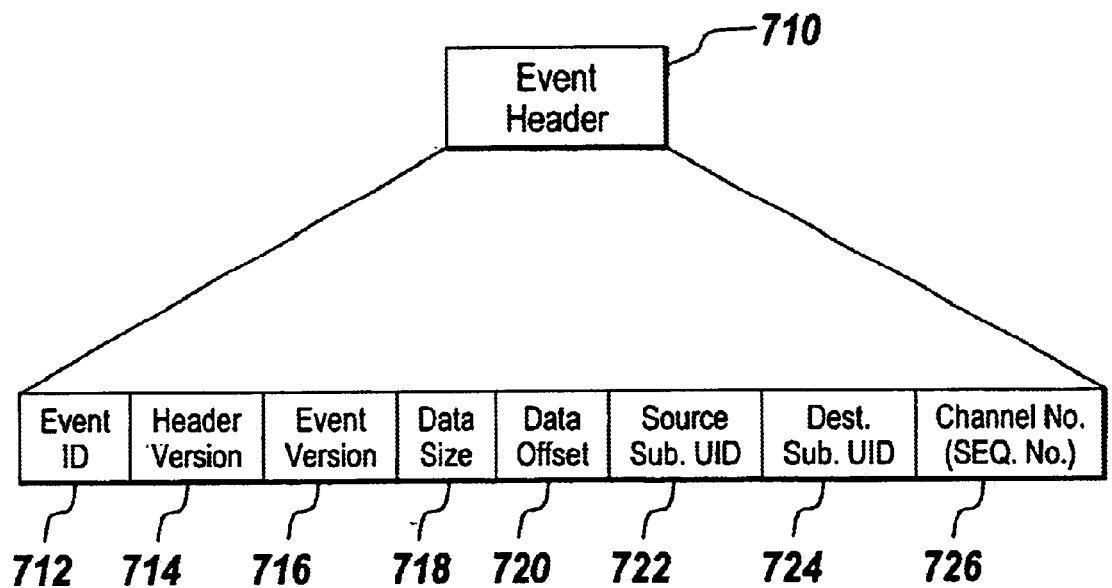

Referring now to FIG. 7B, the event header 710 includes one or more data fields that indicate various attributes associated with the event 700. For example, the event header 710 may include: a unique event identifier (event UID) 712; an event header version identifier 714; an event data version identifier 716; an event data size indicator 718; an event data offset identifier 720; a unique identifier (UID) 722 identifying a source subsystem; a destination subsystem UID 724 identifying a destination subsystem; and a channel identifier 726, described in detail below.

In more detail, the event UID 712 uniquely identifies each event produced by the subsystems 300 and system service modules 350. Every subsystem and system service module 350 predefines the event IDs of those events that it accept. The event IDs are hard-coded and unique for each server 180. Uniqueness of an event 700 within a server 180 is established by the combination of the source subsystem UID 722 and the event ID 712, and are used in combination to map events to handler routines as described above.

Identifiers of the source host and the destination host may be passed as parameters in the SAL commands used to issue events 700. In such cases, the source host identifier and the source subsystem UID 722 together uniquely identify the sender (i.e., the source server and subsystem) of the event 700. The destination host identifier and the destination subsystem UID 724 uniquely identify the subsystem or system service module 350 targeted to receive the event.

In one embodiment, the highest order bit of the event UID 712 is a "request bit" and indicates to the receiving subsystem how to map the event to the proper handler routine. All subsystems can optionally choose to handle events of another subsystem through such mechanisms as subscriptions. The event handler routines are mapped according to subsystem UID and event UID 712. Because the event being processed can either be directed or subscribed to, the request bit indicates whether to use the source or destination subsystem UID to map the event to the proper handler routine.

The event header version identifier 714 defines the layout of the event header 710, such as the size and order of fields in the header 710. The event data version identifier 1416 implicitly defines the layout of the event data 730 included in the event 700. The event data offset identifier 720 indicates the offset from the event header 710 at which the event data 730 begins. The event data offset 720 equals the size of the event header 710. The channel identifier 726 is used to match a reply event to a request event.

5.1 Event Types

Events can be one of several types including directed and notification events.

5.1.1 Directed Events

Directed events are events that have a specified destination subsystem 300 when sent to the event delivery object 312. The specified destination includes a unique identification (UID) of the destination subsystem 300 and an identifier of the server 180 hosting the destination subsystem. Examples of directed events include notification events and the request and reply events described below.

5.1.1.1 Request-and-Reply Events

Request events are subsystem specific directed events that send a request for service or functionality to another subsystem on the same server 180 or to a remote server in the server farm 110. Such request events contain codes that the destination subsystem can map onto known interfaces (i.e., event handler routines) to provide that service or functionality. Each request event includes a unique channel ID for use by the destination subsystem when creating a corresponding reply event.

Reply events occur in response to request events. Each reply event is delivered as a directed event to the subsystem from which the corresponding request event originated. The reply event specifies the same channel ID and the same event buffer 380 used by the corresponding request event. The subsystem that sent the request event waits for the reply event from the event delivery object 312. The same channel ID indicates to the event delivery object 312 that the reply event is to pass directly to the destination subsystem rather than be placed in an event queue associated with the destination subsystem.

The following pseudo-code embodies an example of a reply event handler routine that is called in response to receiving a request event. In particular, for the following example, the destination subsystem has a event handler routine, called OnGetSampleData(EventBuffer* pEvent), that is called in response to a GetSampleData request event. This event handler routine places data in the reply event buffer, pointed to by the pointer "pReplyEvent".

```
RESULT Sample::OnGetSampleData(EventBuffer*
    pEvent)
{
if (SUCCESS==Create Reply Event(&pReplyEvent,
    SetSampleDataReply, event version, subsystem, size))
{
put_data_in_event_buffer;
res=PostEvent(pReplyEvent); //send event to the Event
    bus
}
delete(pEvent); //
return res;
}
```

The OnGetSampleData reply event handler routine calls a CreateReplyEvent that creates a reply event to the original request event. As noted above, the reply event is placed in the event buffer used to hold the original request event (i.e., pointed to by pEvent), thus overwriting the request event. A new pointer, pReplyEvent, points to the reply event in the event buffer, and the old pointer, pEvent, is deleted.

The Create_Reply_Event, as the name suggests, creates the reply event according to supplied input parameters. One input parameter is the identification of the reply event, here SetSampleDataReply, and the version of the reply event, here 1. All events are associated with an event ID 712, which together with the subsystem ID 722 of the source subsystem produces a unique identifier for that event.

Another feature of the Create_Reply_Event is that this function automatically specifies the destination subsystem of the reply event, namely, the subsystem that originated the request event. The PostEvent command is one of the functions provided by the event bus API 392 for communicating with the event bus 310. Because the Create_Reply_Event function sets the destination subsystem of the event, the PostEvent command indicates where to the deliver the reply event (i.e., using the dispatch table).

5.1.1.2 Notification Event

A notification event is an event that is directed to the subscription manager 362. Such event is dropped (i.e., ignored) by the subscription manager 362 unless there is an entry in the local subscription table 450 or remote subscription table 418 indicating that at least one subsystem 300 is interested in being notified of the occurrence of that event. Each subsystem keeps a list of events that can be subscribed to by other subsystems, and accordingly produces a notification event after issuing one of these potentially subscribed to events.

5.2 Event Delivery Commands

In general, each subsystem 300 issues five types of commands to deliver events to the event bus 310:

PostNotificationEvent, PostEvent, SendEventAndWait, Subscribe, and Unsubscribe. In brief overview, a PostNotificationEvent command sends a directed event to the subscription manager 362 as mentioned above. A PostEvent command sends a directed event to a destination subsystem and allows the source subsystem to immediately continue processing other tasks (that is, the PostEvent command immediately "returns"). A SendEventAndWait command sends a directed event to a destination subsystem and waits for a response causing the source subsystem to block until the response is received. A Subscribe command sends a notification event to register a subscription with the local subscription table 450 and/or remote subscription table 418. An Unsubscribe command sends a notification event to remove a previously registered subscription from the local subscription table 450 and/or the remote subscription table 418.

6.0 Basic Examples

Referring back to FIG. 3, the following examples use one particular embodiment to illustrate the principles of the subject matter described above and are not intended to limit the subject matter of the invention in any way whatsoever.

6.1 PostEvent Command

Figure 8A:
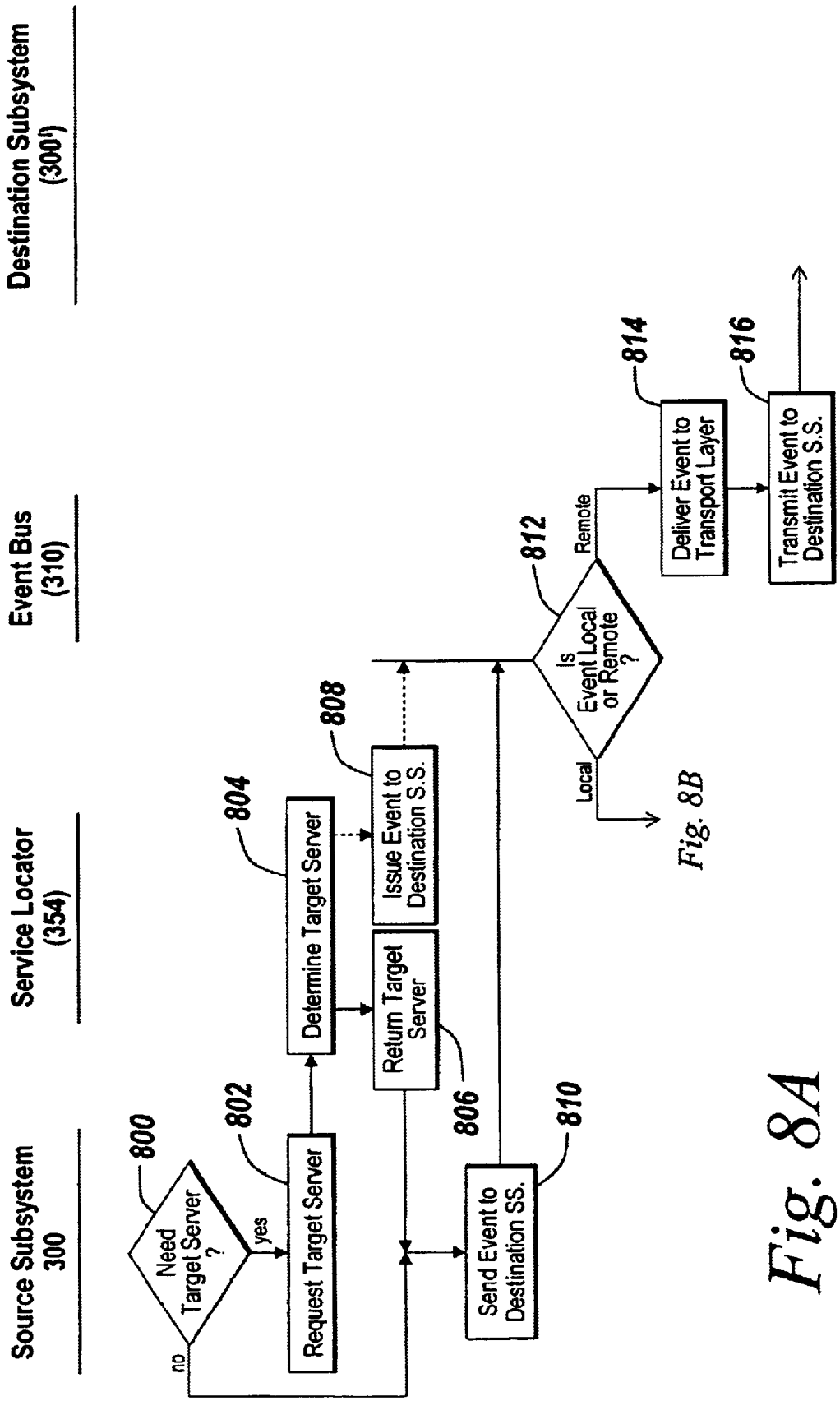
FIGS. 8A–8B are block diagrams of an embodiment of a process used to issue an event to a destination subsystem using a PostEvent command.
Figure 8B:
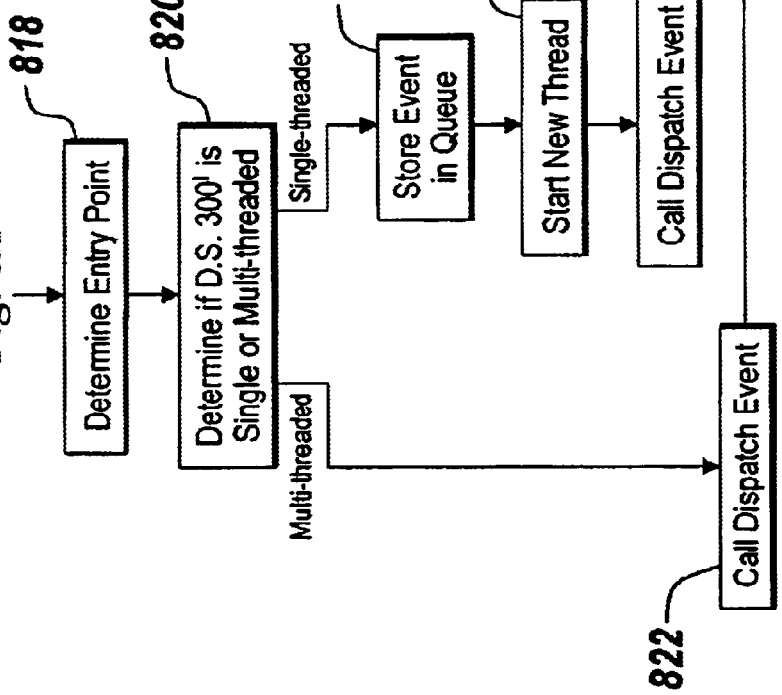
Figure 9A:
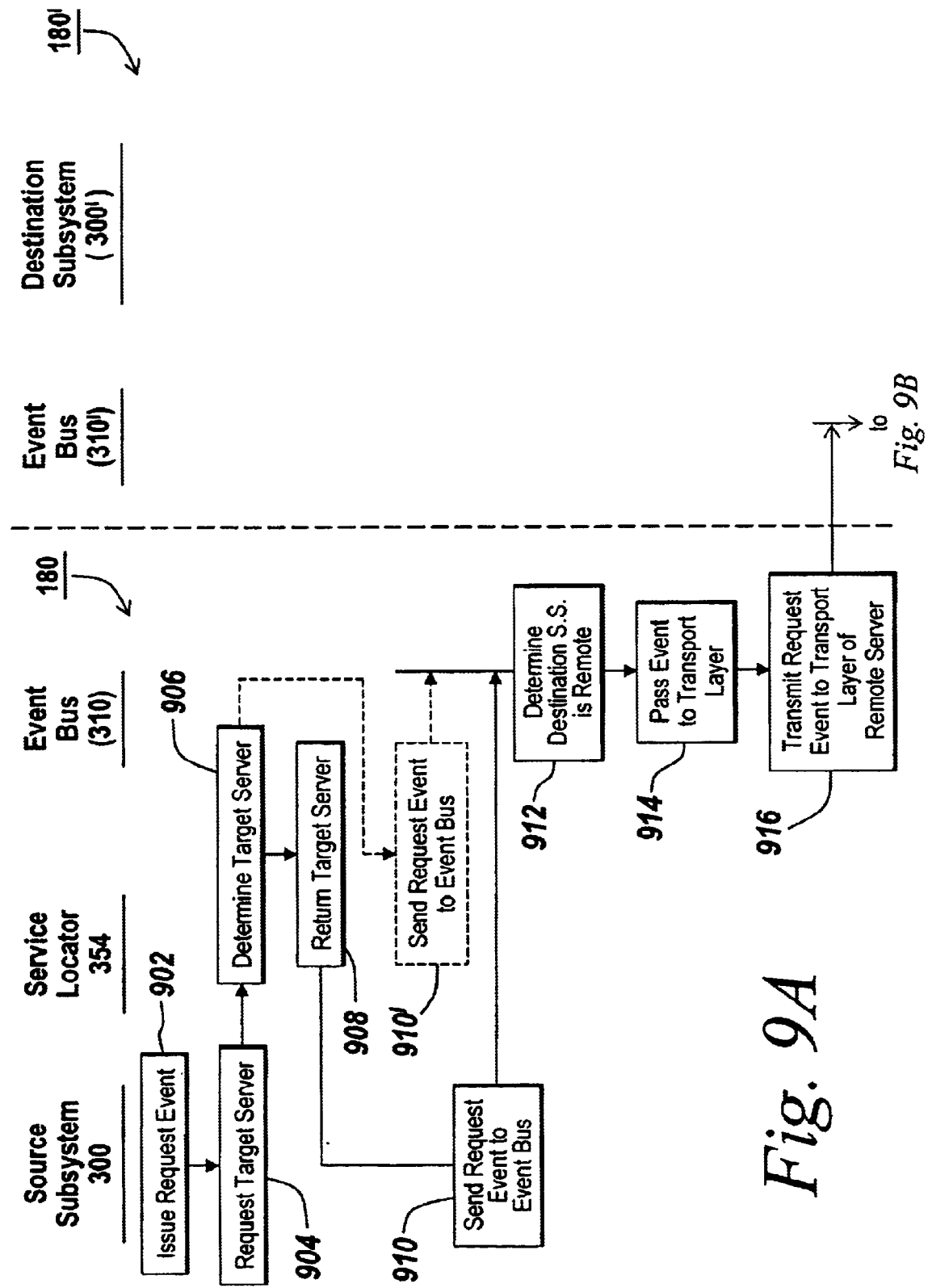
FIGS. 9A, 9B, 9C and 9D are flow and block diagrams of an embodiment of a process used to issue an event to a remote destination subsystem using a SendEventandWait command.
Figure 9B:
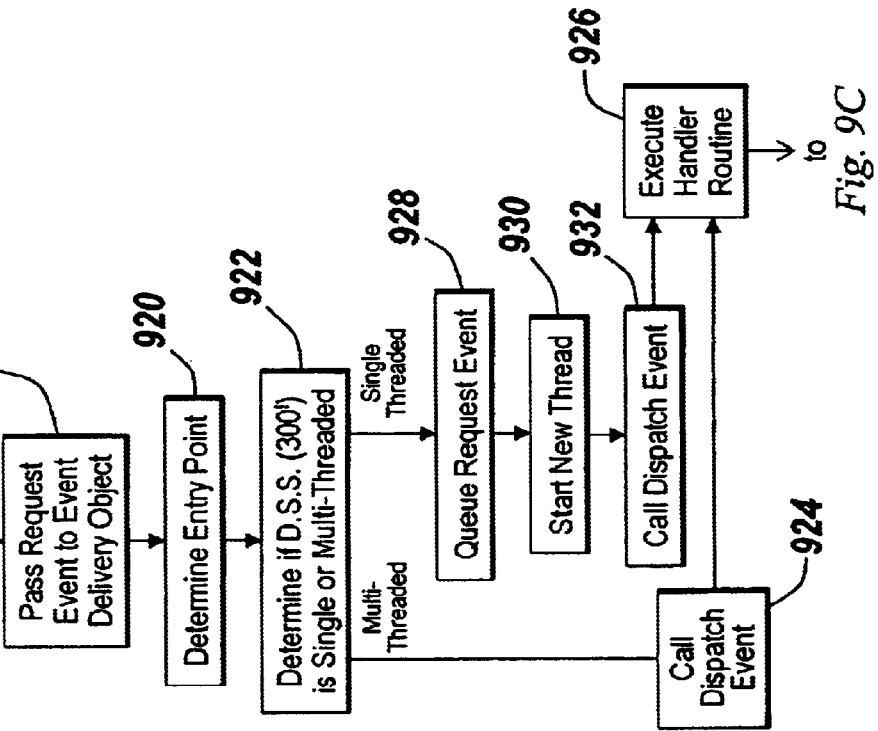
Figure 9C:
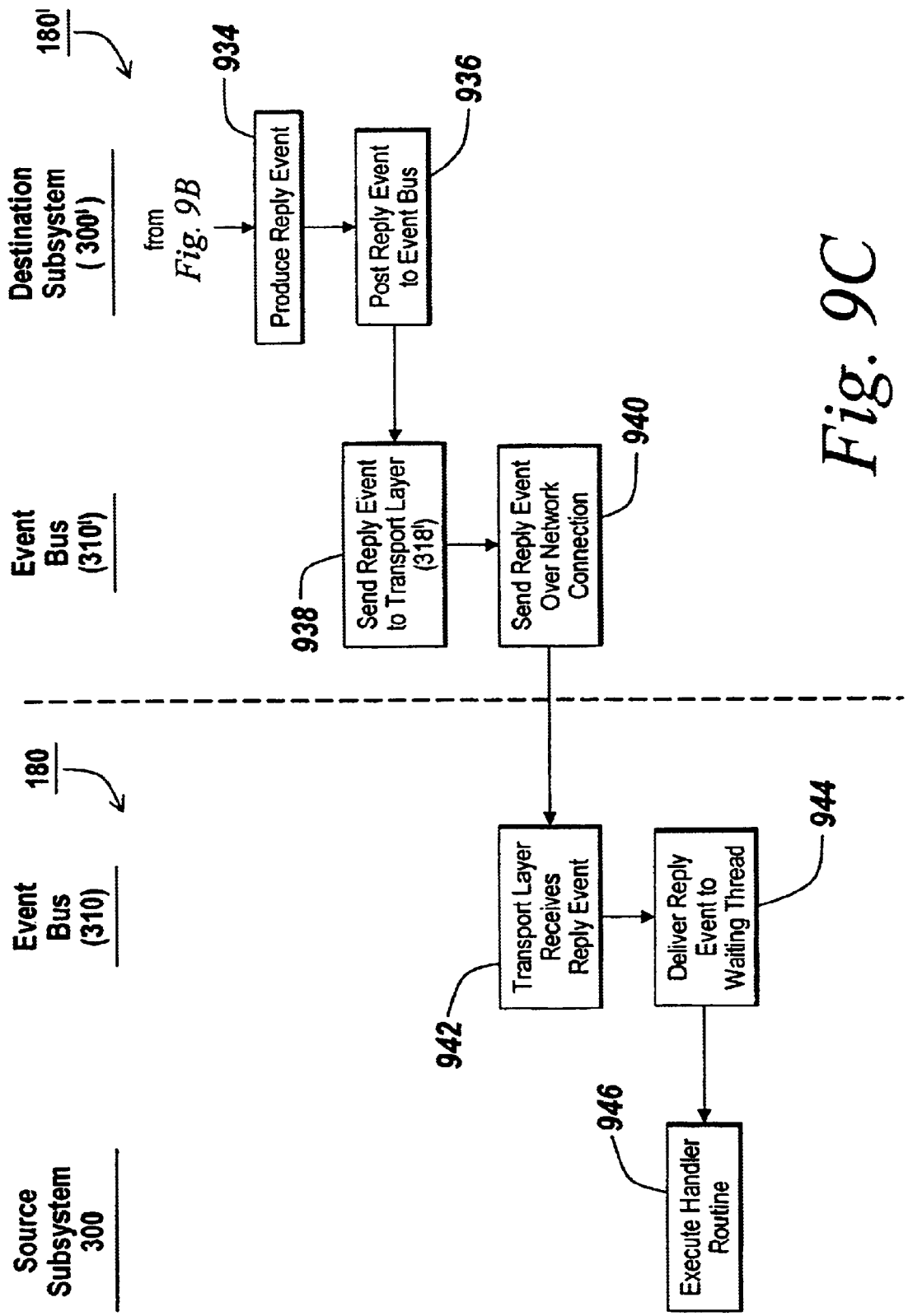
Figure 9D:
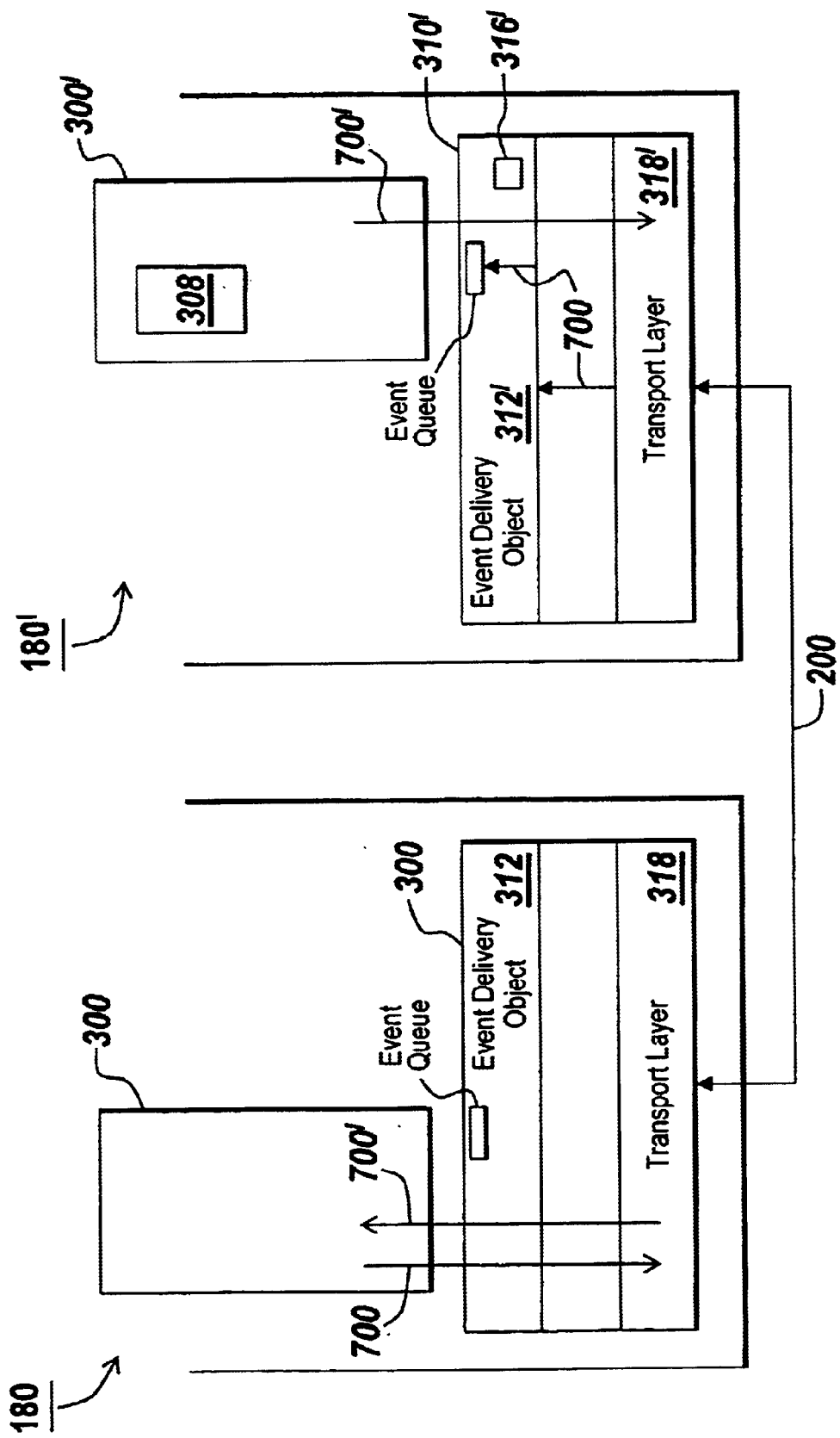

Referring also to FIG. 8A, when a source subsystem 300 seeks to communicate with a destination subsystem 300' on the same or different server, one method of communicating is for the source subsystem 300 to issue a PostEvent command to the event delivery object 312 through the event bus API 392. The source subsystem 300 determines (step 800) whether the identity of a target server hosting the destination subsystem 300' is needed. For example, a subsystem 300 preparing to issue an event to a peer subsystem 300 on another server 180 would need to determine the identity of the target server 180 hosting the peer subsystem.

If the identity of a target server is needed, the source subsystem 300 communicates (step 802) with the service locator 354. In one embodiment, such communication occurs as a directed event to the service locator 354 delivered over the event bus 310. The directed event may request the identity of the target server or request that the service locator 354 forward the event 700 to the destination subsystem 300' on the target server. In the latter case, the event received by the service locator 354 from the source subsystem contains the event 700 that is to be forwarded. The service locator 354 delivers this contained event 700 to the event delivery object 312 with the target server specified as one of the parameters.

In the embodiment shown in FIG. 8A, the source subsystem 300 does not deliver an event, but calls a function of the internal API 302 of the service locator 354. The service locator 354 then determines (step 804) the target server. In one embodiment, the service locator 354 returns (step 806) the identity of the target server to the source subsystem 300 so that the source subsystem 300 can issue (step 810) the PostEvent command to send the event 700 to the destination subsystem 300'. Alternatively, the service locator 354 issues (step 808) the PostEvent command to send the event 700 to the destination subsystem 300' on behalf of the source subsystem 300 over the event bus 310. For this case, the internal API 302 call contains the event 700 that is to be forwarded to the destination subsystem 300' on the target server.

Upon receiving the event 700, the event bus 310 determines (step 812) whether the event 700 is local or remote from any destination host parameter included in the PostEvent command. If the destination subsystem 300' is remote, the event is delivered (step 814) to the transport layer 318 of the event bus 310 for subsequent transmission to the remote server 180' hosting the destination subsystem 300'. The transport layer 318 then transmits (step 816) the event 700 over the network connection 200 to the transport layer 318' on the remote server 180'. Operation of the transport layers 318, 318' is described in more detail in section 7.2.

If the destination subsystem 300' is local, the event delivery object 312 of the event bus 3 10 determines (step 818) the entry point associated with the destination subsystem 300' and determines (step 820) whether the destination subsystem 300' is a single-threaded or multi-threaded subsystem. To determine the entry point, the event delivery object 312 examines the dispatch table 316 using the destination subsystem UID 724 of the event 700 as an index into the table 316. In embodiments having event queues, the dispatch table 316 identifies the event queue associated with the destination subsystem 300'. In one embodiment, the event queue indicates whether the destination subsystem 300' is multi-threaded.

If the event queue indicates that the destination subsystem 300' is multi-threaded, the event 700 is not queued. The event delivery object 312 calls (step 822) the DispatchEvent of the subsystem API 306 of the destination subsystem 300', which causes execution (step 824) of the appropriate handler routine of the destination subsystem 300' for responding to the event 700. In an alternative embodiment, a thread executed by the destination subsystem 300' retrieves the request event 700 from the event delivery objects 312'.

If the event queue indicates that destination subsystem 300' is single-threaded, the event delivery object 312 places (step 826) the pointer to the event buffer 380 holding the event 700 in the event queue associated with the destination subsystem 300'. The event delivery object 312' then starts (step 828) a new thread of execution that signals the destination subsystem 300', using the DispatchEvent function of the subsystem API 306, and delivers the event 700 from the event queue to the destination subsystem 300'. This new thread executes (step 824) the handler routine appropriate for the event 700. In one embodiment, the event delivery object 312 dispatches the event 700 (using DispatchEvent) to the destination subsystem 300' without placing the event 700 in the event queue if the event queue is empty when the event delivery object 312 is about to place the event 700 in the event queue. Again, in an alternative embodiment, a thread executed by the destination subsystem 300' retrieves the event 700 from the event queue, rather than the event delivery object 312 pushing the event 700 to the destination subsystem 300'.

In one embodiment, the dispatch table 316 indicates whether the destination subsystem 300' has multi-threading capability. If the dispatch table 316 indicates that the destination subsystem 300' is multi-threaded, the event delivery object 312' calls the DispatchEvent function of the subsystem API 306' of the destination subsystem 300' as described above. Using the dispatch table 316 to store information regarding multi-threaded capability of subsystem makes the use of an event queue for a multi-thread capable subsystem unnecessary.

6.2 SendEventandWait Command

Referring to FIGS. 9A–9D, another method for the source subsystem 300 to communicate with the destination subsystem 300' is for the source subsystem 300 to issue a SendEventandWait command to the event delivery object 312 through the event bus API 392. To start the process, subsystem 300 issues (step 902) a request event 700 using the SendEventAndWait command of the SAL 304 of the destination subsystem 300'. This request event 700 uses a channel identification and specifies the destination subsystem 300' in the destination UID 724. Because the request event 700 is an event for which a response is subsequently expected, the source subsystem 300 blocks further execution of the thread that generated the request event 700 until the response from destination subsystem 300' is received. While this thread is blocked, the source subsystem 300 can communicate with other subsystems through other threads.

In this example, that source subsystem 300 seeks (step 904) a target server from the service locator 354. Note that not every event is sent to the service locator 354 for determining a target server; for some events, such as reply events, the source subsystem 300 does not need to use the service locator 354 because the target server is determined from the request event 700. As described above, the service locator 354 determines (step 906) the target server and returns (step 908) the identity of the target server to the source subsystem 300, and the source subsystem 300 sends the request event 700 to the event bus 310. Alternatively, the service locator 354 issues (step 910') the request event 700 to the event bus 310 on the source subsystem's 300 behalf. The specific action taken by the service locator 354 depends upon the actual request from the source subsystem 300.

The request event 700 passes to the event delivery object 312 of the event bus 310. Assume that the service locator 354 determines the target server to be the remote server 180'. The event delivery object 312 then determines (step 912) from the destination host parameter of the SendEventand-Wait command that the destination subsystem 300' is on the remote server 180'. Because the destination subsystem 300' is remote to the source subsystem 300, the request event 700 passes (step 914) to the transport layer 318 on the server 180. The transport layer 318 then transmits (step 916) the request event over the network connection 200 to the transport layer 318' on the server 180'.

The transport layer 318' passes (step 918) the request event 700 to the event delivery object 312' of the event bus 310'. The event delivery object 312' of the event bus 310' then determines (step 920) the entry point associated with the destination subsystem 300' and determines (step 922) whether the destination subsystem 300' is a single-threaded or multi-threaded subsystem as described above.

If the destination subsystem 300' is multi-threaded, the request event 700 is not queued. The event delivery object 312' calls (step 924) the DispatchEvent of the subsystem API 306 of the destination subsystem 300', which causes execution (step 926) of the appropriate handler routine of the destination subsystem 300' for responding to the request event 700.

If the destination subsystem 300' is single-threaded, the event delivery object 312' places (step 928) the pointer to the event buffer 380 holding the request event 700 in the event queue associated with the destination subsystem 300'. The event delivery object 312 then starts (step 930) a new thread of execution that signals the destination subsystem 300', using the DispatchEvent function of the subsystem API 306, and delivers (step 932) the request event 700 from the event queue to the destination subsystem 300'. This new thread executes (step 926) the handler routine appropriate for the request event 700. In one embodiment, the event delivery object 312' dispatches the request event 700 to the destination subsystem 300', bypassing the event queue if the event queue is empty when the event delivery object 312' is about to place the request event 700 in the event queue.

The handler routine produces (step 934) a reply event 700' that is posted (step 936) by the destination subsystem 300' to the event delivery object 312' of the event bus 310'. The reply event 700' uses the same channel identifier provided by the source subsystem 300 when it issued the request event 700. After determining that the reply event 700' is for a remote server (here server 180), the event delivery object 312' then passes (step 938) the reply event 700' to the transport layer 318' on the server 180'. The transport layer 318' transmits (step 940) the reply event 700' to the transport layer 318 on the server 180 over the network connection 200.

The event delivery object 312 of the event bus 310 receives (step 942) the reply event 700' through the transport layer 318 of the server 180 and delivers (step 944) the reply event 700' to the waiting thread (i.e., the thread that produced the request event 700). Because the reply event 700' uses the same channel identification used by the source subsystem 300 to initially issue the request event 700, the reply event 700' returns to the waiting thread (i.e., the waiting thread unblocks), bypassing the event queue (if any) associated with the source subsystem 300. If the reply event 700' does not return within a specified timeout period specified in the command, the waiting thread is released. The event delivery object 312 ignores the reply if the reply event 700' arrives after the timeout period expires. The source subsystem 300 executes the appropriate handler routine for the reply event 700'.

In an alternative embodiment, a thread executed by the destination subsystem 300' retrieves the request event 700 from the event delivery object 312', and a thread executed by the source subsystem 300 retrieves the reply event 700' from the event delivery object 312. Thus, in this embodiment, the subsystems 300, 300' "pull" the event 700' in contrast to the above described embodiments in which the respective event delivery objects 312', 312 "push" the request event and reply events 700, 700' to the destination subsystems 300' and source subsystem 300, respectively.

6.3 Managing Dynamic Data

Figure 10:
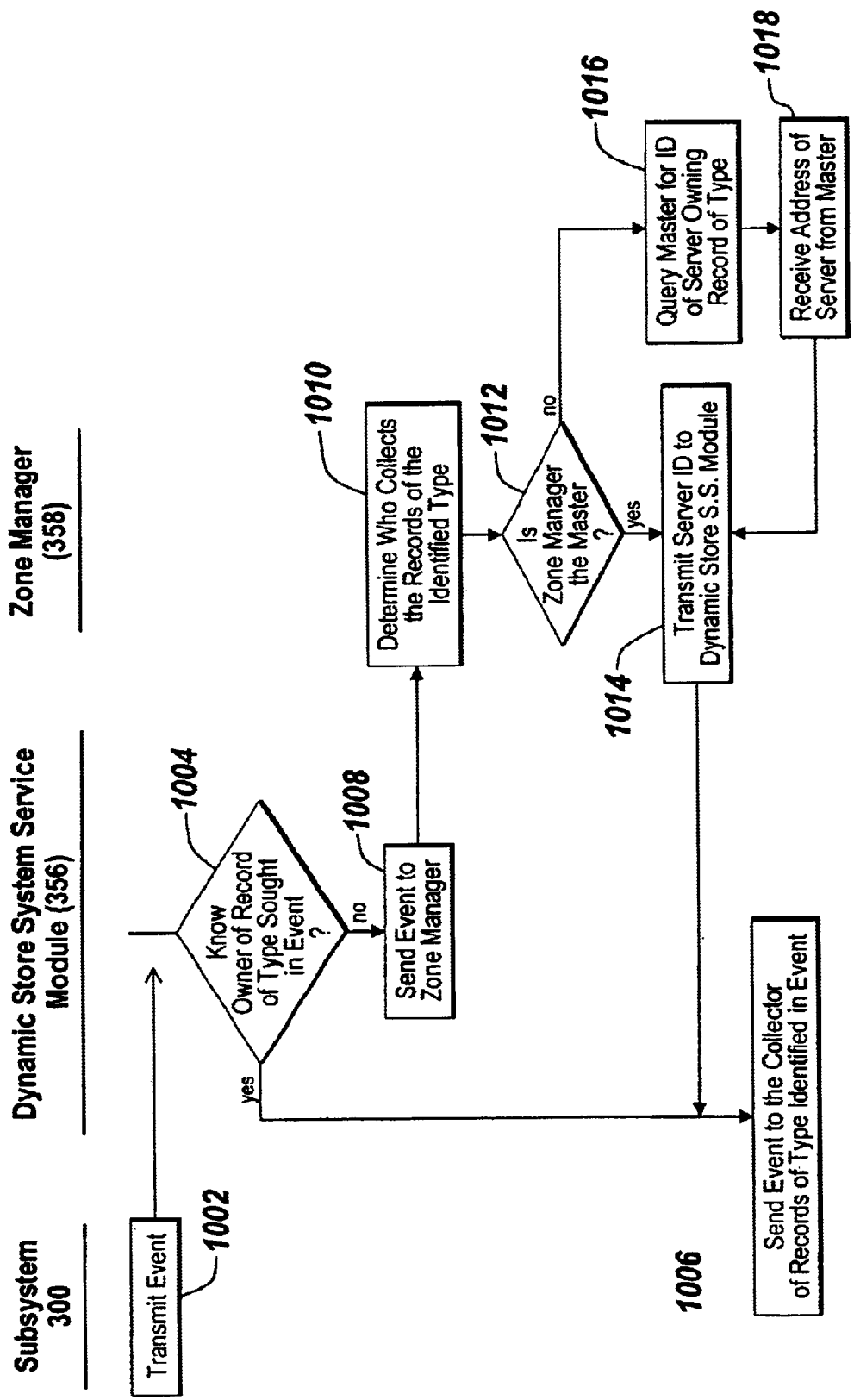
FIG. 10 is a block diagram of an embodiment of a process used to manage run-time data.

Referring to FIG. 10, when a subsystem 300 of a server 180 needs to store or retrieve collector point data stored in dynamic store 240, that subsystem 300 transmits an event to the dynamic store system service module 356 resident on the server 180 (step 1002). The dynamic store system service module 356 determines if it knows which server 180 in the server farm 180' is the collector point of the record type sought by the subsystem 300 (step 1004). For example, the dynamic store system service module 356 may cache associations between the record type and the collector point, and access this cache upon receiving the event from the subsystem 300.

If the dynamic store system service module 356 can determine the server collecting records of the type identified in the event, the dynamic store system service module 356 sends an event to the server 180 responsible for collecting such records (step 1006). If unable to determine the collector point, the dynamic store system service module 356 sends an event to the zone manager 358 seeking the address of the server that collects that record type (step 1008). Upon receiving that event (step 1010), the zone manager 358 determines (step 1012) if it is the master zone manager 358 for the zone. If the zone manager 358 is the zone master, then the zone manager 358 transmits to the dynamic store system service module 356 the identification of the server responsible for collecting events of identified type (step 1014).

If the zone manager 358 is not the master, then the zone manager 358 sends (step 1016) an event to the zone master, which is known as a result of the master election. The zone manager 358 receives the server identification of the zone master (step 1018) and transmits (step 1014) the server identification to the dynamic store system service module 356. Upon receipt of this server identification, the dynamic store system service module 356 accesses the dynamic store 240 according to the event initially received from the subsystem 300. In the event that the zone master does not respond after a predetermined number of requests are sent, the zone manager 358 initiates an election for a new zone master, as described above.

7.0 Subsystems

Whenever a dynamic store table is opened by a server 180 for the first time, the dynamic store contacts the zone master to determine the table owner. A request to the zone master for a table owner always succeeds assuming the requested table name is valid. Even if the table is not known to the zone master, an owner will be designated for it at the time of the request. Any failure to determine the table owner (other than invalid table name) is catastrophic, and will result in an error being propagated back to the component that initiated the connect request.

After the zone master has returned the identity of the server that owns the table in question, the requesting server must contact the owner. If the connection attempt fails after a predetermined number of attempts, the requesting server resets its state and requests the zone master to again identify the table owner. This should eventually result in a new table owner being designated.

After the record table has been successfully opened by contacting the table owner, the communication between requesting server and owning server settles into a set of insert, delete, update, and query requests. If a failure occurs while attempting to perform one of these operations after a predetermined number of attempts, the requesting server will contact the zone master to request a new owner. This process is executed as above. If a new table owner is selected by the zone master, the requesting server will first update the new owner with all local records. Since the new owner will need some time to receive updates from the other hosts in the zone before it will properly be able to deal with the incoming request in some embodiments the requesting server will have to wait for some amount of time before submitting the request.

As described above in section 3.0, each subsystem 300 includes a subsystem access layer (SAL) 304 that defines the application program interface (API) commands to which the subsystem 300 is capable of responding. When one subsystem 300 needs to use the functionality of another subsystem 300', that one subsystem 300 calls the appropriate API command provided by the SAL 304 of that other subsystem 300'. In one embodiment, each SAL 304 is implemented as an object class having data members and member functions. The member functions use the event as a parameter in a command. These command functions include a PostSALEvent function (equivalent to a PostEvent function) and a SendSALEvent function (equivalent to a SendEventAndWait function). The data members include (1) a reference to the subsystem that created the SAL, (2) identification of the subsystem calling the member function using the event as a parameter and (3) identification of the destination subsystem for the event.

When the source subsystem 300 needs to use the functionality of another subsystem 300', the source subsystem 300 creates an instance of the SAL class for that other subsystem 300' and calls the member functions provided by that SAL instance. When called, a SAL member function moves the event into an event buffer 380 and posts the appropriate pointer to the event to the event delivery object 312. For example, the called SAL member function sets the "request bit" in the event ID 712 and issues a SendSALEvent call to post the event and wait for a reply event. As discussed previously, the SendSALEvent call creates a unique channel ID 726 with which the destination subsystem sends a reply for this event to the source subsystem. Upon receiving a reply on the specified channel, the SAL 380 of the source subsystem extracts the data from parameters in the reply event and returns to the blocked thread that called the SAL member function.

If the source subsystem and the destination subsystem are the same type of subsystem, but reside on different hosts, the source subsystem does not need to use the SAL 304 of the receiving subsystem (e.g., the persistent store system service module 352 on one server 180 to the persistent store system service module 352' of another server 180'). In such instances, the source subsystem already knows the events to use to communicate with the destination subsystem without needing to reference the SAL of the destination subsystem. In these embodiments, the source subsystem may directly post an event to the event bus directed to its peer residing on another host.

7.1 Transport Layer

The transport layer 318 serves as the mechanism that allows subsystems 300 on different servers 180 to communicate with each other. The transport layer 318 corresponds to the Open Systems Interconnection (OSI) session and presentation layers in that it sends and receives event messages 700 via the server's network interface, performs encryption/decryption and compression, and manages connections. Connection management involves forming a connection to other servers in its server farm when there is an event message 700 to transmit and dropping the connection after a period of inactivity. The transport layer 318 handles two types of messages—control and event messages.

Control messages are used by the transport layer 318 to determine the compatibility of encryption and compression capabilities (i.e., filters) for servers 180 on each side of the connection. In addition to resolving the transport capabilities of the receiving server during the negotiation cycle and establishing a connection, the control messages also address the shut down of the connection. In preparing to close the connection, the server 180 transmits a message to the remote server on the other side of the connection that notifies the remote server of the impending shut down and the reason for this shut down. However, if the connection is dropped due to uncontrolled interruptions, such as hardware failures or server reboots, the reason field will not be transmitted because the connection has already been dropped. If a controlled shut down occurs, a reason is specified in a reason field in the message which indicates that the shut down is due to one of the following: the server 180 is shutting down, inactivity over the connection has resulted in a time-out, the negotiation of filters was unsuccessful, connection was refused (e.g., wrong password), error in instantiating a filter, etc.

Event messages are used to transport event message data from the transport layer 318 on one server 180 to the transport layer 318' on another server 180'. These messages are generated by the higher layers (e.g., subsystem layer) on the first server 180 and delivered to one of the higher layers in the destination server 180'.

Connection management code within the transport layer 318 provides a set of routines for managing a global host binding table 366. The global host binding table 366 contains host identifiers along with corresponding host names, network addresses and pointers to server structures. A server structure is formed and maintained by the transport layer 318 for each server that is connected to the transport layer 318. The server structure maintains state information relating to that server's connection. The connection management code allows the transport layer 318 to query, add, modify, or delete entries in the global host binding table 366.

A new entry in the global host binding table 366 is created when a subsystem 300 generates an event 700 targeted at a server 180' that has not been previously contacted or upon receiving an event 700 from a remote server for the first time. In this first case, when an event 700 is created by a subsystem 300, the subsystem 300 first assigns an identifier for the remote server 180' and then stores the identifier as a new entry in the global host binding table 366. When the event 700 is received by the transport layer 318, the transport layer 3 18 forms the server structure for that server 180' and inserts a pointer to it in the global host binding table 366. The transport layer 318 then obtains the name of the server 180' from the event 700 and uses the name to look-up the corresponding network address of the server 180' from a domain name server (DNS). The transport layer 318 subsequently stores the network address of the server 180' as a field in the global host binding table 366. Now that the global host binding table has been fully populated to support the transmission of the event 700, the transport layer 318 attempts to establish the connection to server 180'.

In the second case, when a remote server 180' contacts the local server 180, the network address of the remote server 180' is known and the connection management code of the transport layer 318 looks-up the network address in the DNS in order to obtain the name of the remote server. If the name of the remote server 180' does not already exist as an entry in the global host binding table 366, the name along with an associated server structure is created by the transport layer 318 and inserted into the global host binding table. The transport layer 318 subsequently delivers the event 700 in the received packet to the event delivery object 312 for further routing.

Input/output blocking is avoided to the extent reasonable by sending received packets to the kernel for queuing the packets. However, not all operations can be performed without blocking. For example, several blocking operations need to be performed when a server structure for a particular server 180' does not exist, such as querying the DNS for the network address of the server 180'.

The connection to a particular server 180' may be dropped if there has been no traffic over the link for a period of time. Therefore, if a connection needs to be re-established due to a time-out condition, the transport layer 318 queues the packets, reconnects to the remote server 180', and transmits the packets over the communication link. On the other hand, if the connection was dropped because the remote server 180' was shut down, the packets are discarded rather than queued.

7.2 Group Subsystem

Each server 180 in the server farm 110 includes a group subsystem 300 for managing and storing homogeneous and heterogeneous groups of objects (e.g., groups of servers, groups of users, groups of applications, groups of groups, groups with any combination of servers, users, applications, and groups). The grouping of objects simplifies certain tasks for administering the server farm 110, such as authorizing applications to users, distributing and tracking licenses, and balancing server loads. For example, a group can comprise the authorized users of a server 180 hosting a particular application program. This group information is useful in determining whether an additional load on the application program is encroaching on the licensing restrictions for that particular application program.

The group subsystem 300 provides a centralized set of common functions for subsystems to use when performing operations on groups. The common functions provided by the group subsystem 300 operate independently of the type of group. The meaning or utility of a particular group is determined by the particular subsystem that operates upon the group.

The functionality provided by the group subsystem 300 includes creating and deleting groups and adding, deleting, and enumerating members of a group. Any of the subsystems 300 can direct events to the group subsystem 300 to form, destroy, or modify groups, request group information for a particular object member, enumerate all groups available, enumerate groups by type, request a group's name by a unique identifier and vice versa. In addition to managing the groups it creates, the group subsystem 300 also handles the storage of these groups in the persistent store 230 by interfacing with the persistent store system service module 352.

The group subsystem 300 uses unique identifiers associated with each grouped object when establishing relationships within the group and in forming the group itself. Since each object has a unique identifier, the group subsystem 300 can incorporate the identifier into the group that it forms instead of duplicating the object itself.

The group subsystem 300 also provides a number of APIs for other subsystems 300 to manipulate groups. Some of the APIs provided include:

creating a group and returning its unique identifier;

renaming a group;

deleting a group;

obtaining a group's information by its unique identifier;

obtaining all groups that contain a specific object member;

modifying a group's information using its unique identifier;

enumerating all object members within a group;

adding an object member to a group;

deleting an object member from a group;

enumerating all groups of a specific type;

determining if an object member is contained within a group;

obtaining a group's name by its unique identifier or the unique identifier by specifying the group name; and releasing allocated memory.

As an illustrative embodiment of the operation of the group subsystem 300, consider that an administrator wants to install a software product on several servers 180 in the server farm 180. To accomplish this task, an installation program is run on one of the servers 180 in the server farm 110. The installation program instructs the group subsystem 300 to create a group, and to add each server as a member to the created group. This server group is stored in the persistent store 230, which is accessible to all of the group subsystems 300 on every other server 180, through the persistent store system service module.

Installation of the software product then commences on each server 180. When the installation on a server completes, the installation program instructs the group subsystem 300 to delete the member corresponding to that server from the server group. As each server completes the installation, members are removed from the server group.

When the server group contains no members, this indicates that the installation process is complete for each server 180.

7.3 Relationship Subsystem

The relationship subsystem 300 manages relationships (i.e., associations) between objects in response to event messages 700 received from other subsystems 300. The creator/owner of the relationship (e.g., a subsystem 300) specifies whether the relationship is between objects or groups of objects and the type of relationship. The meaning of the relationship is defined and understood only by the subsystem creating it. The relationship subsystem 300 primarily manages and stores the relationship without understanding the meaning of the relationship created by a subsystem 300.

The relationship subsystem 300 assigns a unique identifier to each relationship that it creates and stores the relationships as persistent objects in the persistent store 230. The relationship subsystem 300 also provides a mechanism to handle changes in the objects forming a relationship. For example, when a server 180 is removed from a server farm 110, the subsystems 300 that own a defined relationship involving the removed server notifies the relationship subsystem 300 of the change, and the relationship subsystem 300 subsequently deletes or modifies the relationship.

The data members of a relationship object include the following:
- a relationship identifier that uniquely identifies the relationship object;
- a type that represents the actual meaning of a relationship (e.g., an "authorization" type represents that a user has administrative access privileges);
- an attribute object identifier that contains information about a certain type of relationship (e.g., for an "execution server" type, meaning that an application has been load balanced on a particular server 180, an attribute object can specify the network location of that application on the server 180); and
- data to represent the unique identifiers and/or distinguished names of each object involved in the relationship.

The relationship subsystem 300 also provides APIs that allow other subsystems 300 to use the functionality of the relationship subsystem 300, although the relationships themselves can only be accessed by their owner subsystems. The functionality provided by the SALs include:
- creating a relationship;
- deleting a given relationship;
- delete all relationships with a given set of data members;
- enumerate all relationships having a common set/subset of members; and
- getting and setting the unique identifier of an attribute for a given relationship.

As an example, consider an administrator of the server farm 110 who desires to apply a load evaluator to two or more servers 180 of the server farm 110. First, the load management subsystem communicates with the group subsystem 300 to form a group that comprises a set of rules for the load evaluator. Then the load management subsystem communicates with the relationship subsystem 300 over the event bus 310 to create an association between the load evaluator and each server 180. When one of such servers 180 requests load balancing, the load management subsystem queries the relationship subsystem 300 to determine the load evaluator associated with that server and applies each of the rules under the load evaluator to determine the load of the server.

7.4 Load Management Subsystem

The load management subsystem (LMS) provides a load management capability that selects which server 180 in the server farm 110 will service a client request, i.e., which server 180 will execute an application for a client 120. In general, the LMS manages overall server and network load to minimize response time to client requests.

In one embodiment, the LMS is rule-based, and an administration tool 140 can be used to modify or create rules for managing server load. A rule is one or more criteria that influences how a LMS will direct requests. Rules may be individualized to a specific server 180. Rules can also be individualized to a specific application on a per-server basis. That is, one or more rules may be associated with a copy of an application residing on a first server 180 in the farm 110 and different rules may be associated with a copy of the same application residing on a second server 180 in a farm 110. The output of rules individualized to a specific application may be combined with the output of general server rules to direct a client request.

Rules use the output from one or more operational meters. Operational meters may measure any aspect of server performance and the result is used by rules to help determine which server 180 is most appropriate to service a client request. For example, operational meters may measure: processor load; context switches; memory usage; page faults; page swaps; transmission rate of input/output reads or writes; number of input/output operations performed. In one embodiment, operational meters are used by a LMS to measure server performance during the occurrence of certain events such as a request for a client connection. In another embodiment, operational meters are used by a LMS to measure server performance at predetermined intervals, which may be configured by an administrator. A LMS on each server 180 in the farm 110 evaluates various performance metrics for the server 180 for each predetermined period of time and stores that information in the dynamic store 240 by sending an event message to the dynamic store system service module 356. For example, every thirty seconds, an evaluation of server load may include a query to operational meters for server's CPU utilization and memory utilization. The results from the query will be used, in conjunction with other applicable load factors, to calculate a load number for this server load. The new load number is then sent to the dynamic store.

In these embodiments, the LMS may subscribe to a "change interval" event issued by the administration tool subsystem in order to be notified of the proper predetermined interval to be used. That is, the "change interval" event informs an LMS that a new value for the interval has been stored in the persistent store. Alternatively, the administration tool 140 may send a "change interval" event to one LMS present in a server farm 110. That LMS both updates the interval value stored in the persistent store 230 and sends an event to all other LMS present in the server farm 110 informing them to retrieve the new interval value from the persistent store 230. In still other embodiments each LMS may monitor the persistent store 230 for a change in the interval value.

In one embodiment, there are two different interval settings: one for resource load sampling, and another for the LMS Monitor utility. In still another embodiment, a separate interval may be used by each operational meter associated with a server 180. Operational meters may be provided by a dynamically linked library, such as the pdh.dll library manufactured by Microsoft Corporation of Redmond, Wash.

Rules and operational meters are, in one embodiment, executable code modules that query specific system conditions, resources, and performance metrics for servers 180 in the server farm 110. Some of the rules accept user-configurable parameters that are entered by the administrator via the administration tool 140.Rules may be provided to the LMS using a dynamic link library ("DLL"), and the rules and rule parameters applicable to a specific server may be stored in the persistent store 230. That is, the administrator's selection of rules are stored, together with a weighting factor and applicable settings associated with those rules, in the persistent store. For example, some operational meters may measure load at a predetermined interval; the predetermined interval may be set by the administrator.

Examples of conditional rules that may be used by the LMS to determine to which server 180 to direct a request include: whether the number of clients 120 that may connect to a server 180 is limited; whether the number of client sessions that may be serviced by a server 180 is limited; the number of application or connection licenses available to a server 180; whether a server 180 is a member of a particular zone; whether the application requested by the client 120 is currently executing on the server 180; whether a client is physically proximate to, or is connected by a high bandwidth link to, a server; and whether a client request is being made during a time period for which the server 180 is available to service client requests.

A set of rules may be grouped together by the group subsystem 300 to form a load evaluator associated with a particular server or a particular application. A server load evaluator is a load evaluator that applies to all applications published on the server. An application load evaluator is a load evaluator that encapsulates rules specific to certain applications. In one embodiment, loads for published application programs are the sum of a server load evaluator and an application load evaluator. The load evaluator associated with a particular server may be stored in the persistent store 230. When a LMS initializes, it queries persistent store 230 to determine whether a load evaluator is associated with the server 180 on which the LMS resides. If so, the rules and operational meters are loaded and the LMS begins using those elements of the load evaluator. The outputs of the constituent parts of the load evaluator are combined to calculate composite indicia of the load on particular servers, and each LMS stores the results of its load evaluator in dynamic store. Each rule encapsulated in a load evaluator may have a configurable weighting factor. Many rules have user-configurable parameters that control the way LMS loads are calculated. For example, in one embodiment, a CPU Utilization rule has two parameters: Report Full Load when processor utilization is greater than X percent; report no load when processor utilization is less than X percent. In one particular embodiment, the load reported by a load evaluator equals the sum of each rule's load times each rule's weight.

In another example, a server 180 that hosts four applications may have three load evaluators with which it is associated. The server itself and a first application may by associated with a first load evaluator, the second and third applications may be associated with a second load evaluator, and the fourth application may be associated with a third load evaluator. When the server 180 boots, it read the first, second, and third load evaluators from the persistent store 230. Periodically (or perhaps after certain events) the server 180 calculates the output for each of the load evaluators and sends those values to the dynamic store. When a connection request is received, those values are used to determine if the server 180 should service a client request.

For example, using operational meters the LMS can obtain information about the processor load on a particular server 180, the memory load on that server 180, and the network load of that server 180. The LMS combines these results to obtain an overall load number that indicates the total aggregate load on that server 180. In determining the aggregate load, the load evaluator may weight each piece of information differently. For embodiments in which a rule is associated with a server 180, the rule may disqualify a server 180 from servicing a client request. For example, a rule may limit the number of client sessions a server 180 may initiate. In this embodiment, if a server 180 is currently servicing the maximum number of client sessions allowed by the rule, it will not be chosen by the LMS to service a new client request, even if the outputs of its operational meters indicate that it is the most favorable server 180 to which to route the client request.

In one particular embodiment, load balancing loads are ranged between 0–10,000, with 0 representing least loaded and 10,000 representing fully loaded. LMS spawns a thread update load evaluator information in the dynamic store every 30 seconds with the updated load of all load evaluators used by that server 180.

In operation, the LMS receives an event message requesting a server ID to which a client request should be directed. The LMS queries load evaluator information associated with the requested application. If necessary, calculations based on component weightings may be made. In one particular embodiment, some rules force a calculation of the load evaluator at the time of the request. For this type of rule, the results of the load evaluation are not updated to the dynamic store in a timely interval, but when a client request comes through. A rule of this type may be used to allow servers to only service clients within a particular zone 260, 270. The LMS returns a server ID to the requesting subsystem via an event message.

In one particular embodiment, the LMS sends an event to the administration tool subsystem each time a client connection is requested and another message indicating to which server 180 the client connection was directed. This allows the administration tool to maintain a log of client connections for future reference.

An administration tool 140 may be used to modify or create rules, group rules into load evaluators, or display the results of a load evaluation for a particular server 180. In one particular embodiment, the administration tool 140 displays to the administrator a graphical representation of the output to the load evaluator, together with a graphical representation of the output of the operational meters comprising the load evaluator.

Similarly, an administrator can use the administration tool 140 to query the load information for each server 180 and display this load information in accordance with a particular requested view. For example, the administrator may display overall server load, the value of a particular operational meter or rule at a particular time, or some combination of these views. In one embodiment, the administrator may "test" the LMS by requesting the LMS to perform a server load calculation and display the server 180 to which a client would have been connected had a client made a request. The load information displayed by the monitoring system may include current as well as historical data (e.g., processor and memory utilization, page fault occurrences) for a particular server 180 or application.

7.5 License Management Subsystem

Each server 180 in the server farm 110 includes a license management subsystem for configuring and maintaining licenses for those subsystems 300 that require a license to operate and for controlling the number of connections to such subsystems 300. The license management subsystem manages two types of licenses (1) feature licenses, and (2) connection licenses. In brief overview, the license management subsystem uses feature licenses to control access to "features" of licensed software products, such as load management, and connection licenses to control the number of user connections allowed by those licensed software products. A feature can be some aspect or particular functionality of the software product, or the feature can be the entire product that will not work without a feature license.

Not every subsystem 300 in a server 180' requires a feature license to operate. Those subsystems 300 that require a feature license (e.g., a specialized server subsystem of the MetaFrame 2.0 software product) cannot perform the licensed capability or grant client connections without obtaining the feature license from the license management subsystem.

Figure 11:
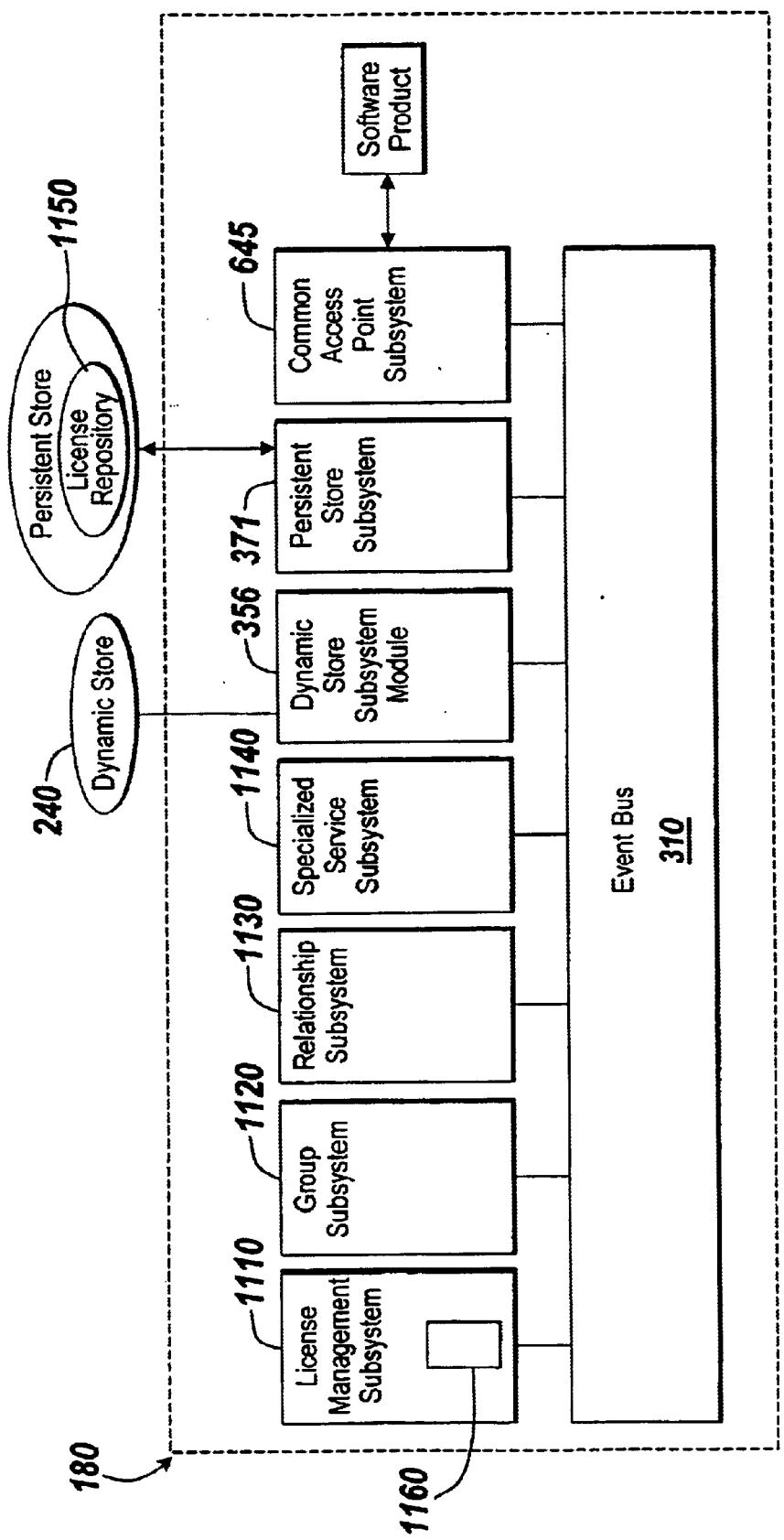
FIG. 11 is a block diagram of an embodiment of a server including a license management subsystem.

FIG. 11 shows one embodiment of the server 180 in the server farm 110 in which the subsystems 300 include a license management subsystem 1110, a group subsystem 1120, the persistent store system service module 352, the dynamic store system service module 356, a relationship subsystem 1130, a specialized server subsystem 1140, and a common access point subsystem 645 in communication with the event bus 310. Those subsystems shown in FIG. 11 are for purposes of describing the behavior of the license management subsystem 1100. The server 180 can include other types of subsystems 300.

The license management subsystem 1110 communicates with the group subsystem 1120 over the event bus 310 to form and maintain a logical grouping of licenses (hereafter, "license groups") to facilitate license pools, assignments, and groups. A license group includes a collection of license strings, described below, and/or other license groups. License groups collect licenses of similar features and consequently enable pooling of licenses. A pooled license is a license that is available for use by any server 180 in the server farm 110. Each license group holds the collective capabilities of the licenses in the license group and the other license subgroups (i.e. other license groups within a license group). Information relating to license pools is, in one embodiment, maintained in the dynamic store 240. In this embodiment, each license management subsystem 1110 stores locally the total number of licenses and the number of license assigned to a server 180 in the server farm 110. Upon granting a pooled license, the granting license management subsystem 1110 makes an entry in the dynamic store 240 indicating that a pooled license in "in use." Every other license management subsystem 1110 recognizes that such pooled license is unavailable for granting. In one particular embodiment, the dynamic store 240 store server ID/client ID pairs associated with each license group to identify pooled licenses that are in use.

The relationship subsystem 1130 maintains associations between licenses and servers and between license groups and servers. The associations define the number of licenses for each license and license group that only the associated server 180 may obtain (i.e., "local licenses"). A local license is a license that is assigned to one server in the server farm 180 and is not shared by other servers 180. The license management subsystem 1110 communicates with the relationship subsystem 1130 to create, delete, query, and update such associations. The common access point subsystem 645, described in section 7.11 below, provides remote procedure calls (RPCs) for use by software products residing on the server 180. These RPC interfaces enable such software products to communicate through the common access subsystem 645 to access licensing information.

Referring to FIG. 11, the specialized server subsystem 1140, described in section 7.10 below, communicates with the license management subsystem 1110 to obtain a feature license for each capability of the specialized server subsystem 1140 for which a license is required. This occurs at initialization of specialized server subsystem 1140 and after any license event (described below). If unable to obtain the feature license, the specialized server subsystem 1140 restricts the functionality that the subsystem would provide with a license. Also, the specialized server subsystem 1140 uses the license management subsystem 1110 to obtain client connection licenses whenever a client session is initiated with the server 180.

The license management subsystem 1110 communicates with the persistent store system service module 352 to store feature and connection licenses in a license repository 1150 as license strings formed in accordance with a naming convention. The license repository 1150 resides in the persistent store 230. Cyclical redundancy checks (CRC) prevent tampering of the licenses while such licenses are stored in the license repository 1150. The license management subsystem 1110 also stores information related to the license strings in the license repository 1150. For example, the information may indicate which licenses are assigned to which servers 180 of the server farm 110 and, in some embodiments, the activation status of each license. In one embodiment, a connection license table 670 stores identifiers of those clients that have obtained a connection license.

The license management subsystem 1110 supports three categories of events. One category includes events 700 that other subsystems 300 send to the license management subsystem 1110. For example, the common access point subsystem 645 may send an event to the license management subsystem 1110 requesting a feature license. A second category includes events 700 that the administration tool 140 sends to the license management subsystem 1110. For example, an administrator may use the administration tool 140 to add or delete licenses from the license repository 1150. A third category includes events 700 that the license management subsystem 1110 transmits to other subsystems. For example, the license management subsystem 1110 can send an event to the persistent store system service module 352 requesting enumeration of licenses assigned to the server 180 or a list of all types of licenses and license strings available.

The license management subsystem 1110 also supports configuration tasks needed by the administration tool 140 or command-line utilities (i.e., a software product that communicates through the common access subsystem) for the maintenance of license strings and license groups. One configuration task is adding a license string to the license repository 1150. For example, when adding a feature license to table 660, the license management subsystem 1110 ensures that the corresponding license string is unique (by checking the added license against the license stored in the persistent store 230) and correct (using a CRC). In one embodiment, the license management subsystem 1110 records the time of storing the license string, called the installation time. If the user removes that license string before the activation of the license and later reinstates the license, the license management subsystem 1110 uses the initial installation time, and not the current time of the reinstallation, for that license string. This prevents the user from removing and reinstalling a license string in order to renew a grace period (i.e., a trial period for using the licensed capability). After completing the addition of the license string to the license repository 1150, the license management subsystem 1110 issues a license change event 700.

Another configuration task is to remove a license string from the license repository 1150. In one embodiment, the license management subsystem 1110 marks the license string as removed but does not actually remove it. This allows restorations of the license string with the original installation time, as described above, if the license is later reinstalled. If the subject license string was not activated before removal, the license string is actually removed from the repository.

Another configuration task is to activate a license string. To activate a license string, the user connects to a Web server, enters the license string through a presented Web page, and receives an activation code from the Web server. The activation code is submitted to the administrator of the farm 110 and entered by the administrator using the administration tool or the command-line utility to activate the license string. The license management subsystem 1110 verifies the CRC for the license string is valid and marks the license as activated in the persistent store 230. Activating the license string prevents expiration of the license and prevents multiple use of that license string.

Other configuration tasks include assigning license groups to servers and migrating older (i.e., legacy) license strings to the naming convention used by the protocol of the server farm 110. An example of such license migrating is incorporating paper licenses into the license repository 1150 during installation of a base product on the server 110. Installation takes the old licenses out of the registry and stores them in persistent store 230 through the common access point subsystem 645.

In one embodiment, the license management subsystem 1110 supports events from subsystems 300 requesting use of a licensed capability, such as a request for an available pooled license. The event includes the UID of the subsystem 300 requesting the license and the UID of the server 180 upon which that subsystem 300 resides. The event also contains the license type requested (i.e., feature or connection license) in the form of a license group ID. The actual license group ID stored in the persistent store 230 is arbitrary, but adherence to the naming convention provides flexibility for the future addition of new software products (i.e., subsystems) to the server 180.

As described above, the event also provides a unique identifier of the licensed capability. For example, for a feature license, the unique identifier may be a random number generated by the issuer of the event (e.g., an external software product), provided that the random number is chosen from a suitably large number space. In another embodiment, the unique identifier is the UID of the requesting subsystem 300. For this embodiment, the UID of the requesting subsystem and the unique identifier have the same information. For a connection license, the unique identifier may be the client ID. Thus, the UID of the requesting subsystem and the unique identifier can be different.

The event sent by a requesting subsystem 300 seeking a license includes (1) an indication of the license group type, the identity of the client and server requesting the license, and a "force acquire" flag. An indication of license group type may include identification of a feature license, such as a load management, or a connection type license, such as a software application product. The field identifying the client and server seeking the license may include the unique identifier associated with the server and the client. The force acquire flag may be used, for example, to reacquire connection licenses after a license change event. A license change event indicates that licensing information in the persistent store 230 has changed; for example, a license has been deleted, added, or assigned. Upon a license change event, each server 180 attempts to reacquire all connection licenses that it possessed before the license change event because the particular cause of the license change event is unknown to that server. This flag, if set, indicates that a connection license must be acquired even if doing so increases the number of connections to the server 180 in excess of the predetermined maximum number of allowable connections. No new connection licenses are subsequently granted until the number of connection licenses in use drops below this predetermined maximum number. In this manner, a client connection will not be terminated in mid-session due to a license change event.

In one embodiment, the license management subsystem 1110 also supports the operation of another subsystem 300 returning a license to the pool. The subsystem 300 specifies the same unique identifier used when requesting that license. The license subsequently is returned to the pool if the license is not in use elsewhere (i.e., same client logged into a different machine).

Figure 12:
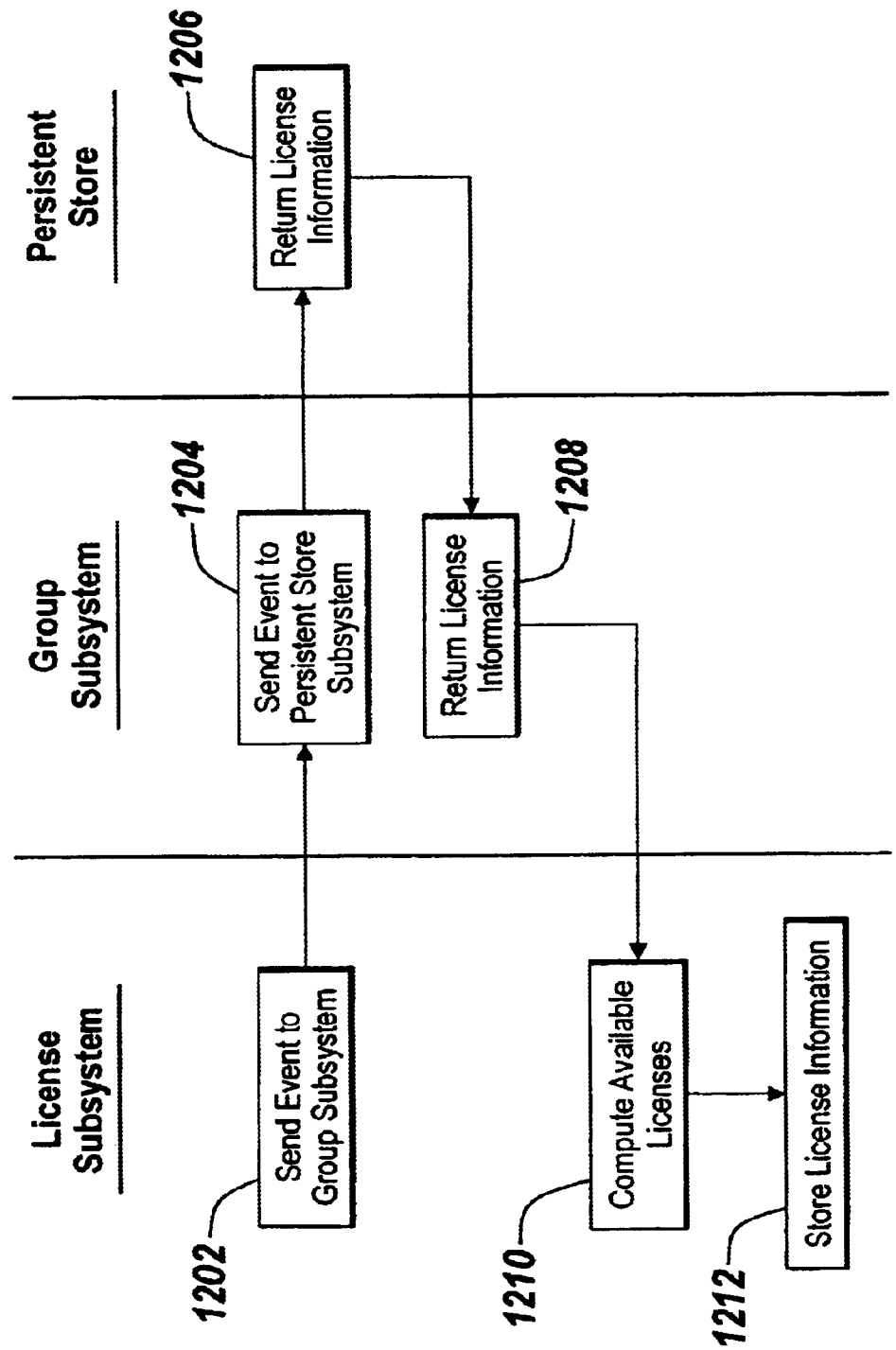
FIG. 12 is a flow chart of an embodiment of a process used during initialization license management subsystem.

Referring now to FIG. 12, the steps taken by a license management subsystem upon initialization are shown. The license management subsystem 1110 sends an event message to the group subsystem 1120 (step 1202) to determine which groups of licenses, if any, are assigned to the server 180 on which the license management subsystem 1110 is resident. The group subsystem 1120 sends a message to the persistent store 230 (step 1204) to determine if any licenses have been permanently assigned to the server 180. The persistent store system service module 352 accesses the persistent store 230 and sends a message responding to the group subsystem 1120 that includes assignment information and license group information (step 1206). The returned information includes the total number of available licenses and which, if any, are permanently assigned to the server 180. The group subsystem 1120 sends a reply event to the license management subsystem 1110 with the information returned from the persistent store 230 (step 1208). The license management subsystem 1110 stores information relating to the licenses that are permanently assigned to the server 180 (step 1210) and uses information associated with the total number of licenses to calculate the number of available pooled licenses (step 1212). In one embodiment, the number of pooled licenses available is equal to the number of total licenses minus the number of licenses permanently assigned to a server 180 in the server farm 110. The license management subsystem 1110 also takes these steps after receipt of a "license change" event.

Figure 13:
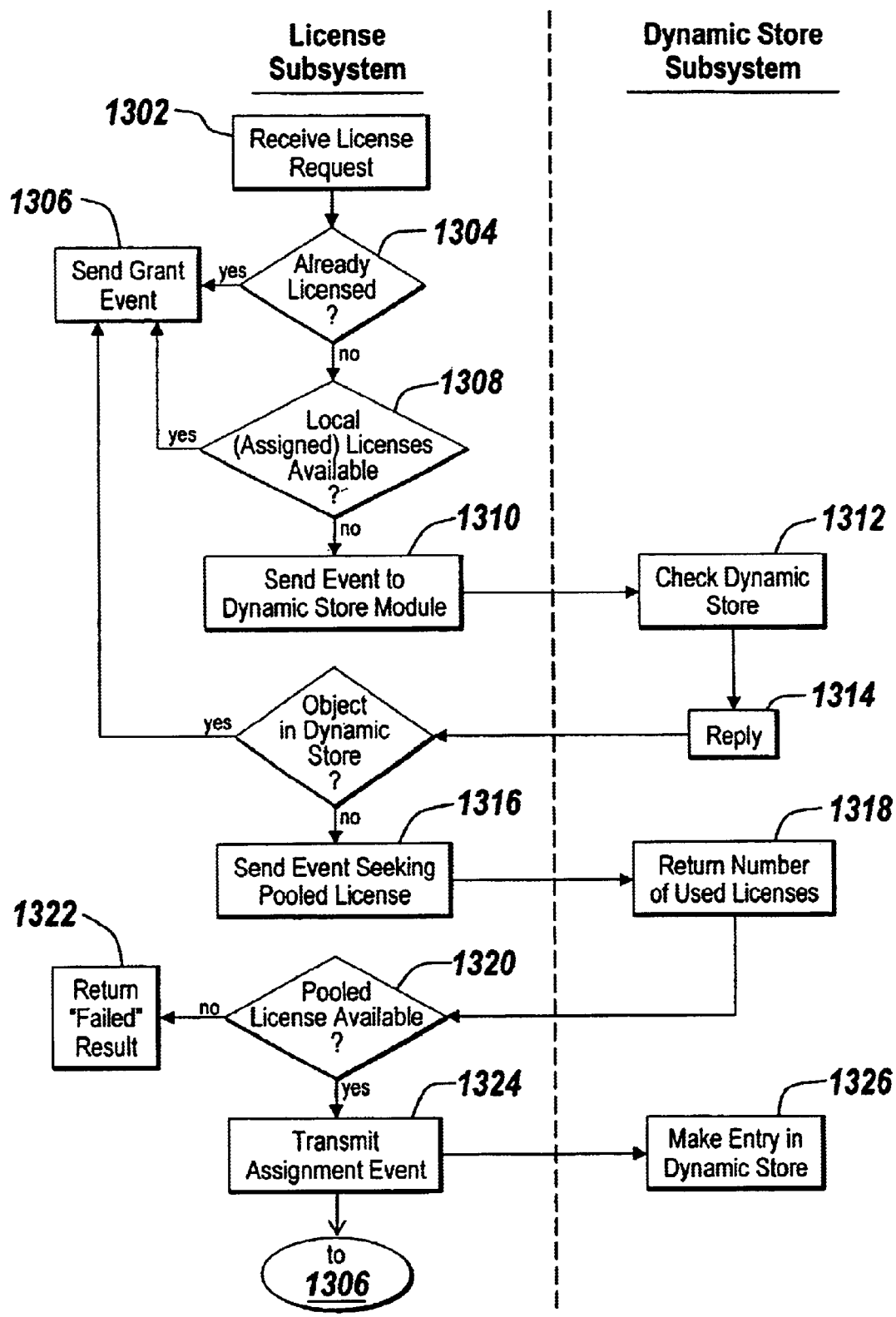
FIG. 13 is a flow chart of an embodiment of a process used by the license management subsystem in response to a license request.

Referring now to FIG. 13, the steps taken by the license management subsystem 1110 to respond to a license request is shown. The license management subsystem 1110 receives a license request (step 1302), generally from the specialized server subsystem 1140. The request can be for a feature license or for a connection license. The license management subsystem 1110 determines if the license has already been granted (step 1304), i.e., the feature (such as load balancing) has already been started or a connection for a client already exists. If the license is already granted, the license management subsystem 1110 sends a "grant" event to the license requestor (step 1306). If the license has not been previously granted, the license management subsystem 1110 determines if a local license, i.e., a license that has been permanently assigned to the server 180, is available. In some embodiments, the license management subsystem 1110 performs this determination by checking local memory. If a local license is available, i.e., the server 180 has more licenses permanently assigned than currently granted, the license management subsystem 1110 sends a "grant" event to the license requestor (step 1306).

If no local licenses are available, either because all local licenses have been granted or because the server 180 has no assigned licenses, the license management subsystem 1110 sends an event to the dynamic store system service module 356 to determine if a pooled license has already been assigned (step 1310). The dynamic store system service module 356 checks the dynamic store 240 (step 1312) and returns an event to the license management subsystem 1110 indicating whether a pooled license is already associated with the feature or with the client seeking the connection license (step 1314). If a pooled license had already been granted, the license management subsystem 1110 transmits a "grant" event (step 1306) to the license requester. If not, the license management subsystem 1110 sends a message to the dynamic store system service module 356 to determine if a pooled license is available (step 1316). The dynamic store system service module 356 looks up in the dynamic store 240 the number of pooled licenses currently in use and returns that result to the license management subsystem 1110 (step 1318). The license management subsystem 1110 uses that information, together with the information indicating the total number of available pooled licenses it calculated at initialization to determine if a pooled license is available (step 1320). If not, the license management subsystem 1110 returns a "failed" event to the license requestor (step 1322).

If, however, a pooled license is available, the license management subsystem 1110 transmits an event to the dynamic store system service module 356 indicating that it is assigning one of the available pooled licenses (step 1324), and the dynamic store system service module 356 makes an appropriate entry in the dynamic store 240 (step 1326). The license management subsystem 1110 also transmits a "grant" event to the license requestor (step 1306).

7.6 User Management Subsystem

Figure 14A:
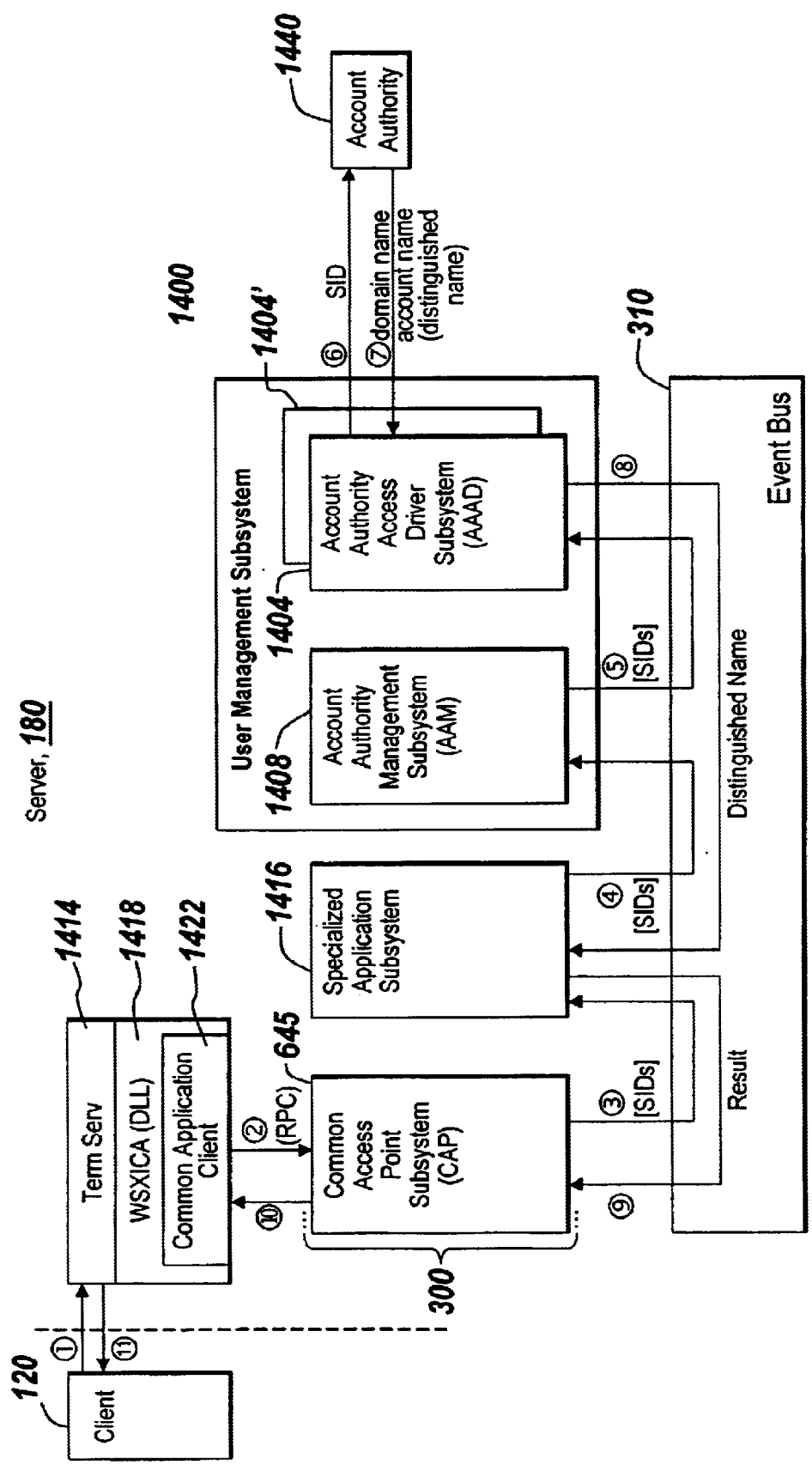
FIGS. 14A–14B are block diagrams of embodiments of a server including a user management subsystem.

Referring to FIG. 14A, each server 180 in the server farm 110 includes a user management subsystem 1400 for managing users of clients, user groups, and association groups in accordance with the principles of the invention. A user group is a collection of users identified together under one name to facilitate management of users (e.g., authorizing a user group to use an application program, and consequently, every user belonging to that user group, in contrast to needing to authorize each use individually). An association group, described in greater detail below, associates user accounts and user groups so that servers 180 can provide the client 120 with a complete view of resources (i.e., applications and servers) available to that client 120 in a server farm that has a heterogeneous set of servers 180 (e.g., WINDOWS NT servers and Unix servers).

Association groups provide a solution to the potential incompatibility of WINDOWS NT-based subsystems with Unix servers in the server farm 110 when the client seeks to determine all resources of the farm that are available to that client. Consider a client 120 that has an account on a WINDOWS NT server and another account on a Unix server, where the account name for the user (e.g., "user 1") is the same for both accounts. When the user of the client 120 attempts to determine all applications on the WINDOWS NT server and on the Unix server that the user can execute, prior art techniques for enumerating applications generally do not enable the user to see both sets of applications simultaneously. If the user logs on to the WINDOWS NT domain, the user sees the applications on the WINDOWS NT server. If the user logs on to the Unix server, the user sees the applications on the Unix server.

In accordance with the principles of the invention, an association group associates both account names with a single user. Accordingly, when the user logs on to either the NT server or the Unix server, the user can see applications on both the NT server and the Unix server with a single request.

Association groups have two types: (1) account association groups and (2) account authority association groups. All members of an account association group are considered to be the same user.

Account authority association groups simplify the task of the administrator for establishing an account association for every username. For example, if a user has a user account in a "DOMAIN1" account authority and a user account in a "DOMAIN2" account authority, an account authority association group includes both DOMAIN1 and DOMAIN2. Accordingly, when the user logs on to one of the domains, e.g., DOMAIN1\user1, the user management subsystem 1400 uses the account authority association group to infer an account association group containing DOMAIN1\user1 and DOMAIN2\user1. To avoid ambiguity in resolving membership, a user account can be a member of only one association group and the account authority on which that user account resides must not belong to any account authority association group.

In brief overview, the user management subsystem 1400 provides an interface between the subsystems 300 and account authorities 1440. An account authority is a database, external to the server farm 110, that is usually a component of an operating system or is provided by a third party. The account authority, in general, determines whether users are permitted to log on to the server 180. Examples of types of account authorities include NTDOMAIN and ACTIVE DIRECTORY account authorities produced by Microsoft Corp. of Redmond Wash., NOVELL DIRECTORY SERVICE (NDS) produced by Novell of Provo, Utah, and varieties of Unix.

The server 180 trusts the account authority; that is, the server 180 accepts that the account authority correctly performs the functions of identifying and authenticating users that want to log on to the server 180. Thus, when a user attempts to log on to the server 180, the account authority determines whether to grant or deny the user access to that server 180. In addition to the account authority 1440, the server 180 can trust other account authorities.

In FIG. 14A, one embodiment of the server 180 in the server farm 110 includes the user management subsystem 1400, a specialized application subsystem 1416, and a common access point subsystem 645 in communication with the event bus 310. Those subsystems shown in FIG. 14A are for purposes of describing the behavior of the user management subsystem 1400. The server 180 can include other types of subsystems 300.

The user management subsystem 1400 is in communication with an account authority 1440. The account authority 1440 maintains user accounts. A user account contains the information required for a user to log onto the server 180 (e.g., a password). The user account also specifies the access rights or permissions (e.g., read, write, delete, etc.) possessed by the user after the user has successfully logged on.

The account authority 1440 also maintains user-group accounts, which are accounts that logically place user accounts into groups for minimizing administrative tasks.

A descriptor describing the account authority type and a descriptor describing an account authority instance (e.g., "engineering") together uniquely identify each account authority 1440 trusted by the servers 180 of the server farm 110. These descriptors are presented in events or in entries of the persistent store 230 in which the identity of an account authority 1440 is expected.

The general format of the identity of the account authority can be represented as:

\account authority type\account authority instance,
where the backslashes ("\") operate as delimiters.

For example, if the account authority type is NTDO-MAIN and the account authority instance is "engineering" then the unique identifier for the account authority is "\NTDOMAIN\engineering"

Users and user groups are, in one embodiment, represented as objects. Each object has a distinguished name that uniquely identifies that object to every server 180 in the server farm 110. The distinguished name of an object is used when accessing or storing the object in the persistent store 230, or when communicating among the subsystems 300 to perform operations on that object.

The distinguished name for a user account or a user group account object includes an account identifier and the distinguished name for the account authority on which that user account or user group account resides. The account instance identifier is a particular instance of the user account or user group account and depends on the type of account authority. For example, account instance identifiers for user account objects in an NT domain are string representations of a binary security identifier (SID). The general format can be represented as:

\object type\account authority type\account authority instance\account instance identifier, where object type identifies the type of object, which is either a user account object or a user group account object. For some types of account authorities (e.g., within NT domains), the account authority instance is encoded with the account identifier (e.g., a SID). Given the account identifier, the account authority instance can be derived.

As an example of a distinguished name for a user account object, if the distinguished name for the account authority type is "NTDOMAIN", the account authority instance is "DEVELOP," and the account instance identifier is "security_ID", then the distinguished name for the user account object is "\USER\NTDOMAIN\DEVELOP\security_ID."

As an example of a distinguished name of a user group account object, if the distinguished name for the account authority type is "NTDOMAIN", the account authority instance is "DEVELOP," and the account instance identifier is "group_security_ID" then the distinguished name for the user group account object is "\GROUP\NTDOMAIN\DEVELOP\group_security_ID."

The use of distinguished names, as described above, produces a naming format that accommodates a variety of operating system platforms, despite the disparate naming schemes used by those platforms. For example, if one server 180 in the server farm 110 operates on a WINDOWS/NT platform, and another server 180' in the server farm 110 operates on a UNIX platform, the naming scheme for identifying WINDOWS/NT users is incompatible with the naming scheme for UNIX users. Using distinguished names provides a common representation for users of both operating systems.

Further, distinguished names provide a naming convention that uniquely identifies and indirectly references data maintained by the account authorities. Thus, distinguished names are references to this data. These references, and not the actual data maintained by the account authorities 1140, are stored on the persistent store 230 and/or are passed among subsystems 300. In general, the servers 180 and subsystems 300 do not modify any such data stored on the account authorities, nor are these servers 180 and subsystems 300 notified of any modifications to the data by external utilities. Accordingly, the actual account authority data are not imported into the persistent store 230 to avoid producing redundant copies of the data that can become out-of-date without notification.

Referring again to FIG. 14A, in one embodiment, the user management subsystem 1400 includes one or more account authority access driver subsystems 1404, 1404' (generally 1404) and an account authority management subsystem 1408. There is one account authority access driver subsystem 1404 for each type of account authority 1440 trusted by the server 180. Each account authority access driver subsystem 1404 converts data (e.g., an array of SIDs) received from the respective account authority (hereafter referred to as external data) into the data representation (e.g., distinguished names) understood by the subsystems 300 (hereafter referred to as internal data).

External data are operating system platform specific (i.e., depend upon the type of account authority). Generally, external data are not understood by the subsystems 300 and do not pass over the event bus 310. Examples of external data are SIDs and ACLs (Access Control Lists). Internal data are data that pass as event parameters to and from the subsystems 300 over the event bus 310.

The account authority management subsystem 1408 provides a central management point for all account authority access driver subsystems 1404. At the initialization of the server 180, all account authority access driver subsystems 1404 register with the account authority management subsystem 1408. Upon registration, the account authority management subsystem 1408 creates a registration list. The account authority management subsystem 1408 makes available the registration list for all supported account authorities to the subsystems 300 of the server 180. The account authority management subsystem 1408 handles events to resolve which account authority access driver subsystems 1404 support a particular account authority. The account authority management subsystem 1408 also maintains information about the trust relationships that each server 180 in the farm 110 has with account authorities. The account authority management subsystem 1408 provides an interface to control and query the association groups in the farm.

Other subsystems 300 communicate with the account authority access driver subsystems 1404 by first calling the account authority management subsystem 1408 to retrieve the subsystem ID of a specific account authority access driver subsystem 1404. After obtaining this subsystem ID, subsequent communication occurs directly with that specific account authority access driver subsystem 1404. Consequently, the subsequent communication avoids the "double-hop" that would occur if the account authority management subsystem 1408 remained in the middle of all subsequent communications with the account authority access driver subsystem 1404.

To establish a list of trusted account authority instances, the account authority management subsystem 1408 periodically requests and obtains a list of trusted account authority instances from each account authority access driver subsystem 1404 that has registered with the account authority management subsystem 1408. The account authority management subsystem 1408 delivers the obtained information to the persistent store 230 for placement in a server trust table (shown in FIG. 14B). The account authority management 1408 uses this information about the trust relationships to route events to a server 180 with an account authority access driver subsystem 1404 that trusts the account authority on which the operation needs to be performed.

Figure 14B:
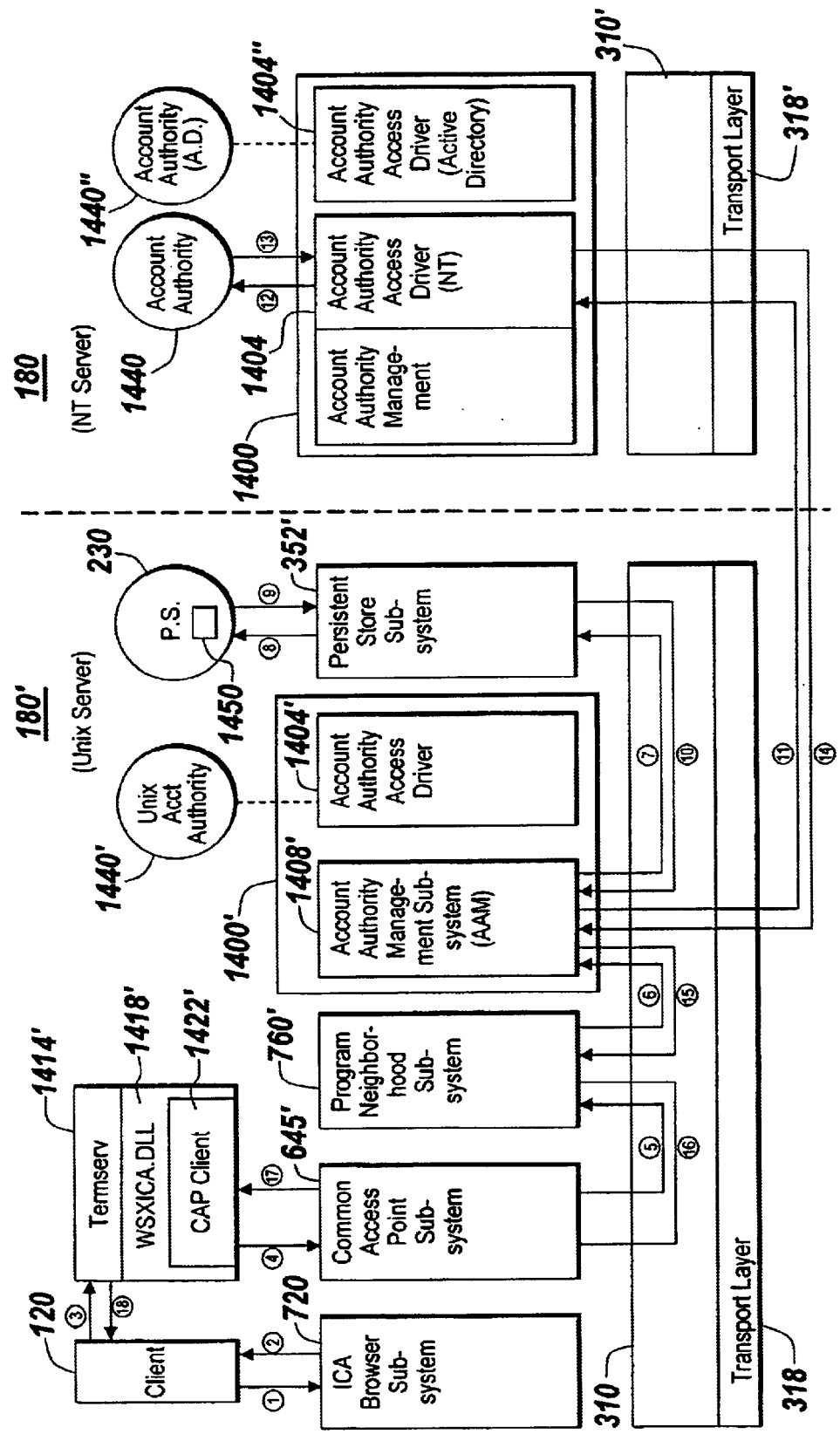

Referring to FIG. 14B, the process of authorizing a user of the client 120 is now illustrated by way of example. In brief overview, the client 120 communicates (arrow 1) with terminal server logon software 1414 on the server 180 to establish a connection to the server 180. From login information provided by the client 120, namely the credentials of the user (i.e., the username and password) and identity of the account authority (i.e., the account authority type descriptor and instance descriptor), the terminal server logon software 1414 authorizes the client connection.

During the logon process, the terminal server logon software 1414 sends (arrow 2) a handle to a security token (hereafter, login information) of the user who wants to logon to the common access point subsystem 645. The common access point subsystem 645 passes the data referenced by the handle onto the event bus 310 for the user management subsystem 1400 to convert into a list of distinguished names of accounts that represent the security access of the user. This list of distinguished names is then used by the specialized application subsystem 1416 to determine if the user has permission to access a requested application.

In particular, software 1418 (referred to as "WSXICA") provides an interface between the terminal server logon software 1414 and the common access point subsystem 645. The WSXICA 1418 includes common access point client software 1422 that issues an RPC call to the common access point subsystem 645. The common access point subsystem 645 sends the login information passes (arrow 3) to the specialized application subsystem 1416 of the server 180. The specialized application subsystem 1416 passes (arrow 4) the received login information to the account authority management subsystem 1408 of the user management subsystem 1400.

The account authority management subsystem 1408 sends (arrow 5) the login information to the account authority access driver subsystem 1404. The account authority access driver subsystem 1404 accesses (arrow 6) the account authority 1440 with the user credentials. From the user credentials, the account authority 1440 determines (arrow 7) whether to grant authorization to the user of the client 120. The account authority access driver subsystem 1404 returns (arrow 8) the authorization result to the specialized application subsystem 1416, which returns (arrow) the result to the common access point subsystem 645, which returns (arrow 10) the result to the client 120 through the terminal server logon software 1414, 1418, 1422.

FIG. 14B shows another exemplary process used to authorize a client in response to a client request. As shown, an embodiment of the server farm 110 includes an NT domain server 180 and a Unix server 180'. The Unix server 180' includes an ICA browser subsystem 720, a program neighborhood subsystem 760 and a user management subsystem 1400'. The user management subsystem 1400' includes an account authority management subsystem 1408' and a Unix account authority access driver subsystem 1404' that communicates with a Unix type account authority 1440.

The NT domain server 180 includes a user management subsystem 1400 having two account authority access driver subsystems 1404' and 1404". One of the account authority access driver subsystems 1404' is an NT Domain driver that communicates with an NT domain type of account authority 790. The other account authority access driver subsystem 1404" is an Active Directory driver that communicates with an Active Directory type of account authority 795.

The relationship subsystem 1130 maintains farm-wide trust information between servers and account authorities. The account authority management subsystem 1408 determines the identity of the account authority that the server 180 trusts, and returns (arrow 4) such identity to the specialized application subsystem 1416. The persistent store system service module 352 is in communication with a table 750 of pointers, (hereafter "server trust table"), residing on the persistent store 230. The server trust table 750 is globally accessible, that is, every server 180 in the server farm 110 can read the entries of the server trust table 750. The table 750 entries associate the servers 180 in the server farm 110 with the account authorities that the servers 180 trust. Each entry includes three fields: a server name, the descriptor of the type of the trusted account authority, and a descriptor of the instance of the account authority. Each server 180 in the server farm 110 therefore can obtain knowledge of all trust relationships between every other server 180 in the server farm 110 and the known account authorities.

To determine the identity of the trusted account authority, the account authority management subsystem 1408 communicates with the persistent store 230, through the persistent store system service module 352, to obtain a list of the servers that trust the specified type of account authority. The persistent store 230 stores a list of trusted account authorities for each server 180 in the server farm 110.

The account authority access driver subsystem 1404 then sends (arrow 6) the account authority type to the persistent store system service module 352. The persistent store system service module 352 accesses (arrow 7) the persistent store 230 with the account authority type to obtain (arrow 8) a pointer to the account authority 1440. The persistent store system service module 352 returns the account authority pointer to the account authority access driver subsystem 1404.

Consider that the client 120 launches a virtual channel that connects the client to the Unix server 180' in the server farm 110. The connection request includes the credentials of the user (i.e., the username and password) and identifies the account authority (i.e., the account authority type descriptor and instance descriptor). Here, for illustration purposes, the type of account authority corresponds to the NT domain. The connection information passes to the program neighborhood subsystem 760 of the Unix server 180'.

The specialized application subsystem 1416 passes the received information to the account authority management subsystem 1408' of the Unix server 180'. The account authority management subsystem 1408 determines that the Unix server 180' cannot handle the request because the request is not the type of specified account authority (here, NT domain). Accordingly, the account authority management subsystem 1408 communicates (arrow 6) with the persistent store 230 to obtain (arrow 7) a list of the servers that trust the specified type of account authority. Note that the persistent store 230 stores a list of trusted account authorities for each server 180 in the server farm 110. From the list of possible servers, the account authority management subsystem 1408 makes a routing decision. The routing decision in one embodiment is based on the latency (i.e., response time) of these servers.

The account authority management subsystem 1408 then transmits (arrow 8) the request to the NT domain account authority access driver subsystem 1404'. The NT domain account authority access driver subsystem 1404' then communicates with the NT domain account authority 750 to determine that the user of the client 120 is authorized to perform the action identified in the original request to the Unix Server 180'. The results returns to the program neighborhood subsystem 760 of the Unix server 180', which may perform the action and return the results to the client.

User authorization typically occurs in one of two ways. One way is through the ICA browser subsystem 720. A second way is through a program neighborhood subsystem 760.

7.7 ICA Browser Subsystem

Browsing enables the client 120 to view farms, servers, and applications in the server farm 110 and to access available information such as disconnected sessions throughout the farm 110. Each server 180 includes an ICA browsing subsystem 720 to provide the client 120 with browsing capability. After the client 120 establishes a connection with the ICA browser subsystem 720 of any of the servers 180, that browser subsystem supports a variety of client requests. Such client requests include: (1) enumerating names of servers in the farm, (2) enumerating names of applications published in the farm, (3) resolving a server name and/or application name to a server address that is useful the client 120. The ICA browser subsystem 720 also supports requests made by clients running "program neighborhood application," described in more detail below. In general, program neighborhood is an application that provides the user of the client 120, upon request, with a view of those applications within the server farm 110 for which the user is authorized. The ICA browser subsystem 720 forwards all of the above mentioned client requests to the appropriate subsystem in the server 180.

7.8 Program Neighborhood Subsystem

Each server 180 in the server farm 110 that has a program neighborhood subsystem 760 can provide the user of the client 120 with a view of applications within the server farm 110. The program neighborhood subsystem 760 limits the view to those applications for which the user is authorized. Typically, this program neighborhood service presents the applications to the user as a list or a group of icons.

The functionality provided by the program neighborhood subsystem 760 is available to two types of clients, (1) program neighborhood-enabled clients that can access the functionality directly from a client desktop, and (2) non-program neighborhood-enabled clients (e.g., legacy clients) that can access the functionality by running a program neighborhood-enabled desktop on the server.

Communication between a program neighborhood-enabled client and the program neighborhood subsystem 760 occurs over a dedicated virtual channel that is established on top of an ICA virtual channel. In one embodiment, the program neighborhood-enabled client does not have a connection with the server with a program neighborhood subsystem 760. For this embodiment, the client 120 sends a request to the ICA browser subsystem 720 to establish an ICA connection to the server 180 in order to determine applications available to the client 120. The client then runs a client-side dialog that requires the credentials of the user. The credentials are received by the ICA browser subsystem 720 and sent to the program neighborhood subsystem 760.

The program neighborhood subsystem 760 sends the credentials to the user management subsystem 1400 for authentication as described above. The user management subsystem 1400 returns a set of distinguished names representing the list of accounts to which the user belongs. Upon authentication, the program neighborhood subsystem 760 establishes the program neighborhood virtual channel. This channel remains open until the application filtering is complete.

The program neighborhood subsystem 760 then requests the program neighborhood information from the common application subsystem (section 7.10) associated with those accounts. The common application subsystem obtains the program neighborhood information from the persistent store 230. On receiving the program neighborhood information, the program neighborhood subsystem 760 formats and returns the program neighborhood information to the client over the program neighborhood virtual channel. Then the partial ICA connection is closed.

For another example in which the program neighborhood-enabled client establishes a partial ICA connection with a server, consider the user of the client 120 who selects a server farm. The selection of the server farm sends a request from the client 120 to the ICA browser subsystem 720 to establish an ICA connection to one of the servers 180 in the selected server farm. The ICA browser subsystem 720 sends the request to the program neighborhood subsystem 760, which selects a server in the server farm. The program neighborhood subsystem 760 then sends the server name to the common server subsystem (section 7.10) for server name resolution. The common server subsystem resolves the server name, as described below, and returns an address to the program neighborhood subsystem 760. The address is returned to the client 120 by way of the ICA browser subsystem 720. The client 120 can then subsequently connect to the server 180 corresponding to the address.

In another embodiment, the program neighborhood-enabled client has an ICA connection upon which the program neighborhood-virtual channel is established and remains open for as long as the ICA connection persists. Over this program neighborhood virtual channel, the program neighborhood subsystem 760 pushes program neighborhood information updates to the client 120. To obtain updates, the program neighborhood subsystem 760 subscribes to events from the common application subsystem to allow the program neighborhood subsystem 760 to detect changes to published applications.

7.9 Application and Server Subsystems

In some embodiments, each server 180 in the server farm 110 has one or more common application subsystems providing services for one or more specialized application subsystems 1416. These servers 180 may also have one or more common server subsystem providing services for one or more specialized server subsystems 1140. In other embodiments, no common subsystems are provided, and each specialized application and server subsystem implements all required functionality.

7.9.1 Application Subsystems

7.9.1.1 Common Application Subsystem

Each server 180 in the server farm 110 may include one or more common application subsystem that provide common functionality for one or more specialized application subsystems 1416 (e.g., Metaframe for Windows, manufactured by Citrix Systems, Inc. of Ft. Lauderdale, Fla.) on the server 180. In specific embodiments, a server 180 may have only one common application subsystem that provides a common set of functions for all specialized application subsystems 1416.

A common application subsystem 300 can "publish" applications to the server farm 110, which makes each application available for enumeration and launching by clients 120. Generally, an application is installed on each server 180 where availability of that application is desired. In one embodiment, to publish the application, an administrator runs the administration tool 140, specifying information such as the servers 180 hosting the application, the name of the executable file on each server, the required capabilities of a client for executing the application (e.g., audio, video, encryption, etc.), and a list of users that can use the application. This specified information is categorized into application-specific information and common information. Examples of application-specific information are: the path name for accessing the application and the name of the executable file for running the application. Common information (i.e., common application data) includes, for example, the user-friendly name of the application (e.g., "Microsoft WORD 2000"), a unique identification of the application, and the users of the application.

The application-specific information and common information are sent to each appropriate specialized application subsystem 1416 for controlling the application on each server hosting the application. The specialized application subsystem 1416 may write the application-specific information and the common information into persistent store 230 and forwards a copy of the common information to the common application subsystem 300. In one embodiment, the common application subsystem 300 stores the common information in the persistent store 230. In another embodiment, the common application subsystem 300 does not store the common information. In this embodiment, the common information is supplied to the common application subsystem by a specialized application subsystem on an as-needed basis. The distinction between common information and application-specific information enables new specialized application subsystems 1416 to be readily added to the server 180, regardless of the application subsystem type (i.e., Windows, Video, Unix, JAVA. etc).

When provided, a common application subsystem 300 also provides a facility for managing the published applications in the server farm 110. Through a common application subsystem 300, the administrator can manage the applications of the server farm 110 using the administration tool 140 by configuring application groups and producing a application tree hierarchy of those application groups. Each application group is represented as a folder in the application tree. Each application folder in the application tree can include one or more other application folders and specific instances of servers. The common application subsystem 300 provides functions to create, move, rename, delete, and enumerate application folders.

7.9.1.2 Specialized Application Subsystem

The specialized application subsystem 1416 implements the functionality of published applications. As described above, an administrator defines published applications, specifying the servers of the server farm that host each published application and the users that can execute each application. A published application includes an application executable, a set of servers, and a set of users.

The specialized application subsystem 1416 provides a SAL that enables other subsystems and the administration tool 140 to, for example, (1) configure published applications, (2) perform name resolution, (3) process user logons, (4) reset running applications to terminate any sessions running the application, (5) reassign an active session to another server, (6) identify the target clients for a multicast multimedia stream, or (7) other functions useful or necessary in connection with a particular application. The SAL calls for configuring published applications include calls for creating, reading, writing, and deleting published applications. Another SAL call enumerates published applications. Other SAL calls add, remove, and enumerate users; others add, remove, and enumerate servers.

7.9.2 Server Subsystems
7.9.2.1 Common Server Subsystem

Each server 180 in the server farm 110 may include one or more common server subsystem providing common functionality for one or more specialized server subsystems 1140. Each specialized server subsystem 1140 provides a specific type of server functionality to the client 120. In specific embodiments, a server 180 may have only one common server subsystem that provides a common set of functions for all specialized server subsystems.

The common server subsystem can provide common server functionality that is independent of the specialized server subsystem type(s) that reside on the server 180 with the common server subsystem. This common functionality can include, for example, (1) registering specialized server subsystems, (2) managing server groups, (3) supporting server name resolution, and (4) supporting enumeration of disconnected sessions. Although the common server subsystem may not resolve or enumerate server names or disconnected sessions, the common server subsystem can operates as an initial access point for such requests. When provided, the common server subsystem forwards such requests to the appropriate specialized server subsystem 1140.

A common server subsystem receives registration information from each specialized server subsystem 1140 installed on the server 180. The registration information includes the server type and the subsystem ID of that specialized server subsystem 1140. Additionally, the registration information indicates the capabilities of the specialized server subsystem 1140. Registered capabilities include resolving server names and disconnected sessions, enumerating servers, and enumerating disconnected sessions. The common server subsystem stores this registration information in the persistent store 230 and refers to the information upon receiving a request to resolve a server name or to enumerate disconnected sessions. From the stored registration information, the common server subsystem determines where (i.e., which specialized server subsystem 1140) to forward the received request.

In one embodiment, the common server subsystem provides a facility for managing the servers 180 in the server farm 110. Through the common server subsystem, the administrator can manage the servers 180 of the server farm 110 using the administration tool 140 by configuring server groups and producing a server tree hierarchy of those server groups. Each server group is represented as a folder in the tree. Each server folder in the tree can include one or more other server folders and specific instances of servers. The common server subsystem provides functions to create, move, rename, delete, and enumerate server folders.

7.9.2.2 Specialized Server Subsystem

Each server 180 in the server farm 110 includes at least one specialized server subsystem 1140. Examples of specialized server subsystems 1140 include a WINDOWS NT server subsystem, a Unix server subsystem, and a WINDOWS 2000 server subsystem. Each specialized server subsystem 1140 provides specific server functionality. For example, such functionality can include maintaining general server information, managing connection configuration, such as connection limits and timeouts, maintaining dynamic information (e.g., for local sessions and processes), and maintaining information about disconnected sessions.

The specialized server subsystem 1140 provides the following application program interfaces (APIs) to achieve the above-described server subsystem functionality:

(1) APIs to retrieve information about the specialized server subsystem 1140, such as getting the version of the subsystem and converting among the unique identifier, distinguished name, and host identifier of the subsystem;

(2) APIs to perform server name resolution and to enumerate disconnected sessions;

(3) APIs to manage the server, such as getting the server's capability, shutting the server down, rebooting the server, enabling logon to the server; and (4) APIs to manage processes such as enumerating processes, getting process information, and terminating processes. These APIs may be provided as a SAL interface, as described above.

In one embodiment, the specialized server subsystem 1140 also provides APIs for enumerating sessions, getting session information, disconnecting sessions, resetting sessions, limiting the number of sessions, sending messages to sessions, setting thresholds for session loads, and issuing an event when the session load reaches a threshold or returns to normal.

The specialized server subsystem 1140 manages information regarding disconnected sessions. A disconnected session is a session that is active, but without input and output. No ICA connection exists between the client 120 and the disconnected server. Sessions are uniquely identified by a combination of a host ID and a session ID. The host ID is unique in the server farm 110, and the session ID is unique to a particular server. Sessions associated with a server 180 are also identified by the client name. Sessions associated with an application, active and disconnected, are also identified by the name of the client (i.e., the machine or "NET-BIOS" name) connected to the application and the name of the application (e.g., <application name>:<client name>). In one embodiment, active sessions are uniquely identified by host ID and session ID. When a session terminates, the session ID previously associated with the terminated session can be reused for a new session.

The specialized server subsystem 1140 records disconnected sessions in the dynamic store 240. Each record of a disconnected session includes a host id, a session ID, a client name, the name of the application, and other information such as the client's username and domain. The specialized server subsystem 1140 adds a disconnected session record to the dynamic store 240 when that session is disconnected, and deletes the disconnected session record when the client 120 reconnects to the session.

Figure 15:
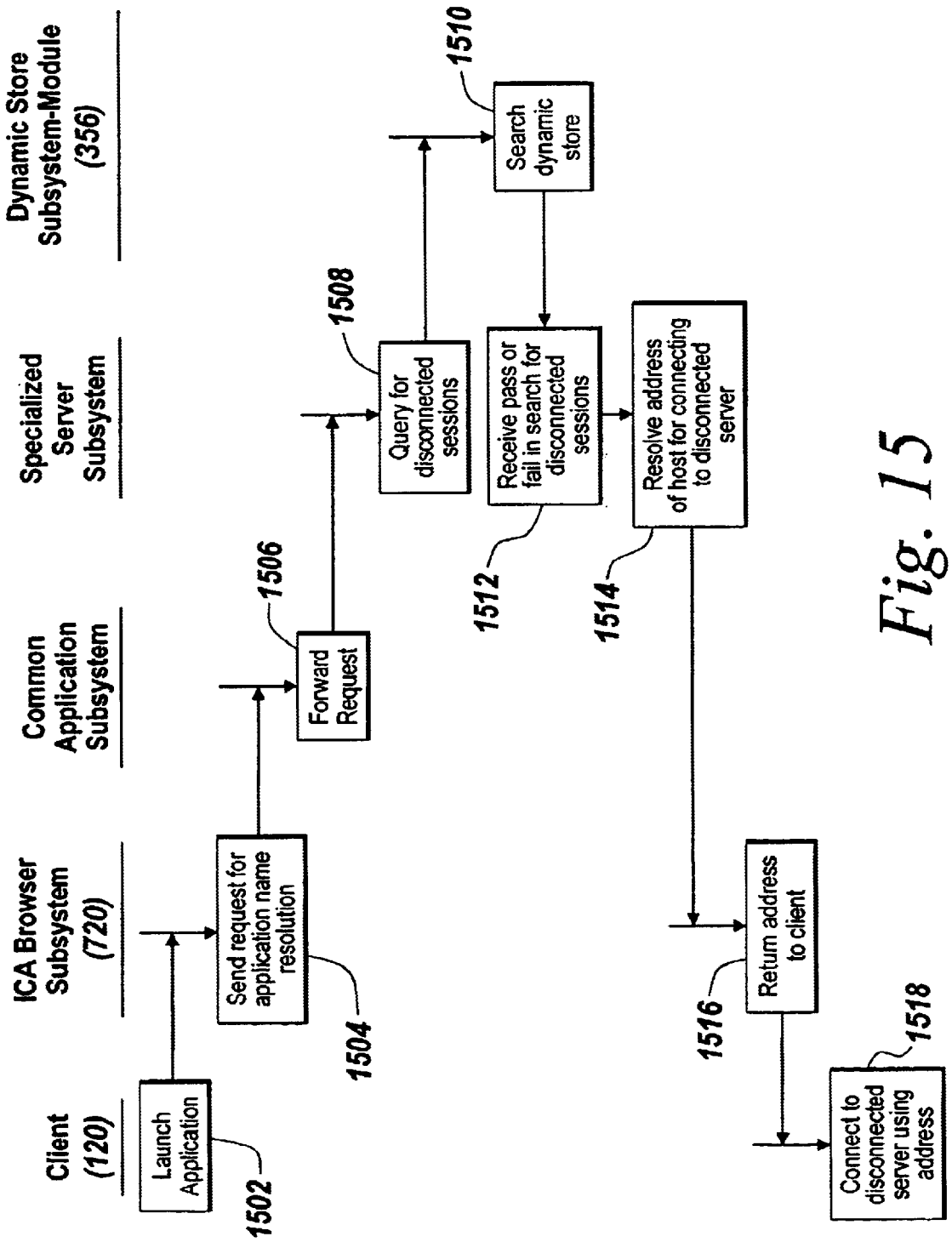
FIG. 15 is a flow diagram illustrating an embodiment of a process used by a specialized server subsystem for processing a launch application request.

FIG. 15 illustrates an embodiment of a process used by the specialized server subsystem 1140 to reconnect the client 120 to a disconnected session of that client. The client 120 sends (step 1502) to the ICA browser subsystem 720 seeking to launch an application program. The request includes the client name and the application name. The ICA browser subsystem 720 sends (step 1504) such information to the common application subsystem 300 to perform application name resolution, described in greater detail below. The common application subsystem 300 forwards (step 1506) the request to a specialized server subsystem 1140, which queries (step 1508) the dynamic store 240 in search of a record of a disconnected session that matches the client and application names.

The search of the dynamic store 240 produces (step 1510) a pass or fail. If the search passes because the client has a disconnected session for desired application, the specialized server system 1140 obtains (step 1512) the address of the server identified by the host ID in the record of the disconnected session from the dynamic store system service module 356 and returns the address to the ICA browser subsystem 720. The ICA browser subsystem 720 returns (step 1516) the address of the disconnected server to the client 120. The format of the address depends upon the underlying transport mechanism (e.g., IPX or TCP) for communicating with the disconnected server from the client 120. This transport mechanism may be different from the transport mechanism used during the disconnected session.

The client 120 then establishes (step 1518) an ICA connection to the disconnected server identified by the address. After the user of the client 120 is authenticated, the reconnected server executes the application and returns results to the client over the ICA connection.

If the search for a disconnected session fails, the specialized server subsystem 1140 resolves the application name by determining an address of a server that hosts the requested application and to which the client may establish a connection, as described below.

7.9.3 Application Name Resolution

After an application is published, clients can launch that application. To execute the application, the server 180 must first resolve the application name. Name resolution involves determining an address that can be used to access the application from the user-friendly name of the desired application name. More specifically, when the client 120 launches the application, the client 120 transmits a request over link to the server 180 in the server farm 110. In one embodiment, this request is a UDP datagram. The UDP datagram includes the name of the application. The client 120 seeks resolution of this application name into an address (e.g., a TCP/IP address). The ICA browser subsystem 720 of the server 180 receives the UDP datagram. At this point, the ICA browser subsystem 720 assumes that the name in the UDP datagram is associated with an application, although the name can be for a server.

The function of the ICA browser subsystem 720 is to decode the received UDP datagram and to forward the decoded information to the appropriate subsystem. In one embodiment, the common application subsystem 300 serves as an initial access point of communication for the ICA browser subsystem 720 to resolve the application name. The ICA browser subsystem 720 sends an event to the common application subsystem 300 over the event bus 310 with a request for the TCP/IP address corresponding to a server hosting the desired application.

In general, the common application subsystem 300 provides an initial determination of the availability of the sought for application. Through the persistent store system service module 352, the common application subsystem 300 has access to information about all of the applications published by the specialized server subsystem 1140. The common application subsystem 300 sends an event to the persistent store system service module 352 to search the persistent store 230 for the desired application using the user-friendly name (e.g., "Microsoft Word 2000") of the application. If the desired application is published, the search of the persistent store 230 returns a unique identifier associated with the application. An unsuccessful search indicates that the sought-for application is not available.

Part of publishing an application is to store information that indicates the subsystem (hereafter "resolving subsystem") that performs name resolution for that application. Upon finding that the application is published, the common application subsystem 300 also determines the resolving subsystem. In particular, the common application subsystem 300 determines the type of the resolving subsystem (e.g., the type of specialized server subsystem 1140, specialized application subsystem 1416, etc.), and then communicates with the service locator 354 to determine the server that has that type of resolving subsystem. Such server may be the same server 180 or a remote server in the server farm 110. An event corresponding to the application request then passes to the resolving subsystem on that server. The event includes the unique identifier of the sought for application.

The type of the resolving subsystem is implementation dependent. If the server 180 supports disconnected sessions, name resolution further entails checking for disconnected sessions that match the identification of the client. As described above, the specialized server subsystem 1140 manages sessions, and therefore, for efficiency reasons, in one embodiment, operates as the resolving subsystem. Thus, the specialized server subsystem 1140 of the server 180 performs the search for a disconnected session, as described above. If no disconnected session matches the client identification, then the specialized server subsystem 1140 queries the load management subsystem to load balance the application.

The load management subsystem returns the unique identifier of a server hosting the application to the specialized server subsystem 1140. The identification of the host server is determined from the unique identifier. The specialized server subsystem 1140 then returns a TCP address corresponding to the host server identification to the ICA browser subsystem 720 to complete the name resolution. In another embodiment, the specialized application subsystem 1416 can operate as the resolving subsystem. If the application name cannot be resolved, an error is returned.

If the common application subsystem 300 determines that the application is not published in the persistent store 230, then the name in the UDP datagram does not correspond to an application. The common application subsystem 300 responds to the ICA browser subsystem 720 indicating that the name for which resolution is sought is not for an application. In response, the ICA browser subsystem 720 sends an event to the common server subsystem 300, which attempts to determine if the name corresponds to a server in the farm.

The common server subsystem 300 searches all server objects in the persistent store 230 (through the persistent store system service module 352) looking for the name that is being resolved. If the name is located, the common server subsystem 300 determines the resolving subsystem based on the specialized type of the server, and forwards the name resolution request to the specialized server subsystem 1140. This specialized server subsystem 1140 returns its own address to the common server subsystem 300. The common server subsystem 300 forwards the address to the ICA browser subsystem 720, and the ICA browser subsystem 720 returns the address to the client 120. With this address, the client 120 is able to connect directly to the corresponding server 180.

7.9.4 Application Enumeration

The client 120 can also request application enumeration. Application enumeration enables a user of the client 120 to view the names of every published application. In one embodiment, the user of the client 120 can view the application names regardless of whether the user can actually launch that application. In another embodiment, the user views only those application names that the viewer is authorized to launch.

Requests for application enumeration pass to the ICA browser subsystem 720, to the program neighborhood subsystem 760, or to the common access point subsystem 645, depending upon the particular process being run by the client 120. For example, when the client 120 is running program neighborhood application, the requests for application enumeration are sent to the program neighborhood subsystem 760. When the client 120 submits the enumeration request through a web page, the requests pass to the common access point subsystem 645. For these embodiments, the common application subsystem 300 serves as an initial access point for the program neighborhood subsystem 760, ICA browser subsystem 720, and common access point 645 subsystems when the client 120 wants to enumerate applications.

Upon receiving the enumeration requests, the common application subsystem 300 queries the persistent store 230 for a list of all applications. For requests received from the program neighborhood subsystem 760 and common access point 645 subsystems, this list of applications is filtered according to the credentials of the user of the client 120 (i.e., the user views only those applications for which the user is authorized).

7.9.5 Server Enumeration

The client 120 can also request server enumeration. Server enumeration enables a user of the client 120 to view a list of servers in the server farm. In one embodiment, the list of servers can be filtered according to the type of server, as determined by the specialized server subsystem 1140 on that server.

Requests for server enumeration pass to the ICA browser subsystem 720 or to the common access point subsystem 645, depending upon the particular process being run by the client 120. For example, when the client 120 submits the server enumeration request through a web page, the requests pass to the common access point subsystem 645. For these embodiments, the common server subsystem 300 serves as an initial access point for the ICA browser subsystem 720 and common access point 645 subsystems. Upon receiving the server enumeration requests, the common server subsystem 300 queries the persistent store 230 for a list of all servers. Optionally, the list of servers is filtered according to the server type.

7.10 Common Access Point (CAP) Subsystem

An administrator may install software on the server 180 that does not "plug-in" to the event bus 310; that is, such non-plug-in software executes processes and uses data types that are not part of the event messaging protocol used by the subsystems 300 during intra-server communication. Each server 180 in the server farm 110 includes a common access point subsystem 645 to enable such non-plug-in software to communicate with the subsystems 300 over the event bus 310. To communicate with the subsystems 300, the non-plug-in software uses the APIs of the subsystem access layer (SAL) 304 provided by the common access point subsystem 645 to place events on the event bus 310. One example of such software is the terminal server logon process, referred to as "termserv", and described above in section 7.7.

7.11 Administration Subsystem

Each server 180 in the server farm 110 includes an administration subsystem 300. The administration subsystem 300 provides a SAL 304 that enables the other subsystems 300 to publish their data to the administration tool 140 on a client 120 and thus make this data visible to an administrator of the server farm 110. The administration subsystem 300 cooperates with the administration tool 140, described below, when the administration tool 140 manages and views the data provided by the administration subsystem.

8.0 Administration Tool

The administration tool 140 provides a graphical user interface that defines and manages menus, toolbars, and data associated with subsystems 300 on the servers 180 of the server farm 110. The standard layout of the administration tool 140 is a desktop window on which additional components (e.g., a view instance of an administration plug-in) can be placed. Each of the plug-ins to the administration tool 140 can insert, remove, and modify menu items and toolbars as appropriate. The administration tool 140 displays various resources that when browsed by the administrator activates and displays additional information in the desktop window.

Figure 16:
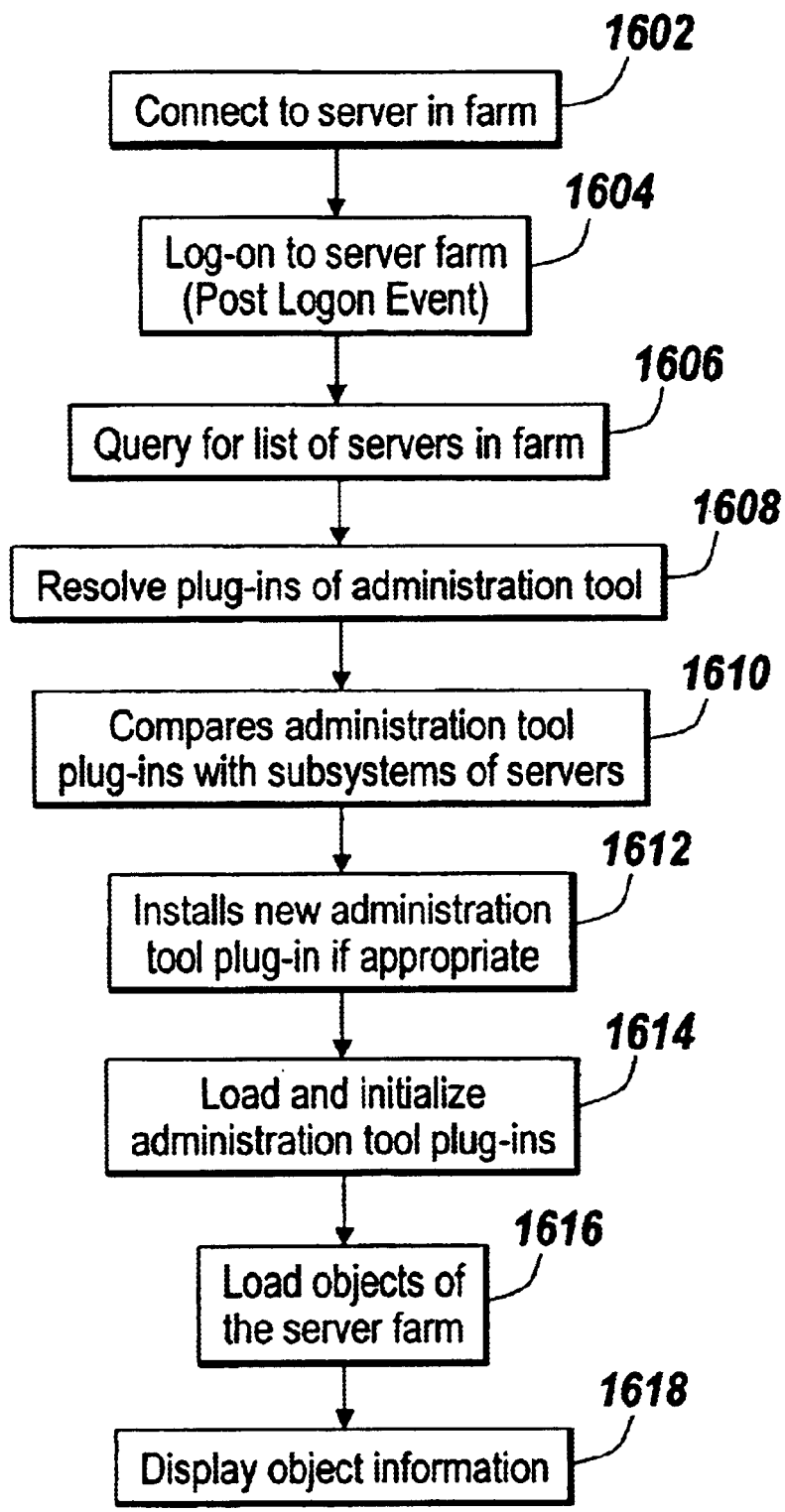
FIG. 16 is a flow diagram illustrating an embodiment of a process used by an administration tool to obtain data for managing the server farm.

FIG. 16 shows an embodiment of a process for starting the administration tool 140. During its startup sequence, the administration tool 140 forms a frame window, a menu bar and a tool bar. It then forms a desktop view and places it in the content pane of the frame window. The administration tool 140 then connects (step 1602) to one or more server farms 110 by providing authentication credentials to a preferred server 180 within each server farm 110. In one embodiment, authentication credentials include a user name-password pair. In other embodiments, the authentication credentials may comprise a private key or digital certificate. In the event that the connection to the preferred server fails, the administration tool 140, in one embodiment, attempts to connect to other servers 180 in that server farm 110. In some embodiments, the administration tool presents authentication credentials after a successful connection has been established.

As part of the logon sequence, the administration tool 140 posts (step 1604) a farm logon event to the administration subsystem and awaits a response. The types of responses that can be encountered include a time-out, a successful login, failure due to provision of invalid or unrecognized authentication credentials, or failure due to provision of an invalid farm identifier or server identifier.

When a logon is successful, one embodiment of an initialization process of the administration tool 140 transmits event messages 700 that 1) query (step 1606) the connected server for a list of all servers in the server farm 110; 2) resolves (step 1608) administration tool plug-ins; 3) compares (step 1610) the plug-ins of the administration tool 140 with those of the server farm 110 and downloads and installs (step 1612) any new or updated administration tool plug-ins as appropriate; 4) loads and initializes (step 1614) the administration tool plug-ins; 5) loads (step 1616) the objects of the server farm 110; and 6) displays (step 1618) object information of the server farm 110 in the desktop window.

Figure 17:
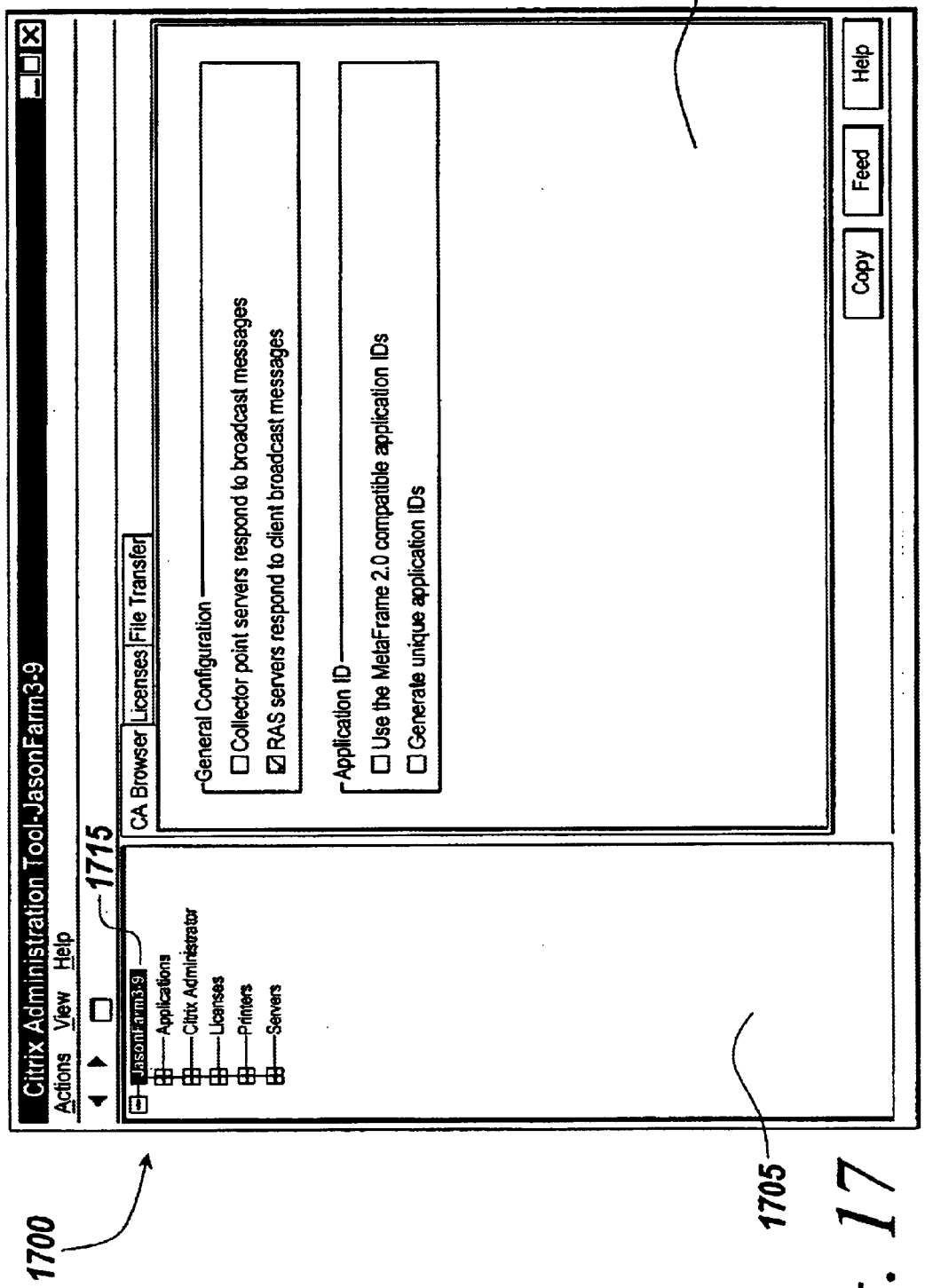
FIGS. 17, 18, 19 and 20 are exemplary screen shots of graphical user interface displays produced by the administration tool.

FIG. 17 shows an exemplary desktop window 1700 displaying object information of a server farm 110. In this embodiment, the icon JasonFarm3–9 1715 represents the server farm 110. The desktop window 1700 displays information in two panels: a left panel 1705 and a right panel 1710. The left panel 1705 presents a tree view of the server farm 110 to which the administration tool 140 is connected. The right panel 1710 displays a "tab" view of information about and controls for the icon which is highlighted in the left panel 1705, in this case server-wide policies related to server farm 110 identified as JasonFarm3–9 1715.

Figure 18:
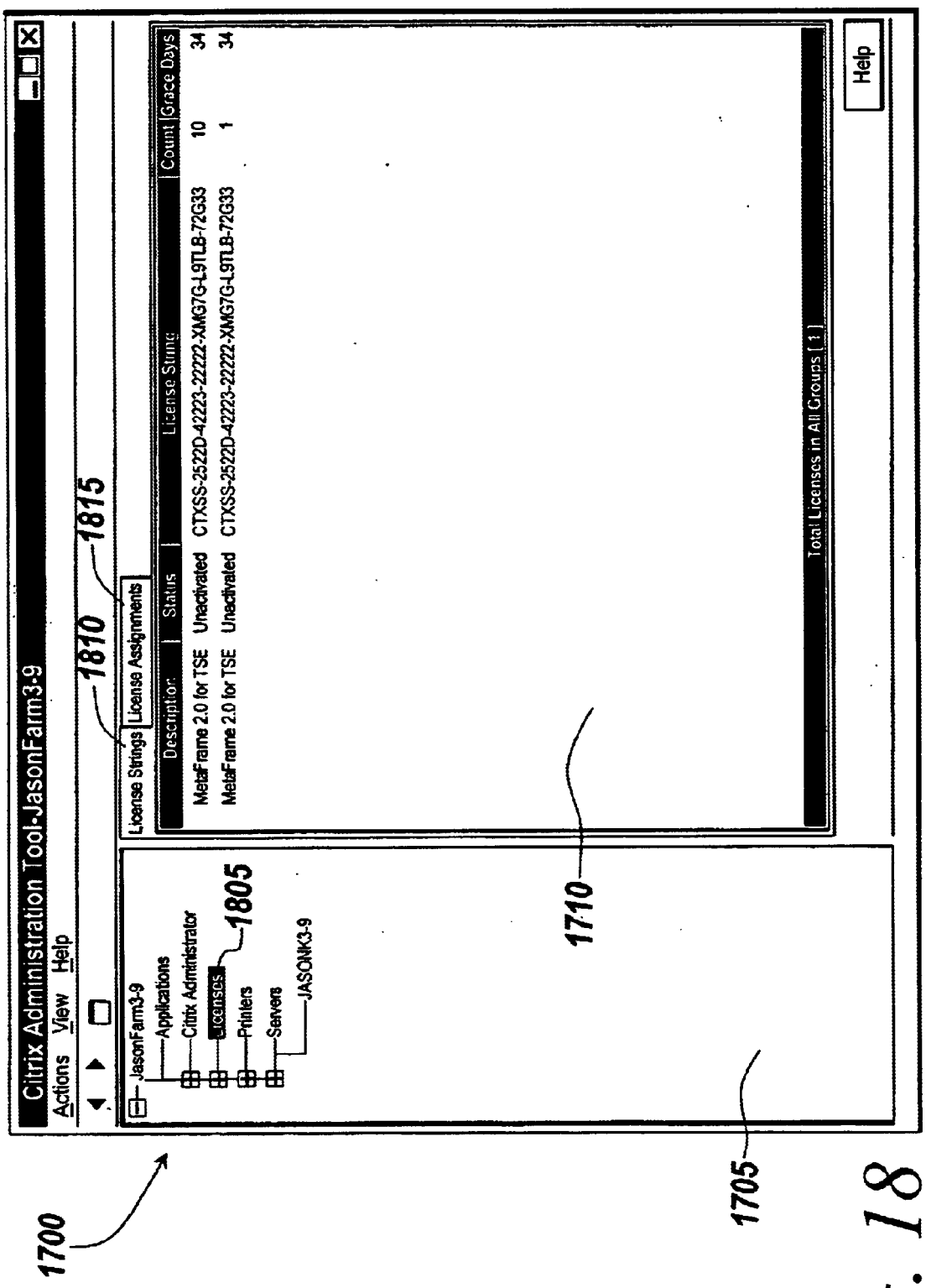

For administering the licensing subsystem, the administration tool 140 displays licensing information in two panels: a left panel 1705 and a right panel 1710. FIG. 18 shows an exemplary display that appears in connection to administering licenses. The left panel 1705 presents a tree view of license strings and license groups. Corresponding licensing information and controls appear in the right panel 1710 of the administration tool desktop window 1700 GUI. The licenses icon 1805 can be further expanded into individual groups of licenses. Since the tree is not expanded, the right panel 1710 displays all of the license strings in all groups.

In another embodiment the licensing user interface includes three tabbed displays: a connection license group tab, a product license group tab, and a license group tab. The connection license group tab displays a screen that allows an administrator to operate on specific groups of connection licenses. The product group tab displays a screen allowing an administrator to operate on specific groups of product licenses. The license string tab displays a screen allowing an administrator to enter, remove, or change license serial numbers.

The following operations can be performed on a license group:

(1) Delete Group—the administrator can delete all license strings from a license group, then deletes the group itself. For example, the administrator can remove all RMS licenses from his server farm by deleting the RMS license group. A license group cannot be deleted if any of the license strings contained in that group are also contained in another license group, since that would orphan part of the functionality of those licenses. (Example: a server base license string that also contains a connection license count appears in two license groups. Therefore while that license is installed, the connection license group cannot be deleted.)

(2) Assign a license group to server—the administrator accomplishes the assigning of a license group to a server by dragging a license group onto a server appearing either in the left panel 1705 or in the right panel 1710 of the administration tool desktop window 1700 display. When the license group is assigned, a pop-up window asks the user how many of the licenses from the license group are to be assigned to the server, with the maximum being the total number of unassigned licenses in the license group. The responsibility falls upon the administrator to assign a license group to a server that can use the licenses in the group and not to assign more licenses to the server than the server needs (i.e., more than one server base license). In some embodiments, this process may by facilitated by a "wizard," that is, a program that elicits certain information directly from the administrator.

(3) Unassign a license group from a server—the administrator accomplishes the unassignment by clicking on the license group, then selecting the license assignments tab 1815 appearing in the right panel and deleting the assignments that are then shown.

Referring to FIG. 18, the right panel 1710 of the administration tool GUI displays a "tab" view of information and controls related to the license group selected in left panel 1705, in this case the top level licenses icon 1805 which represents all license groups in the server farm 110. One exemplary "tab" is License Strings 1810. Clicking on this tab shows a list of license strings in the currently selected license group, the status of each license (e.g., activated, unactivated, expired, and evaluation), the number of licenses available for that license string. The License Strings tab 1810 allows the following operations:

(1) Add a License String. When a license string is added, that string is automatically assigned to the license group(s) for which it is relevant. This may create a new license group. The first license group to which the license string is added is selected in the left panel 1705 of the administration tool. In some embodiments, a license string may be added from any view.

(2) Remove a License String. Before being removed, a license string is taken out of the groups in which it resides. If removing the license string empties the license group, the license group is removed. In some embodiments, the removed licenses and license groups will also be "unassigned," that is, the assignment of that license or license group to a server will removed from the persistent store.

Other operations include activating a license string, printing non-activated license strings, showing a grace period (e.g., days) remaining for each license string to remain active.

Another exemplary tab is "License Assignments" 1815. By selecting this tab, the administrator can view the total number of licenses provided by a license group, the total number of licenses assigned to servers, and the total number of each of such licenses that are currently in use.

Figure 19:
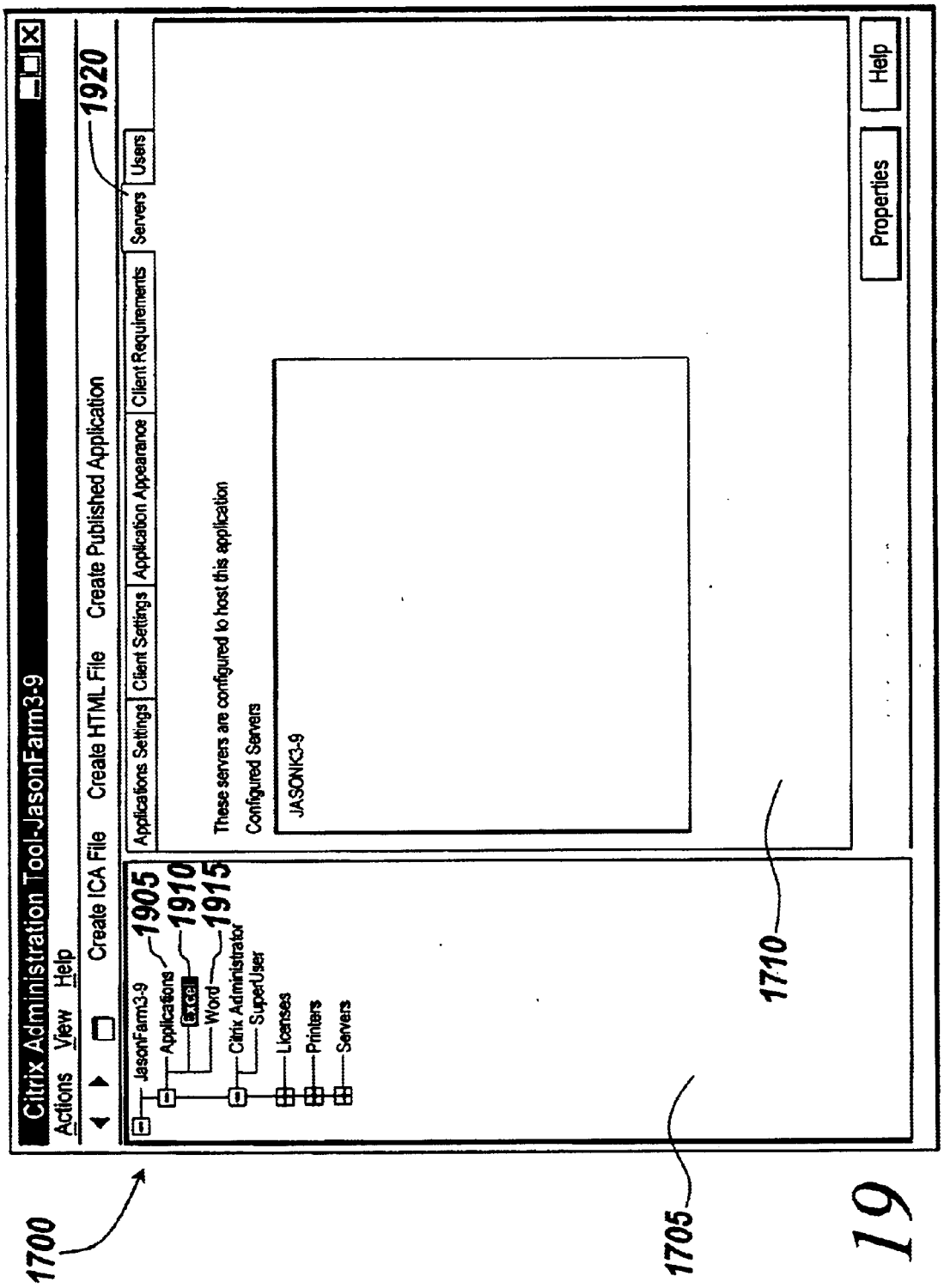

For managing applications, the administration tool 140 enables the administrator to set farm-wide policy. FIG. 19 shows an exemplary display that appears in connection to administering applications. The left panel 1705 presents a tree view of available applications. Corresponding application information and controls appear in the right panel 1710 of the administration tool desktop window 1700 GUI. The applications icon 1905 is shown further expanded into the available application Excel 1910 and Word 1915. As shown, the Excel application icon 1910 is highlighted and thus the right panel 1710 displays information and controls for that application.

Referring to FIG. 19, the right panel 1710 of the administration tool GUI displays a "tab" view of information and controls related to the Excel application 1910 selected in left panel 1705. One exemplary "tab" is "Servers" 1920. Clicking on this tab shows a list of servers that are configured to host the currently selected application. As shown, the server JASONK3–9 is configured to host the Excel application. In another embodiment, a "Connections" tab is provided that displays a screen showing all active connections to an application.

Figure 20:
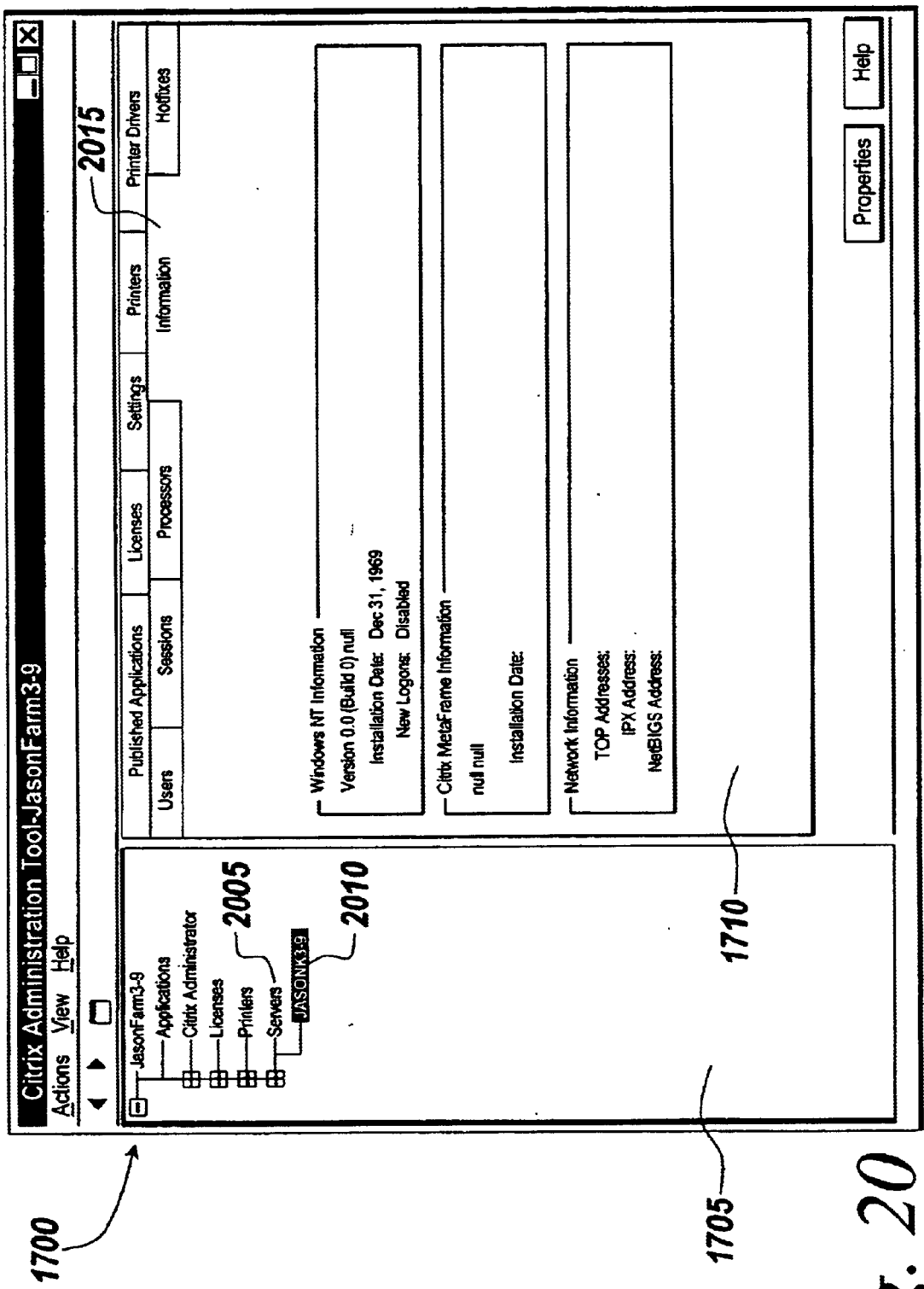

For managing servers of the server farm, the administration tool 140 enables the administrator to set farm-wide policy. FIG. 20 shows an exemplary display that appears in connection to administering servers. The left panel 1705 presents a tree view of available servers. Corresponding server information and controls appear in the right panel 1710 of the administration tool desktop window 1700 GUI. The servers icon 2005 is shown further expanded into the available server JASONK3–9 2010. As shown, the JASONK3–9 server icon 2010 is highlighted and thus the right panel 1710 displays information and controls for that server.

Referring to FIG. 20, the right panel 1710 of the administration tool GUI displays a "tab" view of information and controls related to the JASONK3–9 server selected in left panel 1705. One exemplary "tab" is "Information" 2015. Clicking on this tab shows a list of configuration data about the currently selected server. As shown, the list includes operating system information such as versions, installation dates and special features about the server JASONK3–9. The list also includes the network information assigned to that server.

For managing users and user groups, the administration tool 140 enables the administrator to set farm-wide policy.

For such user management, the administration tool 140 provides a method of setting the "server trust polling interval," to control the frequency with which the servers 180 query themselves to determine the account authorities that they trust. The administration tool 140 also presents the account authority information in the form of a tree. In one embodiment, the tree displays in descending order:

1. An enumeration of all account authority object type descriptors, where each element represents a registered account authority type (e.g. "NTDOMAIN Authorities", "ACTIVE DIRECTORY Authorities", etc.).
2. An expansion of an account authority type reveals all instances of the selected account authority (e.g., "DEVELOP" or "TEST" for NT Domains).
3. The account authority's organization unit (OU) hierarchy can be traversed at this point, if the account authority supports this capability.
4. An expansion of an authority instance or OU node reveals all support objects types of the selected account authority (e.g. "User Accounts" or "Group Accounts").

In one embodiment, each plug-in to the administration tool comprises one or more loadable modules that correspond to one or more server subsystems. Loadable modules may be provided as JAVA beans, ActiveX controls, or COM objects.

Equivalents

The present invention may be provided as one or more computer-readable programs embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, LISP, PERL, C, C++, PROLOG, or any byte code language such as JAVA. The software programs may be stored on or in one or more articles of manufacture as object code.

Having described certain embodiments of the invention, it will now become apparent to one of skill in the art that other embodiments incorporating the concepts of the invention may be used. Therefore, the invention should not be limited to certain embodiments, but rather should be limited only by the spirit and scope of the following claims.

What is claimed is:

1. A method for communicating in a server system comprising:
   (a) providing a first server having a first plurality of subsystems and a first event bus;
   (b) providing a second server having a second plurality of subsystems and a second event bus;
   (c) posting to the first event bus, by one of said first plurality of subsystems, a local event having as its target another of said first plurality of subsystems;
   (d) posting to the first event bus, by one of said first plurality of subsystems, a remote event having as its target one of the second plurality of subsystems;
   (e) obtaining an identifier of the second server hosting the targeted subsystem of the second plurality from the posted remote event;
   (f) determining the presence of a connection to the second server using the obtained identifier;
   (g) querying a network-based service to determine the network address of the second server when no connection to the second server is present; and (h) establishing a connection to the second server using the determined network address when no connection to the second server is present.

2. The method of claim 1 further comprising delivering, by the event bus, said local event to the target subsystem.

3. The method of claim 1 further comprising delivering, by the event bus, said remote event to a transport mechanism.

4. The method of claim 3 further comprising transmitting, by the transport mechanism, said remote event to the target subsystem using TCP/IP.

5. The method of claim 1 further comprising generating, by one of the first plurality of subsystems, an event for transmission to another subsystem.

6. The method of claim 1 further comprising determining, by the event bus, the target subsystem for a posted event.

7. The method of claim 6 wherein determining the target subsystem comprises determining, by the event bus, the target subsystem for a posted event using a dispatch table.

8. A client-server network comprising:
   a first server including a first plurality of subsystems and a first event bus;
   a second server including a second plurality of subsystems;
   wherein one of said first plurality of subsystems posts to said first event bus a local event having as its target another of said first plurality of subsystems, posts to said first event bus a remote event having as its target one of the second plurality of subsystems, obtains an identifier of the second server hosting the targeted subsystem of the second plurality from the posted remote event, determines the presence of a connection to the second server using the obtained identifier, queries a network-based service to determine the network address of the second server when no connection to the second server is present, and establishes a connection to the second server using the determined network address when no connection to the second server is present.

9. The system of claim 8 wherein at least one subsystem on each server comprises a transport subsystem, said transport subsystem transmitting remote events to a target subsystem.

10. The system of claim 9 wherein said transport subsystem transmits remote events to a target subsystem using TCP/IP.

11. The system of claim 8 wherein a transport mechanism is associated with said event bus.

12. The system of claim 8 wherein said event bus delivers local events to a target subsystem.

13. The system of claim 8 wherein said event bus includes a dispatch table for determining the target for a posted event.

14. The system of claim 8 wherein said event bus comprises a data object.

15. The system of claim 8 wherein at least one of said subsystems comprises a data object.

16. An article of manufacture having embodied thereon computer-readable program means for communicating in a server system, the computer-readable programs means comprising:
   computer-readable program means for providing a first plurality of subsystems and a first event bus on a first server;
   computer-readable program means for providing a second plurality of subsystems and a second event bus on a second server;
   computer-readable program means for posting to the first event bus, by one of said first plurality of subsystems, a local event having as its target another of said first plurality of subsystems;
   computer-readable program means for posting to the first event bus, by one of said first plurality of subsystems, a remote event having as its target one of the second plurality of subsystems;
   computer-readable program means for obtaining an identifier of the second server hosting the targeted subsystem of the second plurality from the posted remote event;
   computer-readable program means for determining the presence of a connection to the second server using the obtained identifier;
   computer-readable program means for querying a network-based service to determine the network address of the second server when no connection to the second server is present; and
   computer-readable program means for establishing a connection to the second server using the determined network address when no connection to the second server is present.

17. The article of manufacture of claim 16 further comprising computer-readable program means for delivering, by the event bus, said local event to the target subsystem.

18. The method of claim 16 further comprising computer-readable program means for delivering, by the event bus, said remote event to a transport mechanism.

19. The method of claim 18 further comprising computer-readable program means for transmitting, by the transport mechanism, said remote event to the target subsystem using TCP/IP.

20. The method of claim 16 further comprising computer-readable program means for generating, by one of the first plurality of subsystems, an event for transmission to another subsystem.

* * * * *